United States Patent
Kakinuma et al.

(10) Patent No.: US 8,035,590 B2
(45) Date of Patent: Oct. 11, 2011

(54) COLOR LIQUID CRYSTAL DISPLAY DEVICE ASSEMBLY

(75) Inventors: Koichiro Kakinuma, Tokyo (JP); Shuichi Haga, Kanagawa (JP); Tsuneo Kusunoki, Kanagawa (JP); Takahiro Igarashi, Kanagawa (JP); Masaaki Kawamata, Kanagawa (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 12/256,969

(22) Filed: Oct. 23, 2008

(65) Prior Publication Data

US 2009/0115713 A1    May 7, 2009

(30) Foreign Application Priority Data

Nov. 2, 2007   (JP) ................................. 2007-286616

(51) Int. Cl.
*G09G 3/36* (2006.01)
(52) U.S. Cl. .............. 345/88; 345/82; 345/87; 313/498; 349/56; 362/611
(58) Field of Classification Search .............. 345/82–84, 345/87–100; 313/498; 349/56, 71, 84, 86, 349/112, 158; 362/561, 600, 611, 612
See application file for complete search history.

(56) References Cited

U.S. PATENT DOCUMENTS

| | | | |
|---|---|---|---|
| 6,396,554 B1 * | 5/2002 | Matsuda | 349/139 |
| 7,701,428 B2 * | 4/2010 | Stumbo et al. | 345/87 |
| 2001/0038426 A1 | 11/2001 | Bechtel et al. | |
| 2002/0048164 A1 | 4/2002 | Umemoto | |
| 2002/0126078 A1 | 9/2002 | Joribe et al. | |
| 2005/0156839 A1 * | 7/2005 | Webb | 345/87 |
| 2006/0208993 A1 * | 9/2006 | Jung | 345/98 |
| 2006/0256059 A1 * | 11/2006 | Stumbo et al. | 345/92 |
| 2006/0274226 A1 | 12/2006 | Im et al. | |
| 2007/0075294 A1 | 4/2007 | Murase et al. | |
| 2007/0164953 A1 * | 7/2007 | Huang et al. | 345/88 |
| 2007/0234166 A1 * | 10/2007 | Hwang et al. | 714/738 |
| 2007/0242028 A1 * | 10/2007 | Kitagawa et al. | 345/100 |
| 2008/0088649 A1 * | 4/2008 | Ikeno et al. | 345/690 |
| 2010/0002018 A1 * | 1/2010 | Hirata | 345/690 |

FOREIGN PATENT DOCUMENTS

EP    1762887 A1    3/2007

(Continued)

OTHER PUBLICATIONS

European Search Report dated Sep. 3, 2010 corresponding to European Patent Appln. No. 08253567.5.

*Primary Examiner* — Kimnhung Nguyen
(74) *Attorney, Agent, or Firm* — K&L Gates LLP

(57) ABSTRACT

A color liquid crystal display device assembly includes a color liquid crystal display device in which pixels each including at least a first subpixel, a second subpixel, and a third subpixel are arranged in a two-dimensional matrix, and a planar light source device which has light sources emitting first primary light corresponding to a first primary color of the light three primary colors and illuminating the color liquid crystal display device, and the liquid crystal display device has (A) second primary light emitting regions which emit second primary light when excited by the first primary light passing through the second subpixel, (B) third primary light emitting regions which emit third primary light when excited by the first primary light passing through the third subpixel, and (C) diffusion regions which diffuse the first primary light emitted from the light sources and passing through each first subpixel.

20 Claims, 17 Drawing Sheets

FOREIGN PATENT DOCUMENTS

| | | |
|---|---|---|
| JP | 63-187120 | 11/1988 |
| JP | 2002-131552 | 5/2002 |
| JP | 2002-277870 | 9/2002 |
| JP | 2007-4099 | 1/2007 |
| WO | 95/27920 | 10/1995 |

* cited by examiner

VALUE OBTAINED BY RAISING DRIVE SIGNAL TO POWER OF 2.2
($x' \equiv x^{2.2}$)

VALUE OF CONTROL SIGNAL (X)

COLOR LIQUID CRYSTAL DISPLAY DEVICE ASSEMBLY

CROSS REFERENCES TO RELATED APPLICATIONS

The present application claims priority related to Japanese Patent Application JP 2007-286616 filed in the Japanese Patent Office on Nov. 2, 2007, the entire contents of which are incorporated herein by reference.

BACKGROUND

The present application relates to a color liquid crystal display device assembly.

As a color liquid crystal display device assembly, a color liquid crystal display device assembly has been available that is formed of a transmission type color liquid crystal display device and a planar light source device disposed thereunder so as to illuminate the color liquid crystal display device, the color liquid crystal display device being composed of two panels and a liquid crystal material provided therebetween, the two panels being formed of two transparent glass substrates which face each other and which are provided with transparent electrodes, alignment films, and the like laminated to each other.

As the planar light source device, there have been available two types of planar light source devices (backlights), that is, a direct-lighting type planar light source device disclosed, for example, in Japanese Unexamined Utility Model Registration Application Publication No. 63-187120 and Japanese Unexamined Patent Application Publication No. 2002-277870, and an edge light type (also called a side light type) planar light source device disclosed, for example, in Japanese Unexamined Patent Application Publication No. 2002-131552. The direct-lighting type planar light source device is, as shown in a schematic view of FIG. 17A, formed of light sources 600 disposed in a housing 602, a reflection member 603 which is disposed on a part of the housing 602 located under the light sources 600 and which reflects light emitted therefrom to an upper side, and a diffusion plate 601 which is fitted to an opening portion of the housing 602 located above the light sources 600 and which diffuses the light emitted from the light sources 600 and light reflected by the reflection member 603 and allows them to pass therethrough. On the other hand, the edge light type planar light source device is formed, as shown in a schematic view of FIG. 17B, of an optical guide plate 701 and a light source 700 composed of a lamp disposed at a side surface of the optical guide plate 701. In addition, under the optical guide plate 701, a reflection member 702 is disposed, and above the optical guide plate 701, a diffusion sheet 703 and a prism sheet 704 are disposed.

The light source is formed, for example, of a cold cathode fluorescent lamp and emits white light. In more particular, in the cold cathode fluorescent lamp, a mixture of inert gases, such as neon, argon, and the like, is filled, and/or mercury is filled and diffused. In addition, red light emitting phosphor particles, green light emitting phosphor particles, and blue light emitting phosphor particles, which are applied to an inner surface of a glass tube forming the fluorescent lamp, are excited by ultraviolet rays emitted from the inert gas mixture and/or mercury atoms excited due to glow discharge, and white light is obtained from luminescent colors of the above phosphor particles.

In addition, a color liquid crystal display device assembly in which phosphor layers are excited by blue light emitted from a light source to generate red light and green light so as to obtain an image has been available and disclosed, for example, in Japanese Unexamined Patent Application Publication No. 2007-4099. The color liquid crystal display device assembly disclosed in the above document includes a color liquid crystal display device formed of a front panel and a rear panel and a planar light source device having at least one light source illuminating the color liquid crystal display device from a rear panel side. In addition, the phosphor layers are provided on the exterior surface of the front panel or are provided on the exterior surface of the rear panel facing the planar light source device.

SUMMARY

In the direct-lighting type planar light source device, since white light is emitted from a fluorescent lamp, for example, when a red color is displayed in a color liquid crystal display device, a process is performed in which white light is made to pass through a color filter to extract a red color from the white color, and a green color and a blue color forming the white color emitted from the fluorescent lamp are discarded in a sense. Accordingly, since an effective utilization ratio of light flux emitted from the fluorescent lamp (the ratio of light guided to the color liquid crystal display device and emitted therefrom among the light flux generated from the fluorescent lamp) is low, it has been desired to further increase the effective utilization ratio of light flux.

In addition, according to the technique disclosed in Japanese Unexamined Patent Application Publication No. 2007-4099, since the phosphor layers are provided on the exterior surface of the front panel, the distance from the phosphor layer to a liquid crystal cell formed of two panels and a liquid crystal material provided therebetween is large, and as a result, parallax is disadvantageously liable to occur. In addition, since the phosphor layers are provided on the exterior surface of the rear panel facing the planar light source device, optical crosstalk in which light emitted from some phosphor layer is incident on a liquid crystal cell adjacent to a corresponding liquid crystal cell may occur in some cases.

Accordingly, it is desirable to provide a color liquid crystal display device assembly in which a high effective utilization ratio of light flux emitted from a light source is obtained and, furthermore, in which parallax and optical crosstalk are not likely to occur.

A color liquid crystal display device assembly according to an embodiment includes:
  a color liquid crystal display device including
    (a-1) a front panel including a first substrate having a first surface and a second surface and a transparent first electrode formed on the first surface of the first substrate;
    (a-2) a rear panel including a second substrate having a first surface and a second surface and transparent second electrodes formed on the first surface of the second substrate; and
    (a-3) a liquid crystal material disposed between the first surface of the first substrate and the first surface of the second substrate, in which pixels each including at least a first subpixel, a second subpixel, and a third subpixel are arranged in a two-dimensional matrix; and
  (b) a planar light source device which is disposed at a rear panel side and which has light sources illuminating the color liquid crystal display device from the rear panel side.

In addition, in the color liquid crystal display device assembly according to the first embodiment of the present invention, the light sources emit first primary light corresponding to a first primary color of the light three primary colors formed of the first primary color, a second primary color, and a third primary color, and the front panel further includes (A) second primary light emitting regions each disposed between a part of the first surface of the first substrate and a part of the transparent first electrode, both of which correspond to each second subpixel, composed of second primary light emitting particles emitting second primary light corresponding to the second primary color, and emitting the second primary light when excited by the first primary light emitted from the light sources and passing through each second subpixel;

(B) third primary light emitting regions each disposed between a part of the first surface of the first substrate and a part of the transparent first electrode, both of which correspond to each third subpixel, composed of third primary light emitting particles emitting third primary light corresponding to the third primary color, and emitting the third primary light when excited by the first primary light emitted from the light sources and passing through each third subpixel; and (C) diffusion regions each disposed between a part of the first surface of the first substrate and a part of the transparent first electrode, both of which correspond to each first subpixel, and diffusing the first primary light emitted from the light sources and passing through each first subpixel.

In the color liquid crystal display device assembly according to a first embodiment, a light reflection film reflecting the second primary light and the third primary light may be provided between the transparent first electrode and the second primary light emitting regions, the third primary light emitting regions, and the diffusion regions. In addition, in this case, a first polarizing film (first polarizing plate) is preferably disposed between the light reflection film and the transparent first electrode. The light reflection film reflects the second primary light and the third primary light and transmits the first primary light. Since the light reflection film reflecting the second primary light and the third primary light is provided as described above, the second primary light and the third primary light emitted from the second primary light emitting regions and the third primary light emitting regions, respectively, are prevented from entering the second subpixels and the third subpixels and are efficiently emitted from the second surface of the first substrate, so that a bright and clear image can be obtained. The same effect as described above can also be obtained in the following embodiments of the present invention. In addition, a smoothing film is more preferably disposed between the light reflection film and the second primary light emitting regions, the third primary light emitting regions, and the diffusion regions. When the smoothing film is provided as described above, irregularities of the surfaces of the second primary light emitting regions, the third primary light emitting regions, and the diffusion regions and difference in thickness therebetween can be absorbed, and the second primary light and the third primary light can be more efficiently returned to a second primary light emitting region side and a third primary light emitting region side.

In addition, in the color liquid crystal display device assembly according to a first embodiment including the above preferable structure, first light focusing members focusing the first primary light on the diffusion regions, second light focusing members focusing the second primary light on the second primary light emitting regions, and third light focusing members focusing the third primary light on the third primary light emitting regions are preferably further provided between the transparent first electrode and the second primary light emitting regions, the third primary light emitting regions, and the diffusion regions. As a result, generation of parallax and generation of optical crosstalk can be reliably prevented. In this case, the first light focusing members, the second light focusing members, and the third light focusing members may be formed of integrated lens arrays, lenticular lenses, or microlens arrays including many arranged graded index lenses. As a lens array formed of many arranged graded index lenses, Selfoc Lens Array (registered trade name of Nippon Sheet Glass Co., Ltd.) has been available.

In the color liquid crystal display device assembly according to the first embodiment of the present invention including the above preferable composition and structure, a color filter may be disposed between the first surface of the first substrate and the second primary light emitting regions, the third primary light emitting regions, and the diffusion regions, and by this structure, the color purity of an image displayed in the color liquid crystal display device assembly can be further improved. In addition, in this case, between the color filter and the second primary light emitting regions, the third primary light emitting regions, and the diffusion regions, first light focusing members focusing the first primary light passing through the diffusion regions on the color filter, second light focusing members focusing the second primary light emitted in the second primary light emitting regions on the color filter, and third light focusing members focusing the third primary light emitted in the third primary light emitting regions on the color filter are preferably provided. As a result, generation of parallax and generation of optical crosstalk can be reliably prevented. In addition, the first light focusing members, the second light focusing members, and the third light focusing members may be formed of integrated lens arrays, lenticular lenses, or microlens arrays including many arranged graded index lenses. A smoothing film may be provided between the color filter and the first light focusing members, the second light focusing members, and the third light focusing members.

In addition, the color liquid crystal display device assembly according to the second embodiment of the present invention further includes (c) a third substrate having a first surface facing the front panel and a second surface facing the first surface, in which the light sources emit first primary light corresponding to a first primary color of the light three primary colors formed of the first primary color, a second primary color, and a third primary color, and the color liquid crystal display device further includes (A) second primary light emitting regions each disposed between a part of the second surface of the first substrate and a part of the first surface of the third substrate, both of which correspond to each second subpixel, composed of second primary light emitting particles emitting second primary light corresponding to the second primary color, and emitting the second primary light when excited by the first primary light emitted from the light sources and passing through each second subpixel;

(B) third primary light emitting regions each disposed between a part of the second surface of the first substrate and a part of the first surface of the third substrate, both of which correspond to each third subpixel, composed of third primary light emitting particles emitting third primary light corresponding to the third primary color, and emitting the third primary light when excited by the first primary light emitted from the light sources and passing through each third subpixel; and (C) diffusion regions each disposed between a part of the second surface of the first substrate and a part of the first surface of the third substrate, both of which correspond to each first subpixel, and diffusing the first primary light emitted from the light sources and passing through each first subpixel.

In the color liquid crystal display device assembly according to a second embodiment, a light reflection film reflecting the second primary light and the third primary light may be disposed between the second surface of the first substrate and the second primary light emitting regions, the third primary light emitting regions, and the diffusion regions. In this case, a first polarizing film (first polarizing plate) is preferably disposed between the light reflection film and the second surface of the first substrate. The light reflection film reflects the second primary light and the third primary light and transmits the first primary light. In addition, between the light reflection film and the second primary color emitting regions, the third primary color emitting regions, and the diffusion regions, a smoothing film is more preferably disposed. Since the smoothing film is provided as described above, irregularities of the surfaces of the second primary light emitting regions, the third primary light emitting regions, and the diffusion regions and the difference in thickness therebetween can be absorbed, and as a result, the second primary light and the third primary light can be more efficiently returned to a second primary light emitting region side and a third primary light emitting region side.

In addition, in the color liquid crystal display device assembly according to a second embodiment including the above preferable structure, first light focusing members focusing the first primary light on the diffusion regions, second light focusing members focusing the first primary light on the second primary light emitting regions, and third light focusing members focusing the first primary light on the third primary light emitting regions are preferably further provided between the second surface of the first substrate and the second primary light emitting regions, the third primary light emitting regions, and the diffusion regions. As a result, generation of parallax and generation of optical crosstalk can be reliably prevented. In this case, the first light focusing members, the second light focusing members, and the third light focusing members may be formed of integrated lens arrays, lenticular lenses, or microlens arrays including many arranged graded index lenses.

In the color liquid crystal display device assembly according to a second embodiment including the above preferable composition and structure, a color filter may be disposed between the first surface of the third substrate and the second primary light emitting regions, the third primary light emitting regions, and the diffusion regions, and by this structure, the color purity of an image displayed in the color liquid crystal display device assembly can be further improved. In addition, in this case, between the second surface of the first substrate and the second primary light emitting regions, the third primary light emitting regions, and the diffusion regions, first light focusing members focusing the first primary light on the diffusion regions, second light focusing members focusing the second primary light on the second primary light emitting regions, and third light focusing members focusing the third primary light on the third primary light emitting regions are preferably further provided. As a result, generation of parallax and generation of optical crosstalk can be reliably prevented. In addition, the first light focusing members, the second light focusing members, and the third light focusing members may be formed of integrated lens arrays, lenticular lenses, or microlens arrays including many arranged graded index lenses. A smoothing film may be provided between the color filter and the light focusing members, the second light focusing members, and the third light focusing members.

In addition, in the color liquid crystal display device assembly according to a second embodiment including the above various preferable compositions and structure, the thickness of the first substrate is 0.2 mm or less and preferably, for example, in the range of 0.05 to 0.1 mm. When the thickness of the first substrate is decreased as described above, generation of optical crosstalk in which light emitted from a subpixel (liquid crystal cell) is incident on a light emitting region adjacent to a corresponding light emitting region can be more reliably prevented.

In the color liquid crystal display device assembly according to an embodiment including the various preferable compositions and structures described above, although an arbitrary liquid crystal control mode may be basically used, a control mode having a wide viewing angle characteristic, such as an IPS mode or a VA mode, is not particularly necessary, and for example, an inexpensive TN control mode or STN control mode based, for example, on the structure of a TN (Twisted Nematic) arrangement or an STN (Super Twisted Nematic) arrangement may be used.

In the color liquid crystal display device assembly according to the third embodiment, the light sources emit first primary light corresponding to a first primary color of the light three primary colors formed of the first primary color, a second primary color, and a third primary color, and the rear panel further includes (A) second primary light emitting regions disposed between parts of the first surface of the second substrate corresponding to each second subpixel and respective transparent second electrodes, composed of second primary light emitting particles emitting second primary light corresponding to the second primary color, and emitting the second primary light when excited by the first primary light emitted from the light sources to illuminate each second subpixel;

(B) third primary light emitting regions disposed between parts of the first surface of the second substrate corresponding to each third subpixel and respective transparent second electrodes, composed of third primary light emitting particles emitting third primary light corresponding to the third primary color, and emitting the third primary light when excited by the first primary light emitted from the light sources to illuminate each third subpixel;

(C) second light focusing members disposed between the second primary light emitting regions and respective transparent second electrodes and focusing the second primary light emitted in the second primary light emitting regions on each second subpixel; and (D) third light focusing members disposed between the third primary light emitting regions and respective transparent second electrodes and focusing the third primary light emitted in the third primary light emitting regions on each third subpixel.

In the color liquid crystal display device assembly according to the third embodiment, first light focusing members disposed between the first surface of the second substrate and respective transparent second electrodes and focusing the first primary light emitted from the light sources on each first subpixel are preferably further provided. In addition, in this case, the first light focusing members, the second light focusing members, and the third light focusing members may be formed of integrated lens arrays, lenticular lenses, or the microlens arrays including many arranged graded index lenses. In addition, between the transparent second electrodes and the first light focusing members, the second light focusing members, and the third light focusing members, a second polarizing film (second polarizing plate) is preferably disposed. When a smoothing film is disposed between the second polarizing film and the first light focusing members, the second light focusing members, and the third light focusing members, irregularities of the surfaces of the first light focusing members, the second light focusing members, and the third light focusing members and the difference in thickness therebetween can be absorbed.

In addition, in the color liquid crystal display device assembly according to the third embodiment including the various preferable compositions and structures described above, a light reflection film reflecting the second primary light and the third primary light is preferably disposed between the first surface of the second substrate and the second primary light emitting regions and the third primary light emitting regions. The reflection film reflects the second primary light and the third primary light and transmits the first primary light. Since the light reflection film is provided, the second primary light and the third primary light can be efficiently returned to a second primary light emitting region side and a third primary light emitting region side.

In addition, in the color liquid crystal display device assembly according to the third embodiment including the various preferable compositions and structures described above, a color filter may be disposed between the first surface of the first substrate and the transparent first electrode, and accordingly, the color purity of an image displayed in the color liquid crystal display device assembly can be further improved.

The color liquid crystal display device assembly according to the fourth embodiment further includes:

(c) a third substrate disposed between the rear panel and the planar light source device and having a first surface facing the rear panel and a second surface facing the planar light source device, in which the light sources emit first primary light corresponding to a first primary color of the light three primary colors formed of the first primary color, a second primary color, and a third primary color. In addition, the color liquid crystal display device further includes:

(A) second primary light emitting regions each disposed between a part of the first surface of the third substrate and a part of the second surface of the second substrate, both of which correspond to each second subpixel, composed of second primary light emitting particles emitting second primary light corresponding to the second primary color, and emitting the second primary light when excited by the first primary light emitted from the light sources to illuminate each second subpixel; and (B) third primary light emitting regions each disposed between a part of the first surface of the third substrate and a part of the second surface of the second substrate, both of which correspond to each third subpixel, composed of third primary light emitting particles emitting third primary light corresponding to the third primary color, and emitting the third primary light when excited by the first primary light emitted from the light sources to illuminate each third subpixel.

In the color liquid crystal display device assembly according to the fourth embodiment, there are further provided, (C) second light focusing members disposed between the first surface of the third substrate and the second surface of the second substrate and focusing the second primary light emitted in the second primary light emitting regions on each second subpixel, and (D) third light focusing members disposed between the first surface of the third substrate and the second surface of the second substrate and focusing the third primary light emitted in the third primary light emitting regions on each third subpixel.

In the color liquid crystal display device assembly according to the fourth embodiment including the above preferable structure, first light focusing members disposed between the first surface of the third substrate and the second surface of the second substrate and focusing the first primary light emitted from the light sources on each first subpixel are preferably further provided. In addition, in this case, the first light focusing members, the second light focusing members, and the third light focusing members may be formed of integrated lens arrays, lenticular lenses, or microlens arrays including many arranged graded index lenses. Furthermore, between the second surface of the second substrate and the first light focusing members, the second light focusing members, and the third light focusing members, a second polarizing film (second polarizing plate) is preferably disposed. In addition, when a smoothing film is disposed between the second polarizing film and the first light focusing members, the second light focusing members, and the third light focusing members, irregularities of the surfaces of the first light focusing members, the second light focusing members, and the third light focusing members can be absorbed.

In the color liquid crystal display device assembly according to the fourth embodiment including the various preferable compositions and structures described above, a light reflection film reflecting the second primary light and the third primary light is preferably disposed between the first surface of the third substrate and the second primary light emitting regions and the third primary light emitting regions. The light reflection film reflects the second primary light and the third primary light and transmits the first primary light. Since the light reflection film is provided, the second primary light and the third primary light can be effectively returned to a second primary light emitting region side and a third primary light emitting region side. In addition, in terms of simplification of the structure, it is also preferable to provide a light reflection film between the first surface of the third substrate and regions which allow the first primary light emitted from the light sources to pass therethrough (called first primary light passing regions) to the first subpixels.

In addition, in the color liquid crystal display device assembly according to the fourth embodiment including the preferable various compositions and structures described above, the thickness of the second substrate is set to 0.2 mm or less and is preferably, for example, 0.05 to 0.1 mm. When the thickness of the second substrate is decreased as described above, generation of optical crosstalk in which light emitted from the second primary light emitting region or the third primary light emitting region enters a subpixel (liquid crystal cell) adjacent to a corresponding subpixel (liquid crystal cell) can be more reliably prevented.

Furthermore, in the color liquid crystal display device assembly according to the fourth embodiment including the various preferable compositions and structures described above, a color filter is preferably provided between the first surface of the first substrate and the transparent first electrode. As a result, the color purity of an image displayed in the color liquid crystal display device assembly can be further improved.

In the color liquid crystal display device assembly according to embodiment including the various preferable compositions and structures described above, although an arbitrary liquid crystal control mode may be substantially used, a control mode having a wide viewing angle characteristic, such as an IPS mode or a VA mode, is preferably used. In addition, the first primary light passing regions may be filled with a transparent resin or may not be filled.

In the color liquid crystal display device assembly according to embodiment including the various preferable compositions and structures described above, the light sources may be each formed of a light emitting diode, a fluorescent lamp, an electroluminescent light emitting device, or a plasma light emitting device, which emits blue light (for example, having a wavelength λ1 of 440 to 460 nm) as the first primary light, and the second primary light and the third primary light are green and red, respectively.

In the color liquid crystal display device assembly according to an embodiment including the various preferable compositions and structures described above (hereinafter collectively referred to as "the color liquid crystal display device assembly of the present invention" in some cases), the first subpixel (corresponding to the first liquid crystal cell), the second subpixel (corresponding to the second liquid crystal cell), and the third subpixel (corresponding to the third liquid crystal cell) are each formed of a liquid crystal material provided between the transparent first electrode and the transparent second electrode.

In the color liquid crystal display device assembly of the present application, the size of the diffusion region or the first primary light passing region may be equal to, larger than, or smaller than that of a part of the first subpixel through which light actually passes. In addition, the exterior shape of the diffusion region or the first primary light passing region may be equal to, similar to, or different from that of the part of the first subpixel through which light actually passes. The size of the second primary light emitting region may be equal to, larger than, or smaller than that of a part of the second subpixel through which light actually passes. In addition, the exterior shape of the second primary light emitting region may be equal to, similar to, or different from that of the part of the second subpixel through which light actually passes. The size of the third primary light emitting region may be equal to, larger than, or smaller than that of a part of the third subpixel through which light actually passes. In addition, the exterior shape of the third primary light emitting region may be equal to, similar to, or different from that of the part of the third subpixel through which light actually passes.

In the color liquid crystal display device assembly of the present invention, as the first, the second, and the third substrates, for example, a glass substrate, a glass substrate provided with an insulating film on the surface thereof, a quartz substrate, a quartz substrate provided with an insulating film on the surface thereof, or a semiconductor substrate provided with an insulating film on the surface thereof may be mentioned; however, in terms of reduction in manufacturing cost, a glass substrate or a glass substrate provided with an insulating film on the surface thereof is preferably used. As the glass substrate, a high strain point glass, soda glass ($Na_2O \cdot CaO \cdot SiO_2$), borosilicate glass ($Na_2O \cdot B_2O_3 \cdot SiO_2$), forsterite ($2MgO \cdot SiO_2$), lead glass ($Na_2O \cdot PbO \cdot SiO_2$), or non-alkali glass may be mentioned by way of example. Alternatively, an organic polymer (such as a high molecular weight material having a flexibility in the form of a plastic film, a plastic sheet, or a plastic substrate) such as poly(methyl methacrylate) (PMMA)), poly(vinyl alcohol) (PVA), poly(vinyl phenol) (PVP), poly(ether sulfone) (PES), polyimide, polycarbonate (PC), or poly(ethylene terephthalate) (PET) may also be mentioned by way of example.

In the color liquid crystal display device assembly of the present invention, the transparent first electrode (also called a common electrode) and the transparent second electrode (also called a pixel electrode) may be formed of a related material, such as ITO, and pattern of the transparent first electrode and that of the transparent second electrodes may be determined in accordance with the specification necessary for the color liquid crystal displayer device.

In the color liquid crystal display device assembly of the present invention, one pixel may include at least the first subpixel, the second subpixel, and the third subpixel and may further include a fourth subpixel, a fifth subpixel, and so on. Colors to be displayed, for example, by the fourth and the fifth subpixels may be determined based on the specification necessary for the color liquid crystal display device and for example, a white color for improving the luminance, a complementary color for expanding a color reproduction range, and a yellow, a cyan, and a magenta color for expanding a color reproduction range may be mentioned. As an arrangement state of subpixels, for example, a delta arrangement, a stripe arrangement, a diagonal arrangement, or a rectangular arrangement may be mentioned. In the color liquid crystal display device assembly according to the first embodiment of the present invention, an i-th light emitting region (i=4, 5, - - - ) is disposed between a part of the first surface of the first substrate and a part of the transparent first electrode, both of which correspond to an i-th subpixel, is composed of light emitting particles emitting light corresponding to an i-th color, and emits light corresponding to the i-th color when excited by the first primary light emitted from the light source and passing through the i-th subpixel. In the color liquid crystal display device assembly according to the second embodiment of the present invention, an i-th light emitting region (i=4, 5, - - - ) is disposed between a part of the second surface of the first substrate and a part of the first surface of the third substrate, both of which correspond to an i-th subpixel, is composed of light emitting particles emitting light corresponding to an i-th color, and emits light corresponding to the i-th color when excited by the first primary light emitted from the light source and passing through the i-th subpixel. In the color liquid crystal display device assembly according to the third embodiment of the present invention, an i-th light emitting region (i=4, 5, - - - ) is disposed between a part of the first surface of the second substrate and a transparent second electrode, both of which correspond to an i-th subpixel, is composed of light emitting particles emitting light corresponding to an i-th color, and emits light corresponding to the i-th color when excited by the first primary light emitted from the light source and illuminates the i-th subpixel. In the color liquid crystal display device assembly according to the fourth embodiment of the present invention, an i-th light emitting region (i=4, 5, - - - ) is disposed between a part of the first surface of the third substrate and a part of the second surface of the second substrate, both of which correspond to an i-th subpixel, is composed of light emitting particles emitting light corresponding to an i-th color, and emits light corresponding to the i-th color when excited by the first primary light emitted from the light source and illuminates the i-th subpixel.

In the color liquid crystal display device assembly of the present application, the light sources are each formed, for example, of a light emitting diode (LED) emitting blue light as the first primary light, as described above; however, the light emitting diode described above may be formed of a related light emitting diode. In addition, as a fluorescent lamp emitting blue light as the first primary light, for example, a cold cathode fluorescent lamp (CCFL), a hot cathode fluorescent lamp (HCFL), or an external electrode fluorescent lamp (EEFL) may be mentioned. Furthermore, as an electroluminescent light emitting device emitting blue light as the first primary light, for example, an organic or an inorganic electroluminescent light emitting device may be mentioned. The number of light emitting diodes (LEDs), fluorescent lamps, or the electroluminescent light emitting devices is basically arbitrarily selected and may be determined in accordance with the specification necessary for the planar light source device. Instead of the light emitting diode, a semiconductor laser may also be used.

The light emitting diode may have a so-called face-up structure or a flip-chip structure. That is, the light emitting diode is formed of a substrate and a light emitting layer formed thereon and may have a structure in which light is emitted outside from the light emitting layer or a structure in which light from the light emitting layer is emitted outside through the substrate. In more particular, the light emitting diode has a structure including, for example, a first compound semiconductor layer formed of a compound semiconductor having a first conduction type (such as an n type) provided on a substrate, an active layer formed on the first compound semiconductor layer, and a second compound semiconductor layer formed of a compound semiconductor having a second conduction type (such as a p-type) provided on the active layer, and the light emitting diode also has a first electrode electrically connected to the first compound semiconductor layer and a second electrode electrically connected to the second compound semiconductor layer. The layers forming the light emitting diode may be formed from related compounds semiconductor in consideration of the light emission wavelength.

In the color liquid crystal display device assembly of the present application, the first primary color, the second primary color, and the third primary color are preferably set to blue, green, and red, respectively, as described above. However, the primary colors are not limited to those described above, and the first primary color, the second primary color, and the third primary color may be set to red, green and blue, or green, red, and blue, respectively.

In the color liquid crystal display device assembly of the present application, when phosphor particles emitting a green color are used as the second primary light emitting particles, as the green light emitting phosphor substance, for example, (ME:Eu)Ga$_2$S$_4$, (M:RE)×(Si,Al)$_{12}$(O,N)$_{16}$, (M:Tb)×(Si,Al)$_{12}$(O,N)$_{16}$, (M:Yb)×(Si,Al)$_{12}$(O,N)$_{16}$, LaPO$_4$:Ce,Tb, BaMgAl$_{10}$O$_{17}$:Eu,Mn, Zn$_2$SiO$_4$:Mn, MgAl$_{11}$O$_{19}$:Ce,Tb, Y$_2$SiO$_5$:Ce,Tb, MgAl$_{11}$O$_{19}$:Ce,Tb,Mn or (Sr,Ba)$_2$SiO$_4$:Eu may be mentioned. When phosphor particles emitting a red color are used as the third primary light emitting particles, as the red light emitting phosphor substance, for example, (ME:Eu)S, (ME:Sm)×(Si,Al)$_{12}$(O,N)$_{16}$, ME$_2$Si$_5$N$_8$:Eu, (Ca:Eu)SiNi$_2$, (Ca:Eu)AlSiN$_3$, Y$_2$O$_3$:Eu, YVO$_4$:Eu, Y(P,V)O$_4$:Eu, 3.5MgO.0.5MgF$_2$.Ge$_2$:Mn, CaSiO$_3$:Pb,Mn, Mg$_6$AsO$_{11}$:Mn, (Sr,Mg)$_3$(PO$_4$)$_3$:Sn, La$_2$O$_2$S:Eu, or Y$_2$O$_2$S:Eu may be mentioned. In this case, "ME" indicates at least one atom selected from the group consisting of Ca, Sr, and Ba; "M" indicates at least one atom selected from the group consisting of Li, Mg, and Ca; and "RE" indicates Tb or Yb. In some cases, for example, a cyan color may be used, and in this case, a mixture of green light emitting phosphor particles (such as LaPO$_4$:Ce,Tb, BaMgAl$_{10}$O$_{17}$:Eu,Mn, Zn$_2$SiO$_4$:Mn, MgAl$_{11}$O$_{19}$:Ce,Tb, Y$_2$SiO$_5$:Ce,Tb, or MgAl$_{11}$O$_{19}$:Ce,Tb,Mn) and blue light emitting phosphor particles (such as BaMgAl$_{10}$O$_{17}$:Eu, BaMg$_2$Al$_{16}$O$_{27}$:Eu, Sr$_2$P$_2$O$_7$:Eu, Sr$_5$(PO$_4$)$_3$Cl:Eu, (Sr, Ca, Ba Mg)$_5$(PO$_4$)$_3$Cl:Eu, CaWO$_4$, or CaWO$_4$:Pb) may be used.

The second primary light emitting regions and the third primary light emitting regions composed of phosphor particles may be formed using phosphor particle compositions formed from the phosphor particles, for example, by the steps of applying a red-color photosensitive phosphor particle composition (red light emitting phosphor slurry) on an entire surface, followed by exposure and development to form the third primary light emitting regions each composed of a red light emitting phosphor layer, and applying a green-color photosensitive phosphor particle composition (green light emitting phosphor slurry) on the entire surface, followed by exposure and development to form the second primary light emitting regions each composed of a green light emitting phosphor layer. In addition, the formation of the third primary light emitting regions and that of the second primary light emitting regions may be performed in a reverse order. Alternatively, after the red light emitting phosphor slurry and the green light emitting phosphor slurry are applied in this order, the individual phosphor slurries are sequentially processed by exposure and development, so that the third primary light emitting regions and the second primary light emitting regions may be formed, or by a screen printing method, an inkjet printing method, a float coating method, a precipitation coating method, a phosphor film transfer method, or the like, the second primary light emitting regions and the third primary light emitting regions may be formed.

However, materials forming the second and the third primary light emitting regions are not limited to the light emitting phosphor particles, and for example, among indirect transition type silicon-based materials, light emitting particles using a quantum well structure, such as a two-dimensional quantum well structure, a one-dimensional quantum well structure, a zero-dimensional quantum well structure (quantum wire), in which wave functions of carriers are localized in order to efficiently convert the carriers into light like a direct transition type, may also be mentioned. In addition, since it has been understood that a rare earth atom added to a semiconductor material sharply emits light due to intra-shell transition, light emitting particles using the technique described above may also be mentioned by way of example.

In the color liquid crystal display device assembly according to an embodiment, the diffusion region may be composed, for example, of a transparent binder resin and a light diffusing agent of fine particles dispersed therein, and may be formed, for example, by various coating methods, such as a screen printing method and an inkjet printing method. The light diffusing agent is in the form of particles to diffuse light emitted from a light source and is composed of inorganic or organic material particles. As an inorganic material forming the inorganic material particles, for example, silica, aluminum hydroxide, aluminum oxide, titanium oxide, zinc oxide, barium sulfate, magnesium silicate, or a mixture thereof may be mentioned by way of example. In addition, as a resin forming the organic material particles, an acrylic-based resin, an acrylonitrile-based resin, a polyurethane-based resin, a poly(vinyl chloride)-based resin, a polystyrene-based resin, a polyamide-based resin, a polysiloxane-based resin, or a melamine-based resin may be mentioned by way of example. As the form of the light diffusing agent, for example, a spherical, a cubic, a needle, a stick, a spindle, a plate, a scale, and a fiber shape may be mentioned. In some cases, the diffusion region may be formed of a light diffusion sheet (light diffusion film). In addition, the light diffusion sheet (light diffusion film) mentioned above may be extended between the second primary light emitting regions and the first surface of the first substrate or the third substrate and between the third primary light emitting regions and the first surface of the first substrate or the third substrate. The transparent binder resin may be appropriately selected from a related thermosetting resin, UV curable resin, and thermoplastic resin.

The light reflection film may be formed of a silicon oxide film, a niobium oxide film, of a multilayer film (for example, including a silicon oxide film and a niobium oxide film) composed of a low refractive index material and a high refractive index material and may be formed, for example, by various coating methods and physical vapor deposition methods such as a sputtering method, or by laminating a film-shaped light reflection material. The smoothing film may be formed, for example, using an acrylic resin or a silicone resin and may be formed, for example, by various coating methods or by laminating a film-shaped smoothing material. To the exposed front panel and/or the outermost surface of the third substrate, an anti-reflection film (AR film) may be adhered.

The color filter is generally composed of a black matrix (for example, formed of chromium) for shading spaces between color patterns and first, second, and third primary color (such as blue, green, and red) layers facing respective subpixels and is formed by a staining method, a pigment dispersion method, a printing method, an electrodeposition method, or the like. For example, the color layer is formed of a resin material and/or is colored by a pigment. The pattern of the color layer may be formed in conformity with the arrangement state (arrangement pattern) of the subpixels, and for example, a delta arrangement, a stripe arrangement, a diagonal arrangement, or a rectangular arrangement may be mentioned.

In the color liquid crystal display device assembly according to an embodiment, a light absorption layer (so-called black matrix) may be formed between the second primary light emitting regions and the third primary light emitting regions, between the diffusion regions and the second primary light emitting regions, and between the diffusion regions and the third primary light emitting regions, and in addition, in the color liquid crystal display device assembly according to the third or the fourth embodiment of the present invention, a light absorption layer (black matrix layer) may be formed between the second primary light emitting regions and the third primary light emitting regions, between the first primary light passing regions and the second primary light emitting regions, and between the first primary light passing regions and the third primary light emitting regions. As a material forming the light absorption layer, a material absorbing 99% or more of the first primary color, the second primary color, and the third primary color is preferably selected. As the material described above, for example, carbon, a metal thin film, a heat resistance organic resin, or a glass paste may be mentioned, and in particular, a photosensitive polyimide resin, chromium oxide, a laminate film of chromium oxide and chromium may be mentioned by way of example. In consideration of a material to be used, the light absorption layer may be formed, for example, by combination of an etching method with a vacuum deposition method or a sputtering method, combination of a lift-off method with a vacuum deposition method, a sputtering method, or a spin coating method, a screen printing method, or a lithographic technique.

In the color liquid crystal display device of the color liquid crystal display device assembly of an embodiment, a first alignment film is formed on the transparent first electrode, and a second alignment film is formed on the entire surface including the transparent second electrodes. In addition, a switching element is formed on the first surface of each transparent second electrode, and by this switching element, conduction/non-conduction of each transparent second electrode is controlled. Various members forming the color liquid crystal display device may be formed using related members and materials. As the switching element, for example, a three terminal element, such as a MOS FET formed on a single crystal silicon semiconductor substrate or a thin film transistor (TFT), or a two terminal element such as an MIM element, a varistor element, or a diode, may be mentioned. As a drive method of the liquid crystal material, a drive method suitable for a liquid crystal material to be used may be selected.

In the color liquid crystal display device assembly of the present application, as the planar light source device, for example, a direct-lighting type planar light source device or an edge light (side light) type planar light source device may be mentioned. The planar light source device may be provided with an optical functional sheet group including a diffusion sheet, a prism sheet, and a polarization conversion sheet and may be further provided with a reflection sheet. The optical functional sheet group may be formed of various sheets with spaces interposed therebetween or various sheets laminated to each other. The light diffusion sheet and/or the optical functional sheet group is provided between the planar light source device and the color liquid crystal display device. As a material forming the light diffusion sheet, a polycarbonate resin (PC), a polystyrene-based resin (PS), a methacrylate resin, or a cycloolefinic resin, such as "ZEONOR" manufactured by Zeon Corporation, which is a norbornene-based polymeric resin, may be mentioned by way of example.

In the direct-lighting type planar light source device, the planar light source device may be formed of a plurality of planar light source units. That is, when it is assumed that a display area of the color liquid crystal display device is divided into P×Q imaginary display area units, the planar light source device is formed of P×Q planar light source units corresponding to the P×Q display area units, and light sources of the planar light source units may be designed to be independently controlled. In addition, the structure as described above is called a sectional-drive type planar light source device for convenience.

In the sectional-drive type planar light source device, when the light sources are formed of light emitting diodes, a plurality of light emitting diodes is arranged in a housing forming the planar light source device. In one planar light source unit, at least one light emitting diode is disposed. Photo sensors for measuring light emitting states of the light sources (in particular, for example, the luminance, chromaticity, or luminance and chromaticity of the light source) are preferably provided. The number of the photo sensors may be at least one; however, one photo sensor is preferably provided for one planar light source unit in order to perform reliable measurement of the light emitting state of each planar light source unit. As the photo sensor, a related photodiode or a CCD device may be mentioned by way of example.

The planar light source units may be separately formed by using partitions interposed therebetween. By the partition, the transmission, the reflection, or the transmission and reflection of light emitted from the light source forming the planar light source unit is controlled. In this case, one planar light source unit is surrounded by four partitions, three partitions and one side surface of the housing forming the planar light source device, or two partitions and two side surfaces of the housing. As a material forming the partition, for example, an acrylic-based resin, a polycarbonate resin, or an ABS resin may be mentioned. A light diffusion/reflection function or a specular reflection function may be imparted to the partition surface. In order to impart the light diffusion/reflection function to the partition surface, irregularities may be formed on the partition surface by a sand blast method, or a film having irregularities may be adhered to the partition surface. In addition, in order to impart the specular reflection function to the partition surface, a light reflection film may be adhered to the partition surface, or a light reflection layer may be formed on the partition surface by plating.

In the sectional-drive type planar light source device, a light transmittance (also called aperture ratio) Lt of a subpixel, a luminance (display luminance) y of a display area corresponding to a subpixel, and a luminance (light source luminance) Y of the planar light source are defined as follows.

$Y_1$—for example, a maximum luminance of light source luminance, which is hereinafter called light source luminance-first specified value in some cases.

$Lt_1$—for example, a maximum value of the light transmittance (aperture ratio) of a subpixel in a display area unit, which is hereinafter called light transmittance-first specified value in some cases.

$Lt_2$—light transmittance (aperture ratio) of a sub-pixel obtained when it is assumed that when the light source luminance is the light source luminance-first specified value, a control signal is supplied to a subpixel, the control signal being corresponding to a drive signal having a value equal to an intra-display area unit-drive signal maximum value $x_{u\text{-}max}$, which is the maximum value among drive signal values input to a drive circuit to drive all pixels forming a display area unit, which is called light transmittance-second specified value in some cases. In addition, $0 \leq Lt_2 \leq Lt_1$ holds.

$Y_2$—display luminance obtained when it is assumed that the light source luminance is the light source luminance-second specified value $Y_1$ and the light transmittance (aperture ratio) of a subpixel is the light transmittance-second specified value $Lt_2$, which is hereinafter called display luminance-second specified value in some cases.

$Y_2$—light source luminance of a planar light source unit for setting the luminance of a subpixel to the display luminance-second specified value ($y_2$) when it is assumed that a control signal is supplied to the sub-pixel, the control signal being corresponding to a drive signal having a value equal to the intra-display area unit-drive signal maximum value $x_{u\text{-}max}$, and when it is also assumed that the light transmittance (aperture ratio) of the subpixel is corrected to the light transmittance-first specified value $Lt_1$. However, the light source luminance $Y_2$ may be corrected in consideration of the influence of the light source luminance of each planar light source unit on the light source luminance of the other planar light-source units.

During sectional-drive of the planar light source device, in order to obtain the pixel luminance (the display luminance-second specified value $y_2$ at the light transmittance-first specified value $Lt_1$) when it is assumed that the control signal is supplied to the pixel, the control signal being corresponding to a drive signal having a value equal to the intra-display area unit-drive signal maximum value $x_{u\text{-}max}$, the luminance of the light source forming the planar light source unit corresponding to the display area unit is controlled by the drive circuit. In particular, for example, when the light transmittance (aperture ratio) of the subpixel is set to the light transmittance-first specified value $Lt_1$, the light source luminance $Y_2$ may be controlled (for example, may be decreased) so as to obtain the display luminance $y_2$. That is, for example, the light source luminance $Y_2$ of the planar light source unit may be controlled in each frame (referred to as an image display frame) in the image display of the color liquid crystal display device so as to satisfy the following equation (A), where $Y_2 \leq Y_1$ holds.

$$Y_2 \cdot Lt_1 = Y_1 \cdot L_2 \tag{A}$$

The drive circuit includes a planar light source device control circuit and a planar light source unit drive circuit, which are formed, for example, of a pulse width modulation (PWM) signal generating circuit, a duty ratio control circuit, a light emitting diode (LED) drive circuit, a computing circuit, and a storage device (memory), and the drive circuit further includes a liquid crystal display drive circuit which is formed of a related circuit, such as a timing controller.

When it is designed that light emitted from the light emitting diode is directly incident on the color liquid crystal display provided at an upper side, that is, when light from the light emitting diode is emitted exclusively in a Z-axis direction, luminance irregularities may be generated in the planar light source device. As a method for preventing the generation of the phenomenon described above, there may be mentioned a two-dimensional direction light emission structure in which a light emitting diode assembly including a light emitting diode and a light extraction lens attached thereto is used as the light source, and in which part of the light emitted from the light emitting diode is totally reflected at the top face of the light extraction lens so as to be primarily emitted in the horizontal direction of the light extraction lens.

In the edge light type planar light source device, an optical guide plate is provided. As a material for the optical guide plate, for example, a glass or a plastic material (such as polycarbonate resin, an acrylic-based resin, non-crystalline polypropylene-based resin, or a styrene-based resin including AS resin) may be mentioned. The optical guide plate has a first face (bottom face), a second face (top face) facing this first face, a first side face, a second side face, a third side face facing the first side face, and a fourth side face facing the second side face. As a more particular structure of the optical guide plate, a truncated quadrangular pyramid in the form of a wedge may be mentioned, and in this case, two side faces of the truncated quadrangular pyramid facing each other correspond to the first and the second faces, and the bottom face of the truncated quadrangular pyramid corresponds to the first side face. In addition, on a surface portion of the first face (bottom face), convex portions and/or concave portions are preferably provided. The first primary light is incident from the first side face of the optical guide plate and is emitted to the color liquid crystal display device from the second face (top face). In this case, the second face of the optical guide plate may be smooth (that is, may have a mirror surface) or may be crimped by blasting to have a diffusion effect (that is, may be a surface having fine irregularities).

Convex portions and/or concave portions are preferably provided on the first face (bottom face) of the optical guide plate. That is, on the first face of the optical guide plate, convex portions, concave portions, or convex and concave portions are preferably provided. When the convex and concave portions are provided, convex portions and concave portions may be continuously or discontinuously formed. The convex portions and/or the concave portions on the first face of the optical guide plate may be formed to continuously extend in a direction having a predetermined angle with a direction of the first primary light incident on the optical guide plate. In the structure as described above, as a continuous convex or concave cross-sectional shape obtained by cutting the optical guide plate in the direction of the first primary light incident on the optical guide plate and along an imaginary plane perpendicular to the first face, for example, a triangle; an arbitrary quadrangle, such as a regular tetragon, a rectangle, or a trapezium; an arbitrary polygon; or an arbitrary smooth curve, such as a circular shape, an oval figure, a parabola, or a hyperbola, or a catenary, may be mentioned. The direction having a predetermined angle with the direction of the first primary light incident on the optical guide plate indicates a direction having an angle of 60 to 120° when the direction of the first primary light incident on the optical guide plate is assumed to be 0°. The same as described above is also applied in the following case. Alternatively, the convex portions and/or the concave portions on the first face of the optical guide plate may be formed to discontinuously extend in a direction having a predetermined angle with the direction of the first primary light incident on the optical guide plate. In the structure described above, as a discontinuous convex or concave cross-sectional shape, for example, a pyramid, a circular cone, a cylinder, or a polygonal prism, such as a triangular prism or a quadratic prism; or a smooth curved surface, such as part of a sphere, part of a spheroid, part of paraboloid of revolution, or part of a hyperboloid of revolution, may be mentioned. In addition, in some cases, the convex portions and/or the concave portions may not be formed in a peripheral portion of the optical guide plate. Furthermore, although the first primary light emitted from the light source and incident on the optical guide plate collides with the convex portions and/or the concave portions formed on the first face of the optical guide plate and diffuses, the height, depth, pitch, and shape of the convex portions and/or the concave portions formed on the first face of the optical guide plate may not be changed or may be gradually changed from the light source toward a position apart therefrom. In the latter case, for example, the pitch of the convex portions or the concave portions may be decreased from the light source to a position apart therefrom. In this case, the pitch of the convex portions and the pitch of the concave portions indicate the pitch thereof in the direction of the first primary light incident on the optical guide plate.

In the planar light source device including the optical guide plate, a reflection member is preferably provided to face the first face of the optical guide plate. The color liquid crystal display device is provided to face the second face of the optical guide plate. The first primary light emitted from the light source is incident on the first side face of the optical guide plate (for example, corresponding to the bottom face of the truncated quadrangle pyramid), collides with the convex portions or the concave portions on the first face and diffuses, is emitted from the first face, is reflected by the reflection member, is again incident on the first face, and is emitted from the second face so as to illuminate the color liquid crystal display device. For example, a diffusion sheet and/or a prism sheet may be provided between the color liquid crystal display device and the second face of the optical guide plate. In addition, the first primary light emitted from the light source may be directly guided to the optical guide plate or may be indirectly guided thereto. In the latter case, for example, an optical fiber may be used.

When the number $M_0 \times N_0$ of pixels disposed in a matrix is represented by $(M_0, N_0)$, as the $(M_0, N_0)$ value, several pixel display resolutions, such as (1920, 1035), (720, 480), and (1280, 960), may be mentioned besides VGA(640, 480), S-VGA(800, 600), XGA(1024, 768), APRC(1152, 900), S-XGA(1280, 1024), U-XGA(1600, 1200), HD-TV(1920, 1080), Q-XGA(2048, 1536); however, the pixel display resolution is not limited thereto. In addition, when the sectional-drive method is used, the relationship between the $(M_0, N_0)$ value and the $(P, Q)$ value is not particularly limited; however, the relationships shown in the following Table 1 may be mentioned by way of example. As the number of pixels forming one display area unit, 20×20 to 320×240 and preferably 50×50 to 200×200 may be mentioned by way of example. The number of pixels of the display area unit may be fixed or may be changed.

In addition, in the color liquid crystal display device assembly according to the second embodiment of the present invention including the above various preferable compositions and structures, the thickness of the first substrate is 0.2 mm or less and preferably, for example, in the range of 0.05 to 0.1 mm. When the thickness of the first substrate is decreased as described above, generation of optical crosstalk in which light emitted from a subpixel (liquid crystal cell) is incident on a light emitting region adjacent to a corresponding light emitting region can be more reliably prevented.

TABLE 1

|  | P value | Q value |
| --- | --- | --- |
| VGA (640, 480) | 2~32 | 2~24 |
| S-VGA (800, 600) | 3~40 | 2~30 |
| XGA (1024, 768) | 4~50 | 3~39 |
| APRC (1152, 900) | 4~58 | 3~45 |
| S-XGA (1280, 1024) | 4~64 | 4~51 |
| U-XGA (1600, 1200) | 6~80 | 4~60 |
| HD-TV (1920, 1080) | 6~86 | 4~54 |
| Q-XGA (2048, 1536) | 7~102 | 5~77 |
| (1920, 1035) | 7~64 | 4~52 |
| (720, 480) | 3~34 | 2~24 |
| (1280, 960) | 4~64 | 3~48 |

In the color liquid crystal display device assembly according to a first embodiment, the second primary light emitting regions are each disposed between a part of the first surface of the first substrate and a part of the transparent first electrode, both of which correspond to each subpixel, and the third primary light emitting regions are each disposed between a part of the first surface of the first substrate and a part of the transparent first electrode, both of which correspond to each third subpixel. Accordingly, since the distance from the second subpixel to the second primary light emitting region and the distance from the third subpixel to the third primary light emitting region can be decreased, parallax is not likely to occur. In addition, since the diffusion regions diffusing the first primary light passing through each first subpixel are each disposed between a part of the first surface of the first substrate and a part of the transparent first electrode, both of which correspond to each first subpixel, an image based on each first subpixel can be clearly displayed.

In the color liquid crystal display device assembly according to a second embodiment, the second primary light emitting regions are each disposed between a part of the second surface of the first substrate and a part of the first surface of the third substrate, both of which correspond to each second subpixel, and the third primary light emitting regions are each disposed between a part of the second surface of the first substrate and a part of the first surface of the third substrate, both of which correspond to each third subpixel. Accordingly, since the distance from the second subpixel to the second primary light emitting region and the distance from the third subpixel to the third primary light emitting region can be decreased by appropriately selecting the thickness of the first substrate, parallax is not likely to occur. In addition, since the diffusion regions diffusing the first primary light passing through each first subpixel are each disposed between a part of the second surface of the first substrate and a part of the first surface of the third substrate, both of which correspond to each first subpixel, an image based on each first subpixel can be clearly displayed.

In the color liquid crystal display device assembly according to third embodiment, the second primary light emitting regions are disposed between parts of the first surface of the second substrate corresponding to each second subpixel and respective transparent second electrodes, the third primary light emitting regions are disposed between parts of the first surface of the second substrate corresponding to each third subpixel and respective transparent second electrode, and further, the second light focusing members and the third light focusing members are disposed respectively between the second primary light emitting regions and respective transparent second electrodes and between the third primary light emitting regions and respective transparent second electrodes. Accordingly, generation of optical crosstalk in which light emitted from the second or the third primary light emitting region is incident on a subpixel (liquid crystal cell) adjacent to a corresponding subpixel (liquid crystal cell) can be reliably prevented.

In the color liquid crystal display device assembly according to the fourth embodiment of the present invention, the second primary light emitting regions are each disposed between a part of the first surface of the third substrate and a part of the second surface of the second substrate, both of which correspond to each second subpixel, the third primary light emitting regions are each disposed between a part of the first surface of the third substrate and a part of the second surface of the second substrate, both of which correspond to each third subpixel, and further, the second light focusing members and the third light focusing members are disposed between the first surface of the third substrate and the second surface of the second substrate. Accordingly, generation of optical crosstalk in which light emitted from the second or the third primary light emitting region is incident on a subpixel (liquid crystal cell) adjacent to a corresponding subpixel (liquid crystal cell) can be reliably prevented.

In addition, in the color liquid crystal display device assembly according to an embodiment, white light is not emitted from the light sources, but the first primary light is emitted. In addition, unlike a related technique, the second and the third primary light emitting regions emitting the second primary light and the third primary light, respectively, are provided separately from the light sources. Accordingly, a process of the related technique in which desired light is obtained by making white light emitted from a light source pass through a color filter disposed in a color liquid crystal display device is not necessary, and the effective utilization ratio of the first primary light generated in the light source can be improved; hence, the reduction in power consumption of the color liquid crystal display device assembly can be achieved. In addition, the degree of freedom of selecting light emitting particles forming the second and the third primary light emitting regions and the degree of freedom of designing the light emission intensity of the second and the third primary light emitting regions can be improved, and as a result, a color liquid crystal display device assembly having a higher light emission efficiency can be obtained.

In addition, when the sectional-drive type method is used in the planar light source device, and when the luminance of the light source, which forms the planar light source unit corresponding to the display area unit, is controlled by the drive circuit so as to obtain the luminance of a pixel (the display luminance-second specified value $y_2$ at the light transmission-first specified value $Lt_1$) which is obtained when it is assumed that a control signal corresponding to a drive signal having a value equal to the intra-display area unit-drive signal maximum value $x_{U-max}$ is input to the pixel, besides reduction in power consumption of the planar light source device, an increase in white level and/or a decrease in black level is achieved, and a high contrast ratio (on a screen surface of the color liquid crystal display device, a luminance ratio between all black display portions and all white display portions, which includes no outside light and reflected light) can be obtained; hence, the brightness in a desired display area can be emphasized, so that the quality of image display can be improved.

Additional features and advantages are described herein, and will be apparent from the following Detailed Description and the figures.

DETAILED DESCRIPTION

Figure 1:
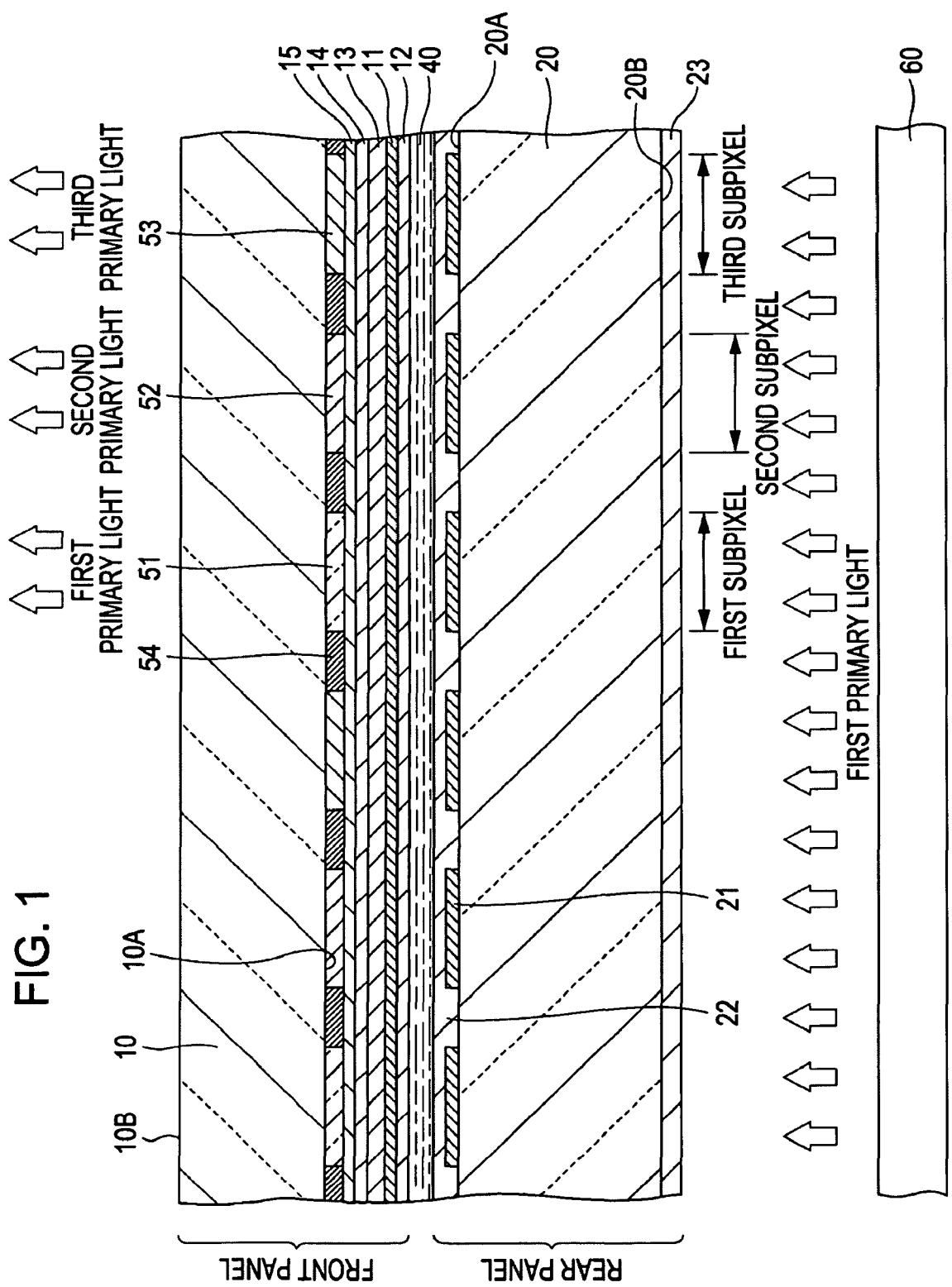
FIG. 1 is a schematic partly cross-sectional view of a color liquid crystal display device assembly according to Example 1.

Hereinafter, with reference to the drawings, the present application will be described based on Examples according to embodiments.

EXAMPLE 1

Example 1 relates to a color liquid crystal display device assembly according to the first embodiment. The color liquid crystal display device assembly according to Example 1 and color liquid crystal display device assemblies according to Examples 2 to 8 which will be described later each include a color liquid crystal display device and a planar light source device 60 which is disposed at a rear panel side so as to face a rear panel (Examples 1 to 6) and which has light sources illuminating the color liquid crystal display device from the rear panel side.

In each of Example 1 and Examples 2 to 8 which will be described later, the color liquid crystal display device (in particular, a transmission type color liquid crystal display device) includes:

(a-1) a front panel including a first substrate 10 having a first surface 10A and a second surface 10B and a transparent first electrode 11 formed on the first surface 10A of the first substrate 10;

(a-2) a rear panel including a second substrate 20 having a first surface 20A and a second surface 20B and transparent second electrodes 21 formed on the first surface 20A of the second substrate 20; and (a-3) a liquid crystal material 40, 140, 240, or 340 disposed between the first surface 10A of the first substrate 10 and the first surface 20A of the second substrate 20. In addition, pixels each include at least a first subpixel, a second subpixel, and a third subpixel are disposed in a two-dimensional matrix (in Examples 1 to 8, a first subpixel, a second subpixel, and a third subpixel form one pixel). The planar light source device 60 will be described later in detail.

In the color liquid crystal display device assembly of Example 1, the light sources emit first primary light corresponding to a first primary color of the light three primary colors formed of the first primary color, a second primary color, and a third primary color. In particular, the light source is formed of a light emitting diode emitting blue light (for example, having a wavelength $\lambda_1$ of 450 nm) as the first primary light, the second primary color is green (for example, having a wavelength $\lambda_2$ of 532 nm), and the third primary color is red (for example, having a wavelength $\lambda_3$ of 654 nm). In Examples 2 to 8 which will be described later, the same structure as described above may be formed.

In addition, as shown in a schematic partly cross-sectional view of FIG. 1, the color liquid crystal display device assembly of Example 1 includes diffusion regions 51, second primary light emitting regions 52, and third primary light emitting regions 53. In this case, the second primary light emitting regions 52 are each disposed between a part of the first surface 10A of the first substrate 10 and a part of the transparent first electrode 11, both of which correspond to each second subpixel (for example, displaying a green color), are composed of second primary light emitting particles emitting second primary light (green light) corresponding to the second primary color (green), and emit the second primary light (green light) when excited by the first primary light (blue light) emitted from the light sources and passing through each second subpixel. In addition, the third primary light emitting regions 53 are each disposed between a part of the first surface 10A of the first substrate 10 and a part of the transparent first electrode 11, both of which correspond to each third subpixel (for example, displaying a red color), are composed of third primary light emitting particles emitting third primary light (red light) corresponding to the third primary color (red), and emit the third primary light (red light) when excited by the first primary light (blue light) emitted from the light sources and passing through each third subpixel. Furthermore, the diffusion regions 51 are each disposed between a part of the first surface 10A of the first substrate 10 and a part of the transparent first electrode 11, both of which correspond to each first subpixel, and diffuse the first primary light (blue light) emitted from the light sources and passing through each first subpixel.

In particular, the second primary light emitting particles include a binder (such as ethyl cellulose or a silicone resin) and sulfide-based phosphor particles or oxide-based phosphor particles, the third primary light emitting particles include a binder (such as ethyl cellulose or a silicone resin) and sulfide-based phosphor particles or oxide-based phosphor particles, and the diffusion regions 51 are formed of a silica powder and a binder (such as ethyl cellulose or a silicone resin). In addition, in regions between the second primary light emitting regions 52 and the third primary light emitting regions 53, regions between the diffusion regions 51 and the second primary light emitting regions 52, and regions between the diffusion regions 51 and the third primary light emitting regions 53, a light absorption layer (black matrix) 54 is formed from a black pigment, such as carbon black, or a black dye. When the number $M_0 \times N_0$ of pixels arranged in a matrix is represented by ($M_{0=}$, $N_0$), the number ($M_0$, $N_0$) is (1,920, 1,080). Hence, the numbers of the first subpixels, second subpixels, and third subpixels are each also $M_0 \times N_0$. The subpixels are disposed in a stripe arrangement. The materials forming the second primary light emitting particles, the third primary light emitting particles, and the light absorption layer (black matrix), the number of pixels, and the arrangement of subpixels described above may also be used in the following Examples 2 to 8.

In the color liquid crystal display device assembly of Example 1, between the transparent first electrode 11 and the second primary light emitting regions 52, the third primary light emitting regions 53, and the diffusion regions 51, a light reflection film 14 reflecting the second primary light and the third primary light is disposed. In addition, between the light reflection film 14 and the transparent first electrode 11, a first polarizing film 13 is disposed. Furthermore, between the light reflection film 14 and the second primary light emitting regions 52, the third primary light emitting regions 53, and the diffusion regions 51, a smoothing film 15 is disposed. The light reflection film 14 is a multilayer film composed of a $SiO_2$ film and an $Nb_2O_5$ film and having a thickness of approximately 1 μm, and the smoothing film 15 is formed of an acrylic resin or a silicone resin having a thickness of several micrometers to several tens of micrometers. The materials forming the light reflection film and the smoothing film described above may also be used in the following Examples 2 to 8.

In each of Example 1 and the following Examples 2 to 4, as a liquid crystal material 40 or 140 forming a liquid crystal layer having a thickness of approximately 2 to 3 μm, a liquid crystal material of a TN or an STN control mode is used. In Example 1, the first substrate 10 having a thickness of approximately 0.7 mm and the second substrate 20 having a thickness of approximately 0.7 mm are each formed of a non-alkali glass; the transparent first electrode (also called a common electrode) 11 and the transparent second electrodes (also called pixel electrodes) 21 are each formed of indium tin oxide (ITO); and the pattern of the transparent first electrode 11 and the pattern of the transparent second electrodes 21 are determined in accordance with the specification necessary for the color liquid crystal display device. On the second surface 20B of the second substrate 20, a second polarizing film 23 is disposed. Alternatively, between the first surface 20A of the second substrate 20 and the transparent second electrodes 21, the second polarizing film 23 may be disposed. Furthermore, a first alignment film 12 is formed on the transparent first electrode 11 (liquid crystal material side), and a second alignment film 22 is formed on an entire surface including the transparent second electrodes 21. Switching elements (not shown) each composed of a TFT are formed on the first surface 20A of the second substrate 20, and by the switching elements, electrical conduction and non-conduction of each transparent second electrode 21 is controlled. The structure and various members of the color liquid crystal display device described above may also be used in the following Example 2 to 8 unless otherwise stated.

In the color liquid crystal display device assembly of Example 1, during the operation of the color liquid crystal display device, the first primary light (blue light) emitted from the light source passes through the second polarizing film 23, the second substrate 20, the first subpixel (first liquid crystal cell formed of the transparent second electrode 21, the second alignment film 22, the liquid crystal material 40, the first alignment film 12, and the transparent first electrode 11), the first polarizing film 13, the light reflection film 14, the smoothing film 15, the diffusion region 51, and the first substrate 10 and is emitted as the first primary light (blue light) without being converted. In addition, the first primary light (blue light) emitted from the light source passes through the second polarizing film 23, the second substrate 20, the second subpixel (second liquid crystal cell formed of the transparent second electrode 21, the second alignment film 22, the liquid crystal material 40, the first alignment film 12, and the transparent first electrode 11), the first polarizing film 13, the light reflection film 14, the smoothing film 15, the second primary light emitting region 52, and the first substrate 10 and is emitted as the second primary light (green light). Furthermore, the first primary light (blue light) emitted from the light source passes through the second polarizing film 23, the second substrate 20, the third subpixel (third liquid crystal cell formed of the transparent second electrode 21, the second alignment film 22, the liquid crystal material 40, the first alignment film 12, and the transparent first electrode 11), the first polarizing film 13, the light reflection film 14, the smoothing film 15, the third primary light emitting region 53, and the first substrate 10 and is emitted as the third primary light (red light). Accordingly, as the result, an observer can recognize an image in the color liquid crystal display device.

In the color liquid crystal display device assembly of Example 1, the second primary light emitting regions 52 are each disposed between a part of the first surface 10A of the first substrate 10 and a part of the transparent first electrode 11, both of which correspond to each second subpixel, and the third primary light emitting regions 53 are each disposed between a part of the first surface 10A of the first substrate 10 and a part of the transparent first electrode 11, both of which correspond to each third subpixel. As described above, since the distance from the second subpixel to the second primary light emitting region 52 and the distance from the third subpixel to the third primary light emitting region 53 can be decreased, parallax is not likely to occur. Furthermore, since the diffusion regions 51 diffusing the first primary light passing through each first subpixel are each disposed between a part of the first surface 10A of the first substrate 10 and a part of the transparent first electrode 11, both of which correspond to each first subpixel, an image based on the first subpixel can be clearly displayed.

In addition, according to Example 1 and the following Examples 2 to 8, in the color liquid crystal display device assembly, white light is not emitted from the light source but the first primary light (blue light) is emitted therefrom. The second and the third primary light emitting regions emitting the second primary light (green light) and the third primary light (red light), respectively, are provided separately from the light sources. Hence, unlike a related technique, a process in which desired color light is obtained by making white color emitted from a light source pass through a color filter provided in a color liquid crystal display device is not necessary; hence, the effective utilization ratio of the first primary light (blue light) generated from the light source can be improved, and as a result, the power consumption of the color liquid crystal display device assembly can be reduced.

The color liquid crystal display device of the color liquid crystal display device assembly according to Example 1 may be formed, for example, by the following method.

Step-100

The light absorption layer 54 is first formed on a desired region of the first surface 10A of the first substrate 10 by a photolithographic technique or a screen printing method. Next, on parts of the first surface 10A of the first substrate 10, which are not covered with the light absorption layer 54, the second primary light emitting regions 52 and the third primary light emitting regions 53 are formed. In particular, a photosensitive red phosphor particle composition (red light-emitting phosphor slurry formed, for example, by dispersing red light-emitting phosphor particles in a mixture of a polyvinyl alcohol (PVA) resin and water, followed by adding ammonium bichromate) is applied on the entire surface and is then processed by exposure and development so as to form the third primary light emitting regions 53 each composed of a red light-emitting phosphor layer. Subsequently, a photosensitive green phosphor particle composition (green light-emitting phosphor slurry formed, for example, by dispersing green light-emitting phosphor particles in a mixture of a polyvinyl alcohol (PVA) resin and water, followed by adding ammonium bichromate) is applied on the entire surface thus processed and is then processed by exposure and development so as to form the second primary light emitting regions 52 each composed of a green light-emitting phosphor layer. By the way, the order of forming the second primary light emitting regions 52 and the third primary light emitting regions 53 may be reversed. In addition, the methods for forming the second and the third primary light emitting regions 52 and 53 are not limited to those described above, and after the red light-emitting phosphor slurry and the green light-emitting phosphor slurry are sequentially applied, the individual phosphor slurries may be sequentially exposed and developed so as to form the individual phosphor layers, or the individual phosphor layers may be formed by a screen printing method or the like. Also in the following Examples 2 to 8, the phosphor layers may be formed by substantially the same method as described above. Subsequently, after layers of a transparent binder resin containing a light dispersing agent dispersed therein are formed on desired regions, for example, by a printing method, the transparent binder resin is cured, so that the diffusion regions 51 can be formed. After the diffusion regions 51 are formed, the second and the third primary light emitting regions 52 and 53 may be formed.

Step-110

Subsequently, the smoothing film 15 is adhered to the diffusion regions 51, the second primary light emitting regions 52, and the third primary light emitting regions 53, and the light reflection film 14 is further adhered to the smoothing film 15.

Step-120

Next, after the first polarizing film 13 is adhered to the light reflection film 14, the transparent first electrode 11 having a desired pattern is formed on the first polarizing film 13, the first alignment film 12 is formed on the transparent first electrode 11, and an alignment treatment is performed on the first alignment film 12. Accordingly, the front panel is obtained; however, the manufacturing of the front panel described above may be basically performed using a related manufacturing process.

Step-130

In addition, after the switching elements (not shown) composed of TFTs are formed by a related method on the first surface 20A of the second substrate 20, and an insulating film (not shown) is then formed on the entire surface, the transparent second electrodes 21 are formed on the insulating film. Subsequently, after the second alignment film 22 is formed on the entire surface including the transparent second electrodes 21, an alignment treatment is performed on the second alignment film 22. In addition, the second polarizing film 23 is adhered to the second surface 20B of the second substrate 20. Although the rear panel can be obtained as described above, the manufacturing of the rear panel described above may be performed by a related manufacturing process.

Step-140

Subsequently, the front panel, the rear panel, the liquid crystal material, a sealing material (sealant), and the like are used, so that the color liquid crystal display device is formed by a related method. Next, the color liquid crystal display device and the planar light source device are assembled by a related method.

Figure 2:
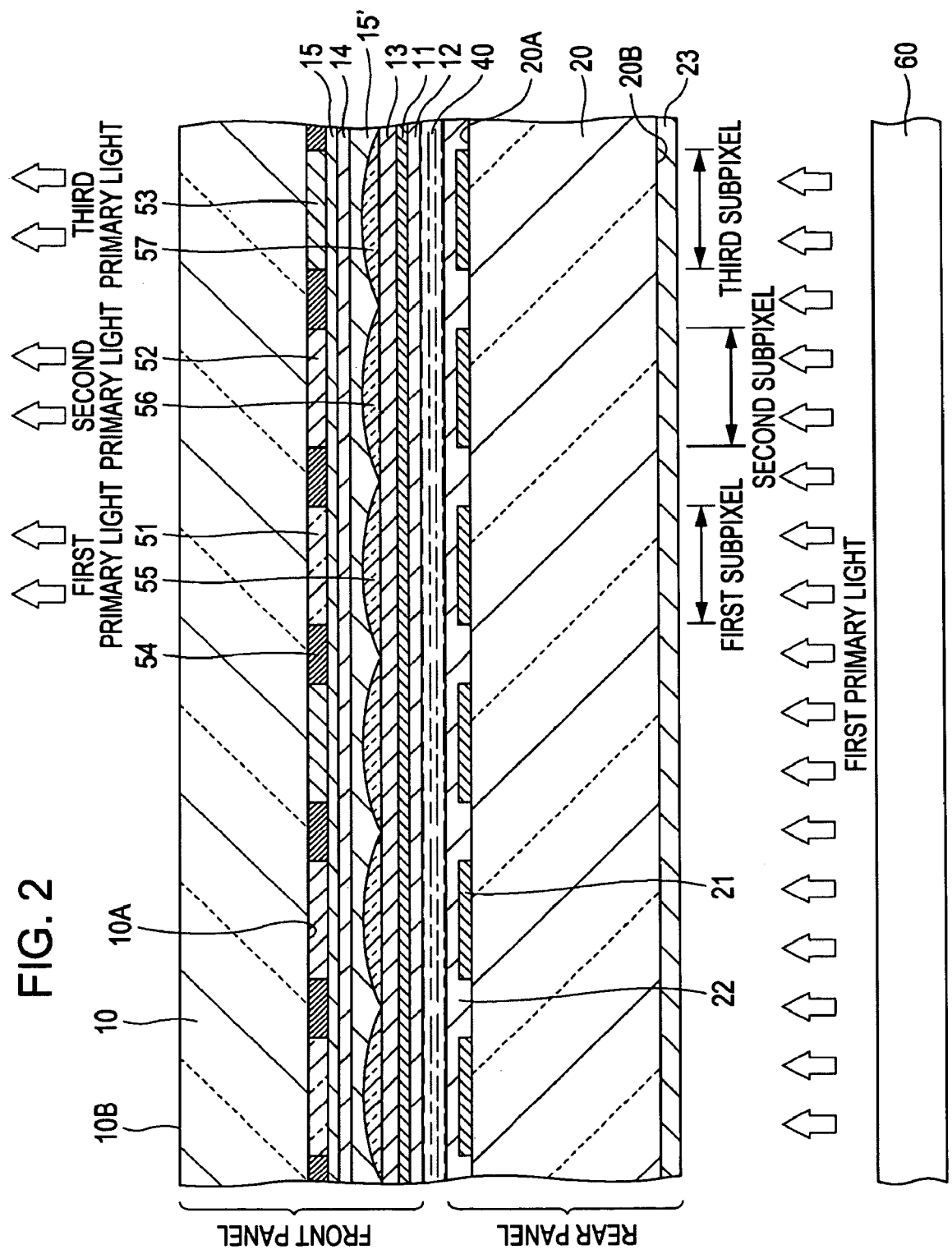
FIG. 2 is a schematic partly cross-sectional view of a modification of the color liquid crystal display device assembly according to Example 1.

In addition, as shown in a schematic partly cross-sectional view of FIG. 2, second light focusing members 56 focusing the second primary light on the second primary light emitting regions 52, third light focusing members 57 focusing the third primary light on the third primary light emitting regions 53, and first light focusing members 55 focusing the first primary light on the diffusion regions 51 may also be further provided between the transparent first electrode 11 (in more particular, the first polarizing film 13) and the second primary light emitting regions 52, the third primary light emitting regions 53, and the diffusion regions 51, respectively. In this case, the first light focusing members 55, the second light focusing members 56, and the light focusing members 57 are formed using Selfoc Lens Array, which is integrated lens arrays including many arranged graded index lenses, manufactured by Nippon Sheet Glass Co., Ltd. In addition, between the light reflection film 14 and the first light focusing members 55, the second light focusing members 56, and the third light focusing members 57, a smoothing film 15' is provided; however, without forming the smoothing film 15', spaces may remain between the light reflection film 14 and the first light focusing members 55, the second light focusing members 56, and the third light focusing members 57.

EXAMPLE 2

Figure 3:
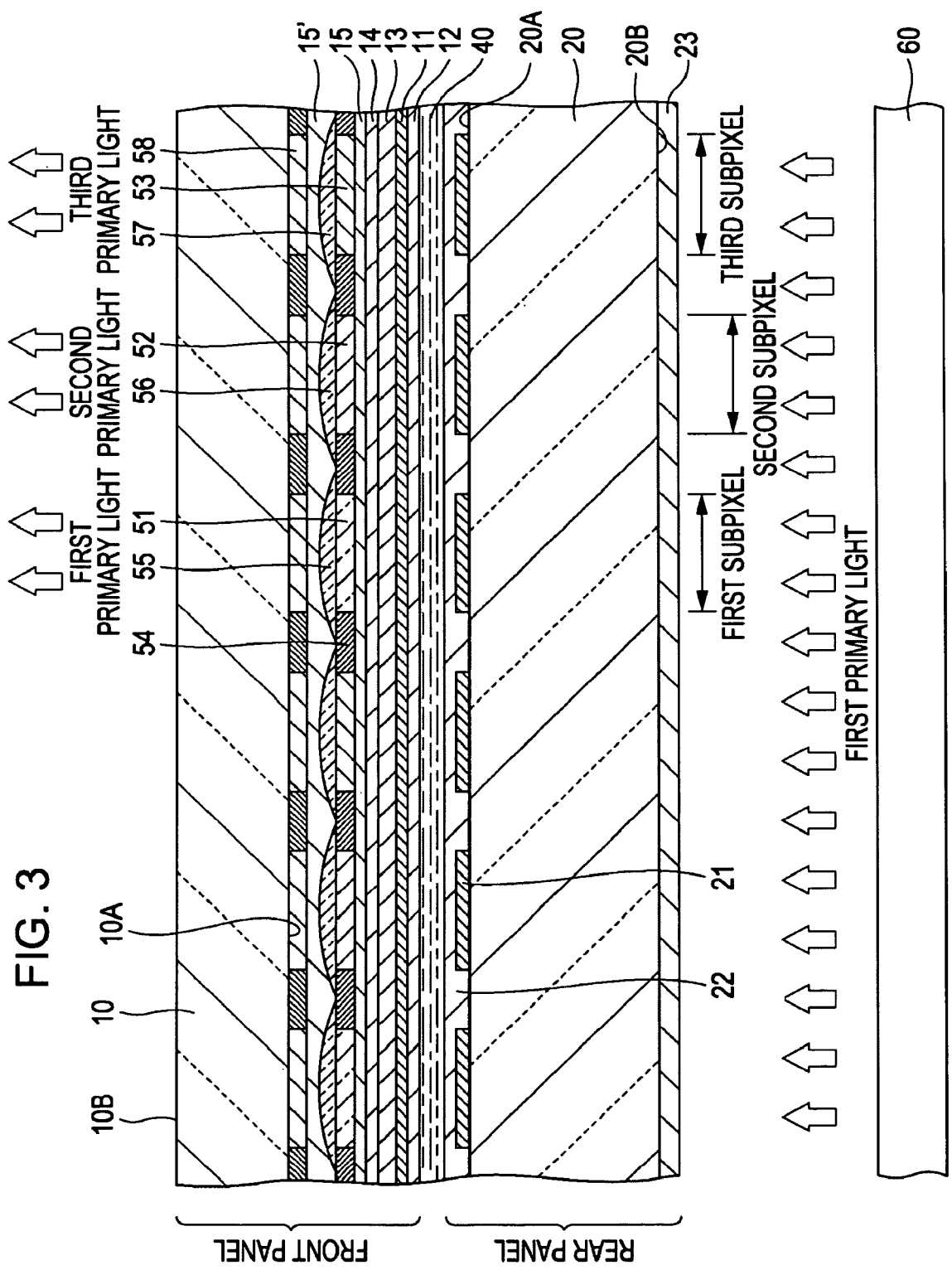
FIG. 3 is a schematic partly cross-sectional view of a color liquid crystal display device assembly according to Example 2.

Example 2 is a modification of Example 1. As shown in a schematic partly cross-sectional view of FIG. 3, in the color liquid crystal display device assembly of Example 2, between the first surface 10A of the first substrate 10 and the second primary light emitting regions 52, the third primary light emitting regions 53, and the diffusion regions 51, a color filter 58 is disposed.

The color filter 58 is composed of a black matrix (for example, formed of chromium) shading spaces between color patterns and color layers of the first, the second, and the third primary colors (such as blue, green, and red colors) facing the respective subpixels and is formed by a staining technique, a pigment dispersion technique, a printing technique, an electrodeposition technique, or the like. The color layers are each formed, for example, of a resin material or are each colored by a pigment. The pattern of the color layer may be formed so as to coincide with an arrangement state (arrangement pattern) of the subpixels, and a stripe arrangement is formed. In the following Examples 4, 6, and 8, the compositions and the structures similar to those described above may also be used.

Between the color filter 58 and the second primary light emitting regions 52, the third primary light emitting regions 53, and the diffusion regions 51, there are further provided the first light focusing members 55 focusing the first primary light passing through the diffusion regions 51 on the color filter 58, the second light focusing members 56 focusing the second primary light emitted in the second primary light emitting regions 52 on the color filter 58, and the third light focusing members 57 focusing the third primary light emitted in the third primary light emitting regions 53 on the color filter 58. Between the color filter 58 and the first, the second, and the third light focusing members 55, 56, and 57, the smoothing film 15' is disposed; however, without forming the smoothing film 15', spaces may remain between the color filter 58 and the first, the second, and the third light focusing members 55, 56, and 57. In addition, in some cases, without forming the first, the second, and the third light focusing members 55, 56, and 57, and the smoothing film 15', the light reflection film 14 may be formed in direct contact with the first polarizing film 13. In Example 2, although the smoothing film 15 is disposed between the light reflection film 14 and the second primary light emitting regions 52, the third primary light emitting regions 53, and the diffusion regions 51, the smoothing film 15 described above may be omitted.

Since the composition and the structure of the color liquid crystal display device assembly of Example 2 can be made similar to those of the color liquid crystal display device assembly of Example 1 except for the points described above, a detailed description is omitted.

In the color liquid crystal display device assembly of Example 2, during the operation of the color liquid crystal display device, the first primary light (blue light) emitted from the light source passes through the second polarizing film 23, the second substrate 20, the first subpixel (first liquid crystal cell composed of the transparent second electrode 21, the second alignment film 22, the liquid crystal material 40, the first alignment film 12, and the transparent first electrode 11), the first polarizing film 13, the light reflection film 14, the smoothing film 15, the diffusion region 51, the first light focusing member 55, the smoothing film 15', the color filter 58, and the first substrate 10 and is emitted as the first primary light (blue light) without being converted. In addition, the first primary light (blue light) emitted from the light source passes through the second polarizing film 23, the second substrate 20, the second subpixel (second liquid crystal cell composed of the transparent second electrode 21, the second alignment film 22, the liquid crystal material 40, the first alignment film 12, and the transparent first electrode 11), the first polarizing film 13, the light reflection film 14, the smoothing film 15, the second primary light emitting region 52, the second light focusing member 56, the smoothing film 15', the color filter 58, and the first substrate 10 and is emitted as the second primary light (green light). Furthermore, the first primary light (blue light) emitted from the light source passes through the second polarizing film 23, the second substrate 20, the third subpixel (third liquid crystal cell composed of the transparent second electrode 21, the second alignment film 22, the liquid crystal material 40, the first alignment film 12, and the transparent first electrode 11), the first polarizing film 13, the light reflection film 14, the smoothing film 15, the third primary light emitting region 53, the third light focusing member 57, the smoothing film 15', the color filter 58, and the first substrate 10 and is emitted as the third primary light (red light). As a result, an observer can recognize an image in the color liquid crystal display device.

As described above, in the color liquid crystal display device assembly of Example 2, by the color filter 58 thus provided, the color purity of an image displayed in the color liquid crystal display device assembly can be further improved. In addition, since the first light focusing members 55, the second light focusing members 56, and the third light focusing members 57 are further provided, generation of parallax and generation of optical crosstalk can be reliably prevented.

EXAMPLE 3

Example 3 relates to the color liquid crystal display device assembly according to the second embodiment. In the color liquid crystal display device assembly of Example 3, a third substrate 130 is further provided which has a first surface 130A facing the front panel and a second surface 130B facing this first surface 130A.

Figure 4:
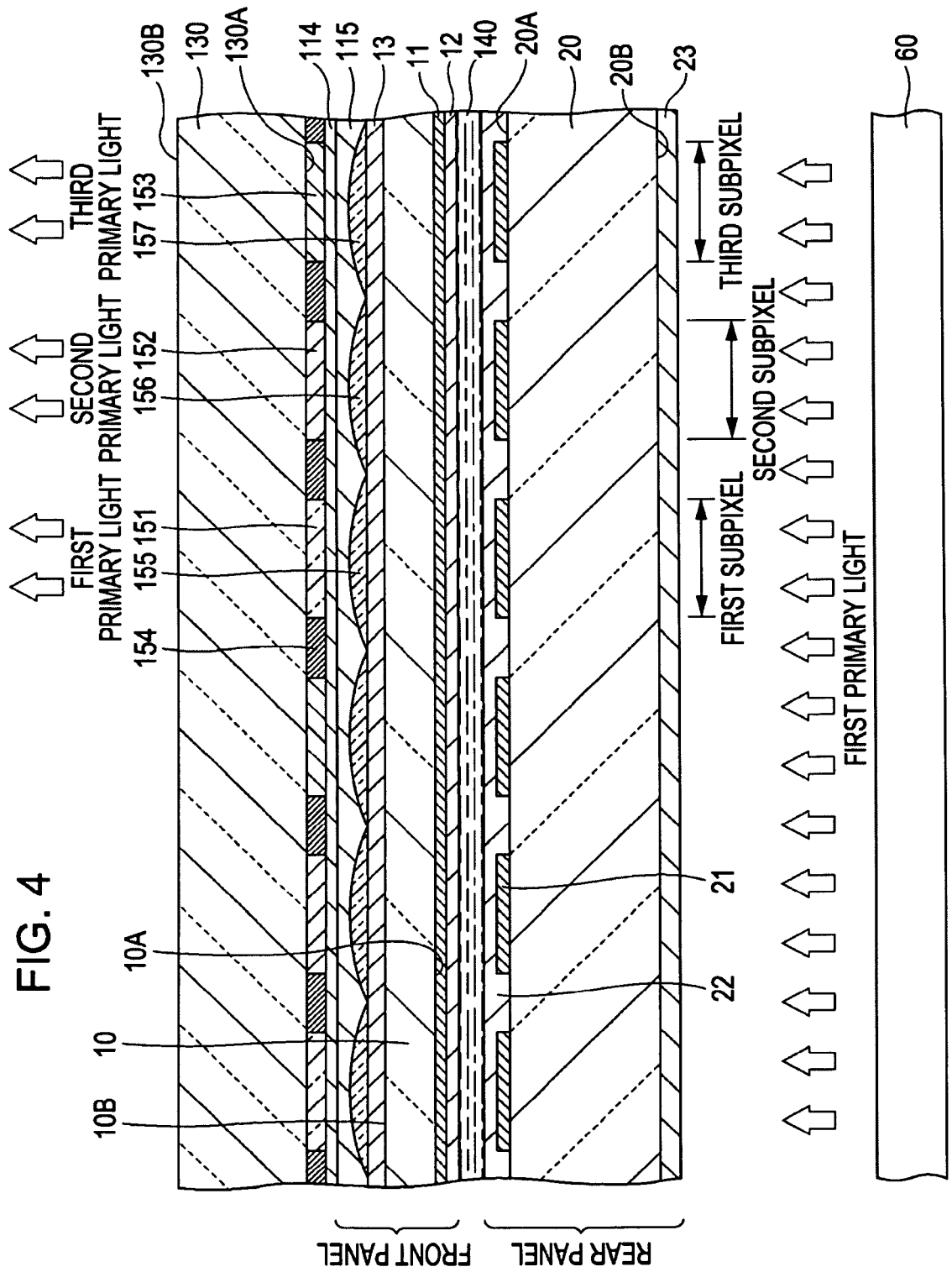
FIG. 4 is a schematic partly cross-sectional view of a color liquid crystal display device assembly according to Example 3.

In the color liquid crystal display device assembly of Example 3, the light sources also emit the first primary light (blue light) corresponding to the first primary color of the light three primary colors composed of the first primary color, the second primary color, and the third primary color. In addition, as shown in a schematic partly cross-sectional view of FIG. 4, also in the color liquid crystal display device assembly of Example 3, diffusion regions 151, second primary light emitting regions 152, and third primary light emitting regions 153 are provided. In this case, the second primary light emitting regions 152 are each disposed between a part of the second surface 10B of the first substrate 10 and a part of the first surface 130A of the third substrate 130, both of which correspond to each second subpixel, are composed of second primary light emitting particles emitting second primary light (green light) corresponding to the second primary color (green color), and emit the second primary light (green light) when excited by the first primary light (blue light) which is emitted from the light sources and passes through each second subpixel. In addition, the third primary light emitting regions 153 are each disposed between a part of the second surface 10B of the first substrate 10 and a part of the first surface 130A of the third substrate 130, both of which correspond to each third subpixel, are composed of third primary light emitting particles emitting third primary light (red light) corresponding to the third primary color (red color), and emit the third primary light (red light) when excited by the first primary light (blue light) which is emitted from the light sources and passes through each third subpixel. The diffusion regions 151 are each disposed between a part of the second surface 10B of the first substrate 10 and a part of the first surface 130A of the third substrate 130, both of which correspond to each first subpixel, and diffuse the first primary color (blue color) which is emitted from the light sources and passes through each first subpixel. In regions between the second primary light emitting regions 152 and the third primary light emitting regions 153, regions between the diffusion regions 151 and the second primary light emitting regions 152, and regions between the diffusion regions 151 and the third primary light emitting regions 153, a light absorption layer (black matrix) 154 is formed.

In addition, in Example 3, first light focusing members 155 focusing the first primary light (blue light) on the diffusion regions 151, second light focusing members 156 focusing the first primary light on the second primary light emitting regions 152, and third light focusing members 157 focusing the first primary light on the third primary light emitting regions 153 are further provided between the second surface 10B of the first substrate 10 (in more particular, the first polarizing film 13) and the diffusion regions 151, the second primary light emitting regions 152, the third primary light emitting regions 153, respectively. In addition, the first light focusing members 155, the second light focusing members 156, and the third light focusing members 157 are formed of integrated lens arrays including many arranged graded index lenses. The first light focusing members 155, the second light focusing members 156, and the third light focusing members 157 are disposed on the first polarizing film 13 provided on the second surface 10B of the first substrate 10.

In the color liquid crystal display device assembly of Example 3, a smoothing film 115 and a light reflection film 114 reflecting the second primary light and the third primary light are disposed between the first light focusing member 155, the second light focusing members 156, and the third light focusing members 157 and the diffusion regions 151, the second primary light emitting regions 152, and the third primary light emitting regions 153. In addition, without forming the smoothing film 115, spaces may remain between the light reflection film 114 and the first light focusing members 155, the second light focusing members 156, and the third light focusing members 157. In some cases, without forming the smoothing film 115, the first light focusing member 155, the second light focusing members 156, and the third light focusing members 157, the light reflection film 114 may be formed in direct contact with the first polarizing film 13.

In Example 3, the thickness of the first substrate 10 is set to 0.1 mm.

Since the composition and the structure of the color liquid crystal display device assembly of Example 3 be made similar to those of the color liquid crystal display device assembly of Example 1 except for the points described above, a detailed description is omitted.

In the color liquid crystal display device assembly of Example 3, during the operation of the color liquid crystal display device, the first primary light (blue light) emitted from the light source passes through the second polarizing film 23, the second substrate 20, the first subpixel (first liquid crystal cell composed of the transparent second electrode 21, the second alignment film 22, the liquid crystal material 140, the first alignment film 12, and the transparent first electrode 11), the first substrate 10, the first polarizing film 13, the first light focusing member 155, the smoothing film 115, the light reflection film 114, the diffusion region 151, and the third substrate 130 and is emitted as the first primary light (blue light) without being converted. In addition, the first primary light (blue light) emitted from the light source passes through the second polarizing film 23, the second substrate 20, the second subpixel (second liquid crystal cell composed of the transparent second electrode 21, the second alignment film 22, the liquid crystal material 140, the first alignment film 12, and the transparent first electrode 11), the first substrate 10, the first polarizing film 13, the second light focusing member 156, the smoothing film 115, the light reflection film 114, the second primary light emitting region 152, and the third substrate 130 and is emitted as the second primary light (green light). Furthermore, the first primary light (blue light) emitted from the light source passes through the second polarizing film 23, the second substrate 20, the third subpixel (third liquid crystal cell composed of the transparent second electrode 21, the second alignment film 22, the liquid crystal material 140, the first alignment film 12, and the transparent first electrode 11), the first substrate 10, the first polarizing film 13, the third light focusing member 157, the smoothing film 115, the light reflection film 114, the third primary light emitting region 153, and the third substrate 130 and is emitted as the third primary light (red light). As a result, an observer can recognize an image in the color liquid crystal display device.

In the color liquid crystal display device assembly of Example 3, since the second primary light emitting regions 152 are each disposed between a part of the second surface 10B of the first substrate 10 and a part of the first surface 130A of the third substrate 130, both of which correspond to each second subpixel, the third primary light emitting regions 153 are each disposed between a part of the second surface 10B of the first substrate 10 and a part of the first surface 130A of the third substrate 130, both of which correspond to each third subpixel, and the thickness of the first substrate 10 is appropriately selected, the distance from the second subpixel to the second primary light emitting region 152 and the distance from the third subpixel to the third primary light emitting region 153 can be decreased, and as a result, parallax is not likely to occur. Furthermore, since the diffusion regions 151 diffusing the first primary light (blue light) passing through each first subpixel are each disposed between a part of the second surface 10B of the first substrate 10 and a part of the first surface 130A of the third substrate 130, both of which correspond to each first subpixel, an image based on the first subpixel can be clearly displayed.

The color liquid crystal display device of the color liquid crystal display device assembly of Example 3 may be formed, for example, by the following method.

Step-300

After the transparent first electrode 11 is formed on the first surface 10A of the first substrate 10, the first alignment film 12 is formed on the transparent first electrode 11, and an alignment treatment is then performed on the first alignment film 12. In addition, the first polarizing film 13 is adhered to the second surface 10B of the first substrate 10. Incidentally, the manufacturing until this stage may be performed by a related manufacturing process. Next, the first focusing members 155, the second light focusing members 156, and the third light focusing members 157 are adhered to the first polarizing film 13, and the smoothing film 115 is adhered to the surfaces of the above light focusing members. Accordingly, the front panel can be obtained. In addition, as in the "Step-130" of Example 1, the rear panel is formed by a related process.

Step-310

In addition, the light absorption layer 154 is formed on a desired region of the first surface 130A of the third substrate 130, and the second primary light emitting regions 152 and the third primary light emitting regions 153 are formed on parts of the first surface 130A of the third substrate 130 which are not covered with the light absorption layer 154. Subsequently, for example, after layers of a transparent binder resin containing a light diffusion agent dispersed therein are formed on desired regions using a printing method, the transparent binder resin is cured, so that the diffusion regions 151 can be formed. Alternatively, after the diffusion regions 151 are formed, the second primary light emitting regions 152 and the third primary light emitting regions 153 may be formed. Next, the light reflection film 114 is formed on the diffusion regions 151, the second primary light emitting regions 152, the third primary light emitting regions 153, and the light absorption layer 154.

Step-320

Subsequently, the smoothing film 115 and the light reflection film 114 are adhered to each other, so that the front panel and the third substrate 130 are assembled together. In addition, based on a related method, the color liquid crystal display device is formed using the front panel, the rear panel, the liquid crystal material, a sealing material (sealant), and the like. Next, the color liquid crystal display device and the planar light source device are assembled together by a related method.

EXAMPLE 4

Figure 5:
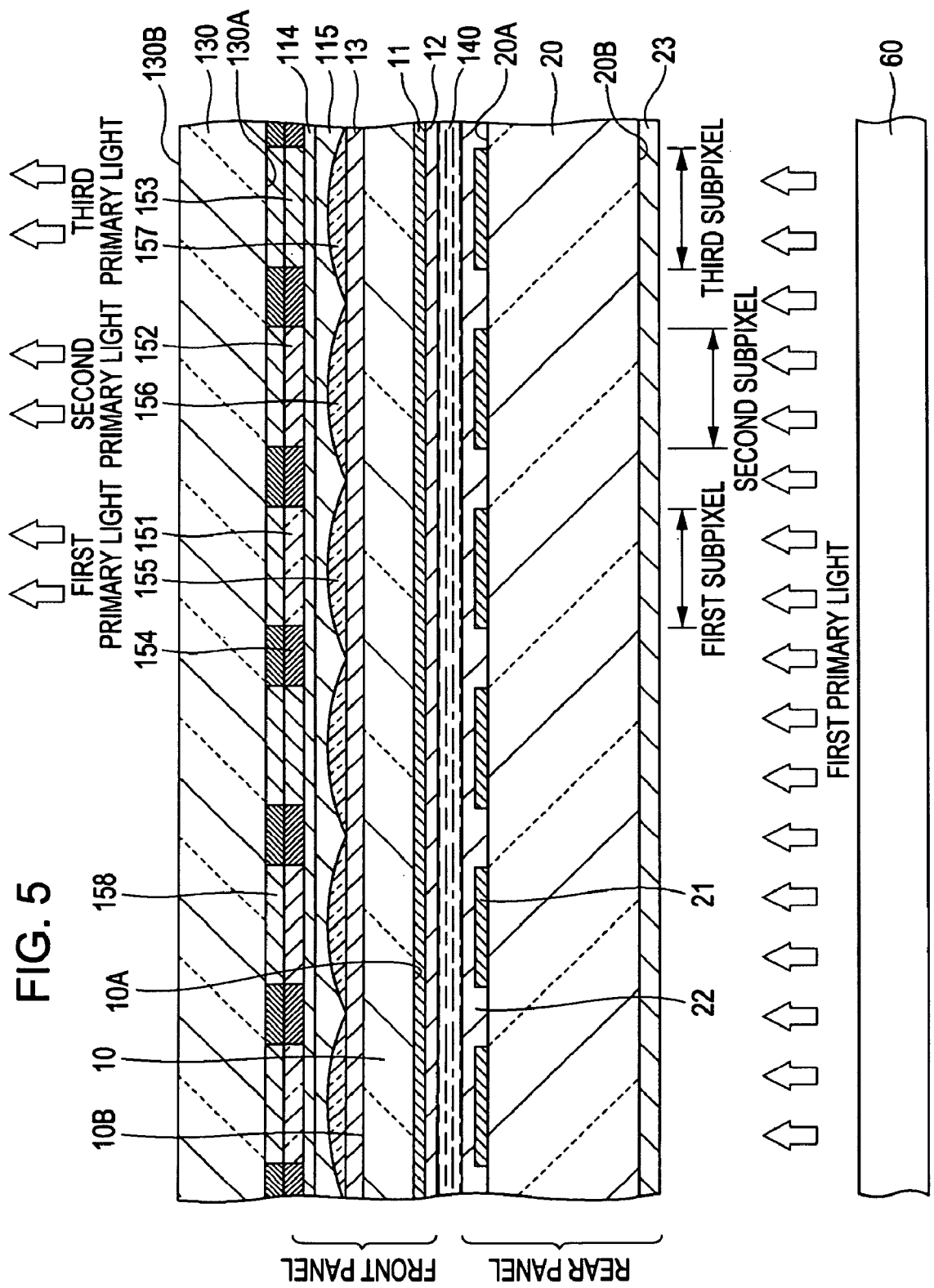
FIG. 5 is a schematic partly cross-sectional view of a color liquid crystal display device assembly according to Example 4.

Example 4 is a modification of Example 3. As shown in a schematic partly cross-sectional view of FIG. 5, in the color liquid crystal display device assembly of Example 4, between the first surface 130A of the third substrate 130 and the first light focusing members 155, the second light focusing members 156, and the third light focusing members 157, a color filter 158 is disposed.

Since the composition and the structure of the color liquid crystal display device assembly of Example 4 can be made similar to those of the color liquid crystal display device assembly of Example 3 except for the point described above, a detailed description is omitted. In addition, the second polarizing film 23 may be disposed on the first surface 20A of the second substrate 20.

In the color liquid crystal display device assembly of Example 4, during the operation of the color liquid crystal display device, the first primary light (blue light) emitted from the light source passes through the second polarizing film 23, the second substrate 20, the first subpixel (first liquid crystal cell composed of the transparent second electrode 21, the second alignment film 22, the liquid crystal material 140, the first alignment film 12, and the transparent first electrode 11), the first substrate 10, the first polarizing film 13, the first light focusing member 155, the smoothing film 115, the light reflection film 114, the diffusion region 151, the color filter 158, and the third substrate 130 and is emitted as the first primary light (blue light) without being converted. In addition, the first primary light (blue light) emitted from the light source passes through the second polarizing film 23, the second substrate 20, the second subpixel (second liquid crystal cell composed of the transparent second electrode 21, the second alignment film 22, the liquid crystal material 140, the first alignment film 12, and the transparent first electrode 11), the first substrate 10, the first polarizing film 13, the second light focusing member 156, the smoothing film 115, the light reflection film 114, the second primary light emitting region 152, the color filter 158, and the third substrate 130 and is emitted as the second primary light (green light). Furthermore, the first primary light (blue light) emitted from the light source passes through the second polarizing film 23, the second substrate 20, the third subpixel (third liquid crystal cell composed of the transparent second electrode 21, the second alignment film 22, the liquid crystal material 140, the first alignment film 12, and the transparent first electrode 11), the first substrate 10, the first polarizing film 13, the third light focusing member 157, the smoothing film 115, the light reflection film 114, the third primary light emitting region 153, the color filter 158, and the third substrate 130 and is emitted as the third primary light (red light). As a result, an observer can recognize an image in the color liquid crystal display device.

In Example 4, without forming the smoothing film 115, spaces may remain between the light reflection film 114 and the first light focusing members 155, the second light focusing members 156, and the third light focusing members 157. In addition, in some cases, without forming the smoothing film 115, the first light focusing members 155, the second light focusing members 156, and the third light focusing members 157, the light reflection film 114 may be formed in direct contact with the first polarizing film 13.

EXAMPLE 5

Example 5 relates to the color liquid crystal display device assembly according to the third embodiment of the present invention.

Figure 6:
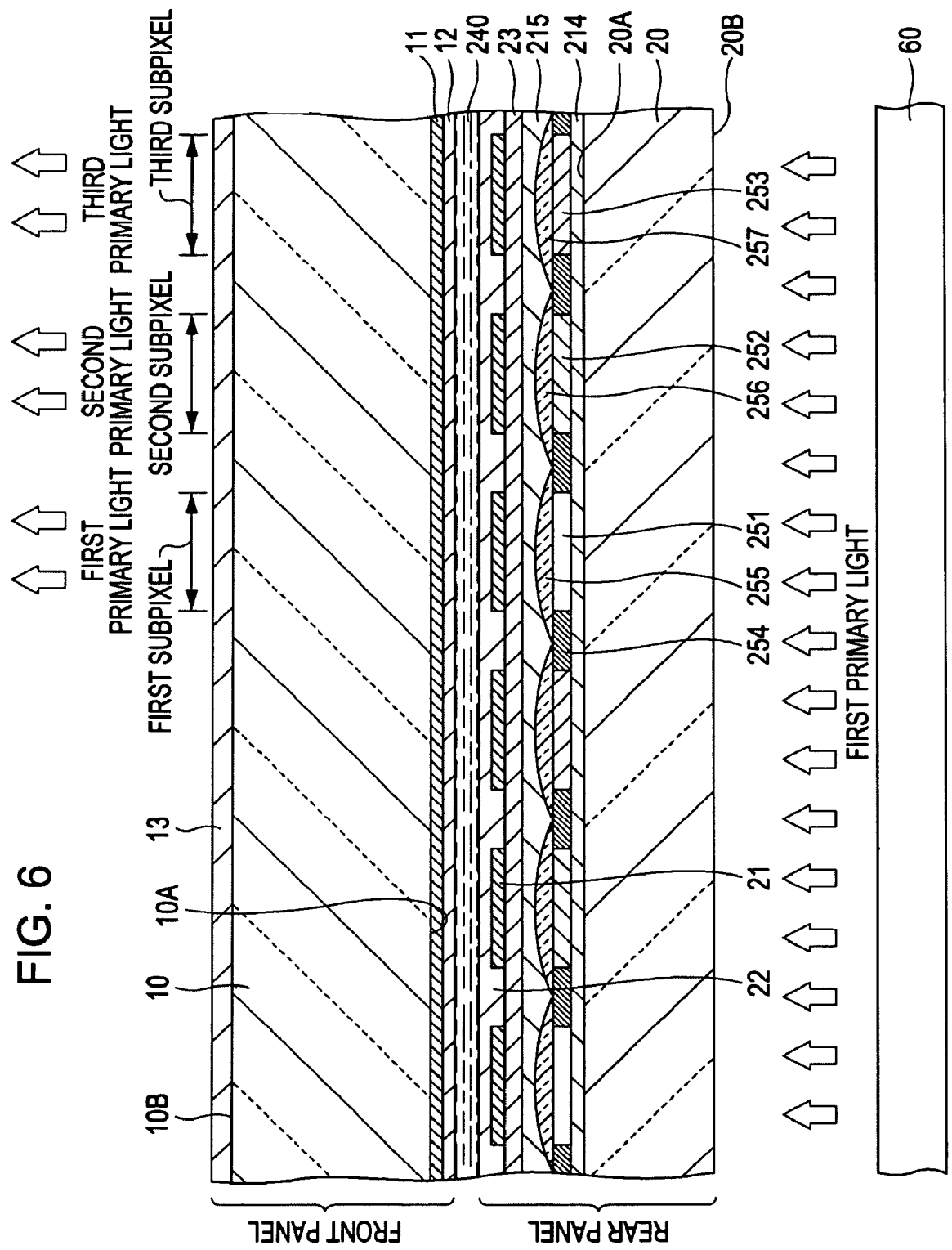
FIG. 6 is a schematic partly cross-sectional view of a color liquid crystal display device assembly according to Example 5.

Also in the color liquid crystal display device assembly of Example 5, the light sources emit the first primary light (blue light) corresponding to the first primary color of the light three primary colors composed of the first primary color, the second primary color, and the third primary color. In addition, as shown in a schematic partly cross-sectional view of FIG. 6, in the color liquid crystal display device assembly of Example 5, first primary light passing regions 251, second primary light emitting regions 252, and third primary light emitting regions 253 are provided. In this case, the second primary light emitting regions 252 are disposed between parts of the first surface 20A of the second substrate 20 corresponding to each second subpixel (for example, displaying a green color) and respective transparent second electrodes 21, are composed of second primary light emitting particles emitting second primary light (green light) corresponding to the second primary color (green color), and emit the second primary light (green light) when excited by the first primary light (blue light) which is emitted from the light sources and illuminate each second subpixel. In addition, the third primary light emitting regions 253 are disposed between parts of the first surface 20A of the second substrate 20 corresponding to each third subpixel (for example, displaying a red color) and respective transparent second electrode 21, are composed of third primary light emitting particles emitting third primary light (red light) corresponding to the third primary color (red color), and emit the third primary light (red light) when excited by the first primary light which is emitted from the light sources and illuminate each third subpixel. The first primary light passing regions 251 are regions which allow the first primary light (blue light) emitted from the light sources to pass therethrough to each first subpixel. In regions between the second primary light emitting regions 252 and the third primary light emitting regions 253, regions between the first primary light passing regions 251 and the second primary light emitting regions 252, and regions between the first primary light passing regions 251 and the third primary light emitting regions 253, a light absorption layer (black matrix) 254 is formed.

In addition, in Example 5, there are provided second light focusing members 256 disposed between the second primary light emitting regions 252 and respective transparent second electrodes 21 and focusing the second primary light (green light) emitted from the second primary light emitting regions 252 on each second subpixel and third light focusing members 257 disposed between the third primary light emitting regions 253 and respective transparent second electrodes 21 and focusing the third primary light (red light) emitted from the third primary light emitting regions 253 on each third subpixel.

In Example 5, there are further provided first light focusing members 255 disposed between the first surface 20A of the second substrate 20 and respective transparent second electrodes 21 and focusing the first primary light emitted from the light sources on each first subpixel (that is, focusing the first primary light passing through the first primary light passing region 251 on the first subpixel). In addition, as in Example 1, the first light focusing members 255, the second light focusing members 256, and the third light focusing members 257 are formed of integrated lens arrays including many arranged graded index lenses.

In addition, in the color liquid crystal display device assembly of Example 5, a light reflection film 214 reflecting the second primary light and the third primary light is disposed between the first surface 20A of the second substrate 20 and the second primary light emitting regions 252, the third primary light emitting regions 253, and the first primary light passing regions 251. In addition, the second polarizing film 23 is disposed between the transparent second electrodes 21 and the first light focusing members 255, the second light focusing members 256, and the third light focusing members 257, and a smoothing film 215 is further disposed between the second polarizing film 23 and the first light focusing members 255, the second light focusing members 256, and the third light focusing members 257; however, without forming the smoothing film 215, spaces may remain between the second polarizing film 23 and the first light focusing members 255, the second light focusing members 256, and the third light focusing members 257.

In Example 5 and in the following Examples 6 to 8, the liquid crystal materials 240 and 340 are formed of a material in which the control mode thereof has a wide viewing angle such as an IPS mode or a VA mode.

Since the composition and the structure of the color liquid crystal display device assembly of Example 5 can be made similar to those of the color liquid crystal display device assembly of Example 1 except for the points described above, a detailed description is omitted. In addition, the first polarizing film 13 may be disposed on the first surface 10A of the first substrate 10.

In the color liquid crystal display device assembly of Example 5, during the operation of the color liquid crystal display device, the first primary light (blue light) emitted from the light source passes through the second substrate 20, the light reflection film 214, the first primary light passing region 251, the first light focusing member 255, the smoothing film 215, the second polarizing film 23, the first subpixel (first liquid crystal cell composed of the transparent second electrode 21, the second alignment film 22, the liquid crystal material 240, the first alignment film 12, and the transparent first electrode 11), the first polarizing film 13, and the first substrate 10 and is emitted as the first primary light (blue light) without being converted. In addition, the first primary light (blue light) emitted from the light source passes through the second substrate 20, the light reflection film 214, the second primary light emitting region 252, the second light focusing member 256, the smoothing film 215, the second polarizing film 23, the second subpixel (second liquid crystal cell composed of the transparent second electrode 21, the second alignment film 22, the liquid crystal material 240, the first alignment film 12, and the transparent first electrode 11), the first polarizing film 13, and the first substrate 10 and is emitted as the second primary light (green light). Furthermore, the first primary light (blue light) emitted from the light source passes through the second substrate 20, the light reflection film 214, the third primary light emitting region 253, the third light focusing member 257, the smoothing film 215, the second polarizing film 23, the third subpixel (third liquid crystal cell composed of the transparent second electrode 21, the second alignment film 22, the liquid crystal material 240, the first alignment film 12, and the transparent first electrode 11), the first polarizing film 13, and the first substrate 10 and is emitted as the third primary light (red light). As a result, an observer can recognize an image in the color liquid crystal display device.

In the color liquid crystal display device assembly of Example 5, the second primary light emitting regions 252 are disposed between parts of the first surface 20A of the second substrate 20 corresponding to each second subpixel and respective transparent second electrodes 21, and the third primary light emitting regions 253 are disposed between parts of the first surface 20A of the second substrate 20 corresponding to each third subpixel and respective transparent second electrode 21. Furthermore, the second light focusing members 256 are disposed between the second primary light emitting regions 252 and respective transparent second electrodes 21, and the third light focusing member 257 are disposed between the third primary light emitting regions 253 and respective transparent second electrodes 21. Hence, generation of optical crosstalk in which light emitted from the second primary light emitting region 252 or the third primary light emitting region 253 is incident on a subpixel (liquid crystal cell) adjacent to a corresponding subpixel (liquid crystal cell) can be reliably prevented.

The color liquid crystal display device of the color liquid crystal display device assembly of Example 5 may be formed, for example, by the following method.

Step-500

The Step-500 is performed in a manner similar to the Step-100 in Example 1; however, after the light absorption layer 254 is formed on a desired region of the light reflection film 214 disposed on the first surface 20A of the second substrate 20, the second primary light emitting regions 252 and the third primary light emitting regions 253 are formed on regions of the light reflection film 214 which are not covered with the light absorption layer 254. The first primary light passing regions 251 surrounded by the light absorption layer 254 may not be filled or may be filled with a transparent resin.

Step-510

Subsequently, the first light focusing members 255, the second light focusing members 256, and the third light focusing members 257 are adhered to the first primary light passing regions 251, the second primary light emitting regions 252, and the third primary light emitting regions 253, respectively, and the smoothing film 215 is further adhered to the above light focusing members.

Step-520

Next, the second polarizing film 23 is adhered to the smoothing film 215, switching elements (not shown) composed of TFTs are formed on the second polarizing film 23 by a related method, and an insulating film (not shown) is formed to cover the entire surface. Subsequently, after the transparent second electrodes 21 are formed on the insulating film, the second alignment film 22 is formed on the transparent second electrodes 21, and an alignment treatment is then performed on the second alignment film 22. As described above, the rear panel can be obtained; however, basically, the manufacturing of this rear panel may be performed using a related manufacturing process.

Step-530

In addition, the first polarizing film 13 is adhered to the first surface 10A of the first substrate 10, the transparent first electrode 11 is formed on the first polarizing film 13, the first alignment film 12 is then formed on the transparent first electrode 11, and an alignment treatment is performed on the first alignment film 12. As described above, the front panel can be obtained; however, basically, the manufacturing of this front panel may be performed using a related manufacturing process.

Step-540

Subsequently, by a know method, the color liquid crystal display device is assembled using the front panel, rear panel, liquid crystal material, sealing material (sealant), and the like. Next, the color liquid crystal display device and the planar light source device are assembled together based on a related method.

EXAMPLE 6

Figure 7:
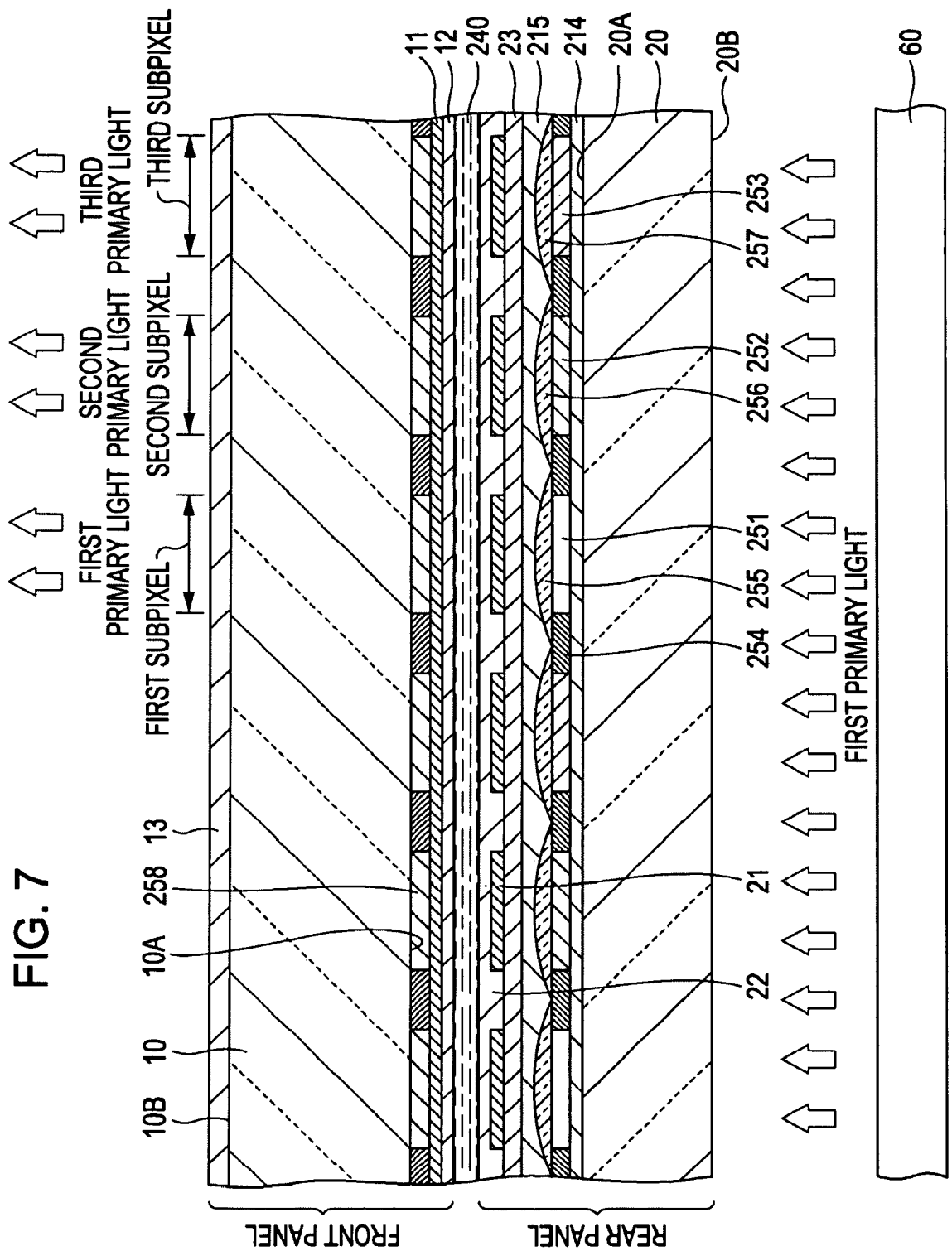
FIG. 7 is a schematic partly cross-sectional view of a color liquid crystal display device assembly according to Example 6.

Example 6 is a modification of Example 5. As shown in a schematic partly cross-sectional view of FIG. 7, in the color liquid crystal display device assembly of Example 6, a color filter 258 is disposed between the first surface 10A of the first substrate 10 and the transparent first electrode 11.

In the color liquid crystal display device assembly of Example 6, during the operation of the color liquid crystal display device, the first primary light (blue light) emitted from the light source passes through the second substrate 20, the light reflection film 214, the first primary light passing region 251, the first light focusing member 255, the smoothing film 215, the second polarizing film 23, the first subpixel (first liquid crystal cell composed of the transparent second electrode 21, the second alignment film 22, the liquid crystal material 240, the first alignment film 12, and the transparent first electrode 11), the color filter 258, the first substrate 10, and the first polarizing film 13 and is emitted as the first primary light (blue light) without being converted. In addition, the first primary light (blue light) emitted from the light source passes through the second substrate 20, the light reflection film 214, the second primary light emitting region 252, the second light focusing member 256, the smoothing film 215, the second polarizing film 23, the second subpixel (second liquid crystal cell composed of the transparent second electrode 21, the second alignment film 22, the liquid crystal material 240, the first alignment film 12, and the transparent first electrode 11), the color filter 258, the first substrate 10, and the first polarizing film 13 and is emitted as the second primary light (green light). Furthermore, the first primary light (blue light) emitted from the light source passes through the second substrate 20, the light reflection film 214, the third primary light emitting region 253, the third light focusing member 257, the smoothing film 215, the second polarizing film 23, the third subpixel (third liquid crystal cell composed of the transparent second electrode 21, the second alignment film 22, the liquid crystal material 240, the first alignment film 12, and the transparent first electrode 11), the color filter 258, the first substrate 10, and the first polarizing film 13 and is emitted as the third primary light (red light). As a result, an observer can recognize an image in the color liquid crystal display device.

Since the composition and the structure of the color liquid crystal display device assembly of Example 6 can be made similar to those of the color liquid crystal display device assembly of Example 5 except for the point described above, a detailed description is omitted. In the color liquid crystal display device of the color liquid crystal display device assembly of Example 6 shown in the figure, the first polarizing film 13 is adhered to the second surface 10B of the first substrate 10. Alternatively, the first polarizing film 13 may be disposed on the first surface 10A of the first substrate 10.

EXAMPLE 7

Example 7 relates to the color liquid crystal display device assembly according to the fourth embodiment. In the color liquid crystal display device assembly of Example 7, a third substrate 330 is further provided between the rear panel and the planar light source device 60, which has a first surface 330A facing the rear panel and a second surface 330B facing the planar light source device 60.

Figure 8:
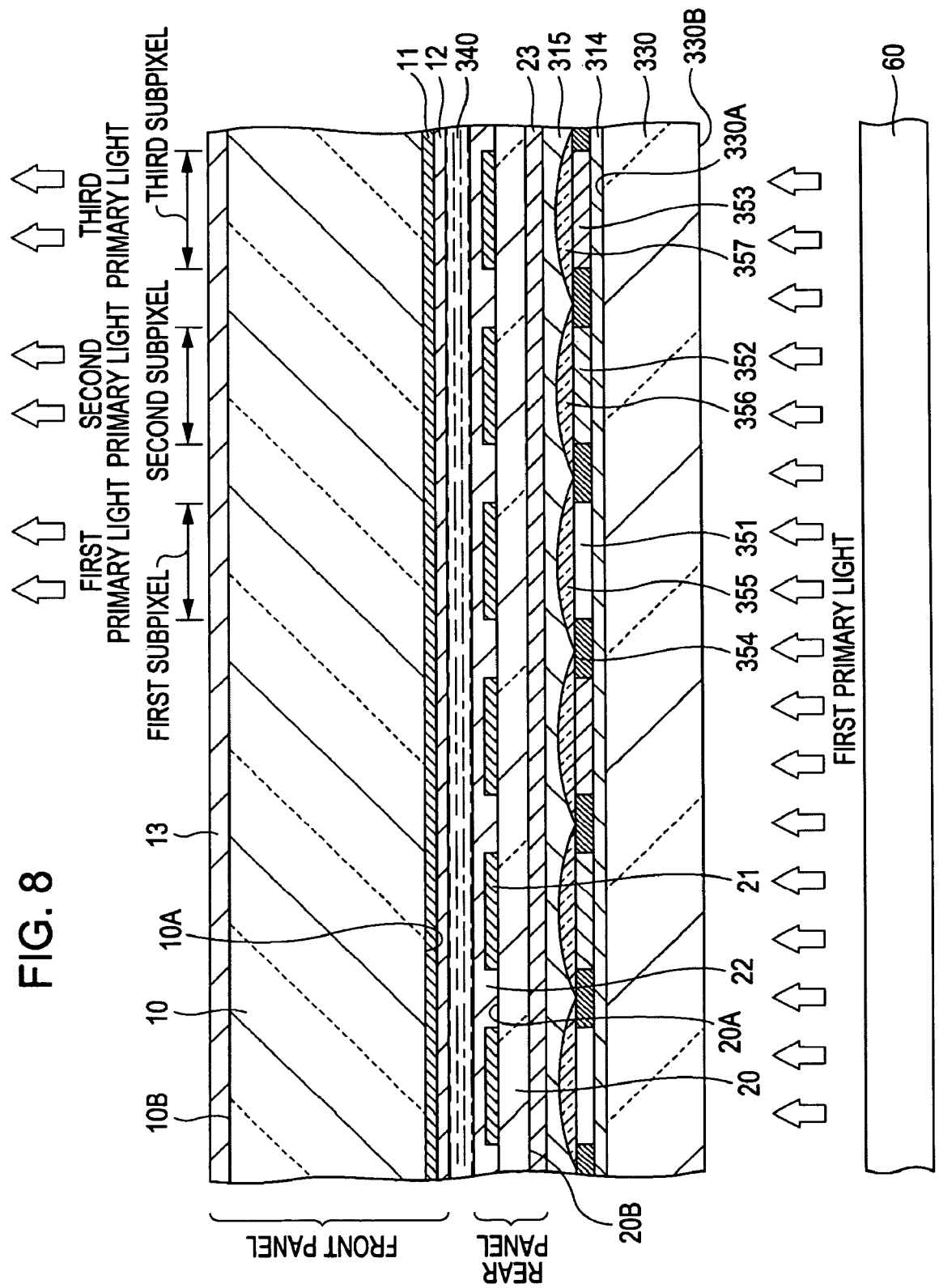
FIG. 8 is a schematic partly cross-sectional view of a color liquid crystal display device assembly according to Example 7.

Also in the color liquid crystal display device assembly of Example 7, the light sources emit the first primary light (blue light) corresponding to the first primary color of the light three primary colors composed of the first primary color, the second primary color, and the third primary color. In addition, as shown in a schematic partly cross-sectional view of FIG. 8, in the color liquid crystal display device assembly of Example 7, first primary light passing regions 351, second primary light emitting regions 352, and third primary light emitting regions 353 are provided. In this case, the second primary light emitting regions 352 are each disposed between a part of the second surface 20B of the second substrate 20 and a part of the first surface 330A of the third substrate 330, both of which correspond to each second subpixel, are composed of second primary light emitting particles emitting second primary light (green light) corresponding to the second primary color (green color), and emit the second primary light (green light) when excited by the first primary light (blue light) which is emitted from the light sources and illuminate each second subpixel. In addition, the third primary light emitting regions 353 are each disposed between a part of the second surface 20B of the second substrate 20 and a part of the first surface 330A of the third substrate 330, both of which correspond to each third subpixel, are composed of third primary light emitting particles emitting third primary light (red light) corresponding to the third primary color (red color), and emit the third primary light (red light) when excited by the first primary light (blue light) which is emitted from the light sources and illuminate each third subpixel. The first primary light passing regions 351 are regions which allow the first primary light (blue light) emitted from the light sources to pass therethrough to each first subpixel. In regions between the second primary light emitting regions 352 and the third primary light emitting regions 353, regions between the first primary light passing regions 351 and the second primary light emitting regions 352, and regions between the first primary light passing regions 351 and the third primary light emitting regions 353, a light absorption layer (black matrix) 354 is formed.

In addition, in Example 7, there are provided second light focusing members 356 disposed between the second surface 20B of the second substrate 20 and the first surface 330A of the third substrate 330 and focusing the second primary light (green light) emitted from the second primary light emitting regions 352 on each second subpixel and third light focusing members 357 disposed between the second surface 20B of the second substrate 20 and the first surface 330A of the third substrate 330 and focusing the third primary light (red light) emitted from the third primary light emitting regions 353 on each third subpixel.

In Example 7, there are further provided first light focusing members 355 disposed between the second surface 20B of the second substrate 20 and the first surface 330A of the third substrate 330 and focusing the first primary light emitted from the light sources on each first subpixel (that is, focusing the first primary light passing through the first primary light passing regions 351 on each first subpixel). In addition, as in Example 1, the first light focusing members 355, the second light focusing members 356, and the third light focusing members 357 are formed of integrated lens arrays including many arranged graded index lenses.

In the color liquid crystal display device assembly of Example 7, a light reflection film 314 reflecting the second primary light and the third primary light is disposed between the first surface 330A of the third substrate 330 and the first primary light passing regions 351, the second primary light emitting regions 352, and the third primary light emitting regions 353. In addition, the second polarizing film 23 is disposed between the second surface 20B of the second substrate 20 and the first light focusing members 355, the second light focusing members 356, and the third light focusing members 357, and a smoothing film 315 is further disposed between the second polarizing film 23 and the first light focusing members 355, the second light focusing members 356, and the third light focusing members 357; however, without forming the smoothing film 315, spaces may remain between the second polarizing film 23 and the first light focusing members 355, the second light focusing members 356, and the third light focusing members 357. In some cases, without forming the smoothing film 315, the first light focusing members 355, the second light focusing members 356, and the third light focusing members 357, for example, the first primary light passing regions 351, the second primary light emitting regions 352, and the third primary light emitting regions 353 may be formed in direct contact with the second polarizing film 23.

In Example 7, the thickness of the second substrate 20 is set to 0.1 mm.

Since the composition and the structure of the color liquid crystal display device assembly of Example 7 can be made similar to those of the color liquid crystal display device assembly of Examples 1, 3, or 5 except for the points described above, a detailed description is omitted. In addition, the first polarizing film 13 may be disposed on the first surface 10A of the first substrate 10.

In the color liquid crystal display device assembly of Example 7, during the operation of the color liquid crystal display device, the first primary light (blue light) emitted from the light source passes through the third substrate 330, the light reflection film 314, the first primary light passing region 351, the first light focusing member 355, the smoothing film 315, the second polarizing film 23, the second substrate 20, the first subpixel (first liquid crystal cell composed of the transparent second electrode 21, the second alignment film 22, the liquid crystal material 340, the first alignment film 12, and the transparent first electrode 11), the first polarizing film 13, and the first substrate 10 and is emitted as the first primary light (blue light) without being converted. In addition, the first primary light (blue light) emitted from the light source passes through the third substrate 330, the light reflection film 314, the second primary light emitting region 352, the second light focusing member 356, the smoothing film 315, the second polarizing film 23, the second substrate 20, the second subpixel (second liquid crystal cell composed of the transparent second electrode 21, the second alignment film 22, the liquid crystal material 340, the first alignment film 12, and the transparent first electrode 11), the first polarizing film 13, and the first substrate 10 and is emitted as the second primary light (green light). Furthermore, the first primary light (blue light) emitted from the light source passes through the third substrate 330, the light reflection film 314, the third primary light emitting region 353, the third light focusing member 357, the smoothing film 315, the second polarizing film 23, the second substrate 20, the third subpixel (third liquid crystal cell composed of the transparent second electrode 21, the second alignment film 22, the liquid crystal material 340, the first alignment film 12, and the transparent first electrode 11), the first polarizing film 13, and the first substrate 10 and is emitted as the third primary light (red light). As a result, an observer can recognize an image in the color liquid crystal display device.

In the color liquid crystal display device assembly of Example 7, the second primary light emitting regions 352 are each disposed between a part of the second surface 20B of the second substrate 20 and a part of the first surface 330A of the third substrate 330, both of which correspond to each second subpixel, and the third primary light emitting regions 353 are each disposed between a part of the second surface 20B of the second substrate 20 and a part of the first surface 330A of the third substrate 330, both of which correspond to each third subpixel. Furthermore, the second light focusing members 356 are disposed between the second surface 20B of the second substrate 20 and the first surface 330A of the third substrate 330, and the third light focusing members 357 are disposed between second surface 20B of the second substrate 20 and the first surface 330A of the third substrate 330. Hence, generation of optical crosstalk in which light emitted from the second primary light emitting region 352 or the third primary light emitting region 353 is incident on a subpixel (liquid crystal cell) adjacent to a corresponding subpixel (liquid crystal cell) can be reliably prevented.

The color liquid crystal display device of the color liquid crystal display device assembly of Example 7 may be formed, for example, by the following method.

Step-700

In a manner similar to that of "Step-530" of Example 5, the front panel is formed by using a related process. In addition, in a manner similar to that of "Step-130" of Example 1, the rear panel is formed by using a related process.

Step-710

In addition, after the light absorption layer 354 is formed on a desired region of the light reflection film 314 disposed on the first surface 330A of the third substrate 330, the second primary light emitting regions 352 and the third primary light emitting regions 353 are formed on regions of the light reflection film 314 which are not covered with the light absorption layer 354. Subsequently, the first light focusing members 355, the second light focusing members 356, and the third light focusing members 357 are adhered to the first primary light passing regions 351, the second primary light emitting regions 352, and the third primary light emitting regions 353, respectively, and the smoothing film 315 is further adhered to the above light focusing members. The first primary light passing regions 351 surrounded by the light absorption layer 354 may not be filled or may be filled with a transparent resin.

Step-720

Subsequently, the second polarizing film 23 adhered to the second surface 20B of the second substrate 20 is adhered to the smoothing film 315, so that the rear panel and the third substrate 330 are assembled. Next, by using a related method, the color liquid crystal display device is assembled using the front panel, rear panel, liquid crystal material, sealing material (sealant), and the like. Next, the color liquid crystal display device and the planar light source device are assembled based on a related method.

EXAMPLE 8

Figure 9:
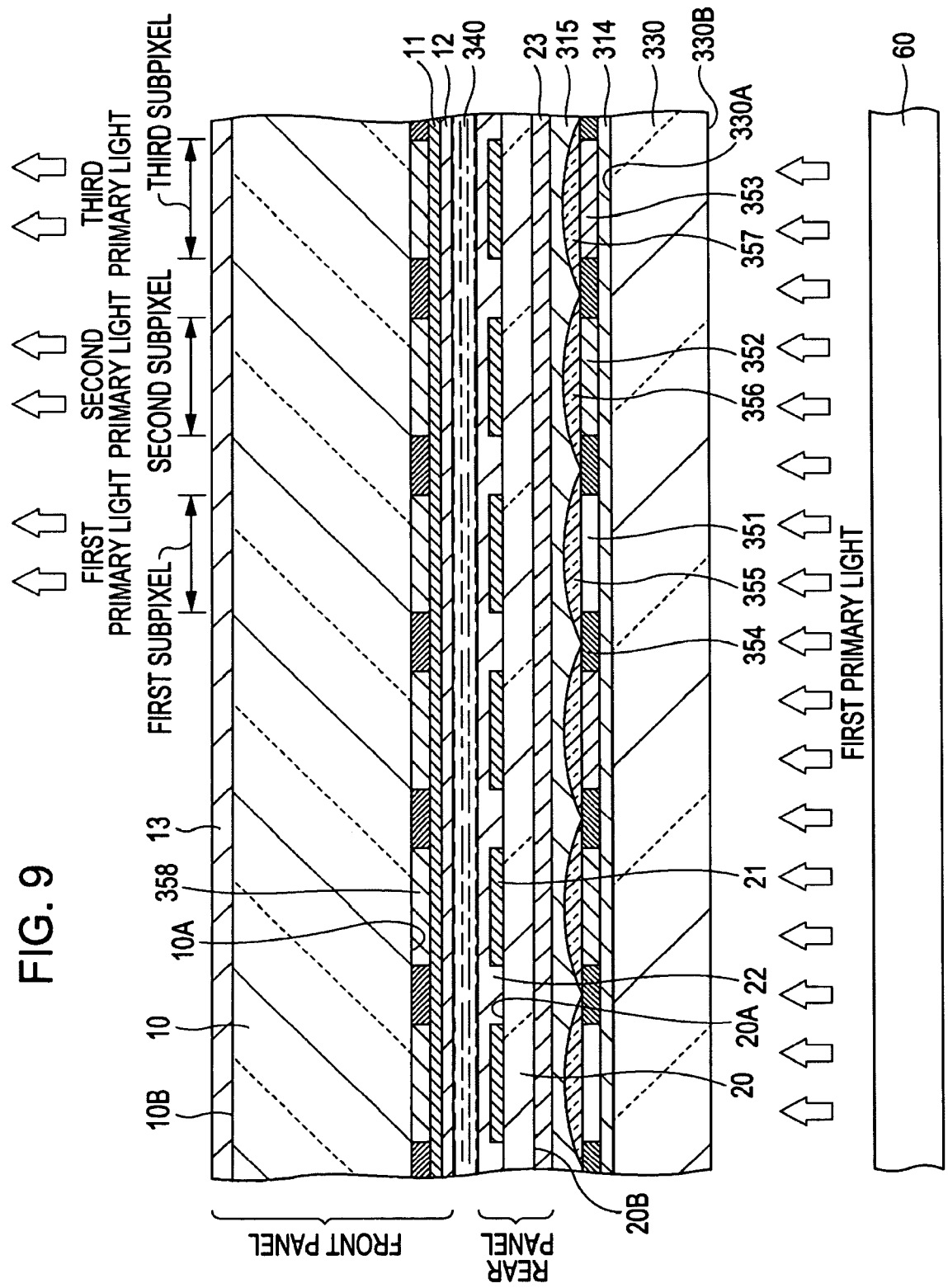
FIG. 9 is a schematic partly cross-sectional view of a color liquid crystal display device assembly according to Example 8.

Example 8 is a modification of Example 7. As shown in a schematic partly cross-sectional view of FIG. 9, in the color liquid crystal display device assembly of Example 8, a color filter 358 is disposed between the first surface 10A of the first substrate 10 and the transparent first electrode 11.

Since the composition and the structure of the color liquid crystal display device assembly according to Example 8 can be made similar to those of Example 7 except for the point described above, a detailed description is omitted. In this example, the first polarizing film 13 may be provided on the first surface 10A of the first substrate 10.

In the color liquid crystal display device assembly of Example 8, during the operation of the color liquid crystal display device, the first primary light (blue light) emitted from the light source passes through the third substrate 330, the light reflection film 314, the first primary light passing region 351, the first light focusing member 355, the smoothing film 315, the second polarizing film 23, the second substrate 20, the first subpixel (first liquid crystal cell composed of the transparent second electrode 21, the second alignment film 22, the liquid crystal material 340, the first alignment film 12, and the transparent first electrode 11), the color filter 358, the first substrate 10, and the first polarizing film 13 and is emitted as the first primary light (blue light) without being converted. In addition, the first primary light (blue light) emitted from the light source passes through the third substrate 330, the light reflection film 314, the second primary light emitting region 352, the second light focusing member 356, the smoothing film 315, the second polarizing film 23, the second substrate 20, the second subpixel (second liquid crystal cell composed of the transparent second electrode 21, the second alignment film 22, the liquid crystal material 340, the first alignment film 12, and the transparent first electrode 11), the color filter 358, the first substrate 10, and the first polarizing film 13 and is emitted as the second primary light (green light). Furthermore, the first primary light (blue light) emitted from the light source passes through the third substrate 330, the light reflection film 314, the third primary light emitting region 353, the third light focusing member 357, the smoothing film 315, the second polarizing film 23, the second substrate 20, the third subpixel (third liquid crystal cell composed of the transparent second electrode 21, the second alignment film 22, the liquid crystal material 340, the first alignment film 12, and the transparent first electrode 11), the color filter 358, the first substrate 10, and the first polarizing film 13 and is emitted as the third primary light (red light). As a result, an observer can recognize an image in the color liquid crystal display device.

In addition, in Example 8, without forming the smoothing film 315, spaces may remain between the second polarizing film 23 and the first light focusing members 355, the second light focusing members 356, and the third light focusing members 357. Alternatively, without forming the smoothing film 315, the first light focusing members 355, the second light focusing members 356, and the third light focusing members 357, the first primary light passing regions 351, the second primary light emitting regions 352, the third primary light emitting regions 353, and the like may be formed in direct contact with the second polarizing film 23.

Figure 17A:
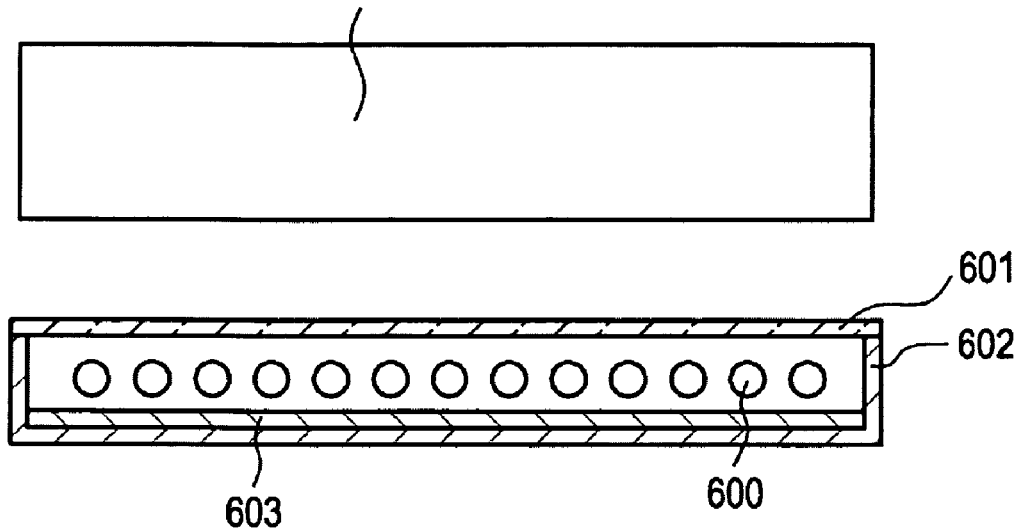
FIGS. 17A and 17B are schematic views each showing a related color liquid crystal display device assembly.
Figure 17B:
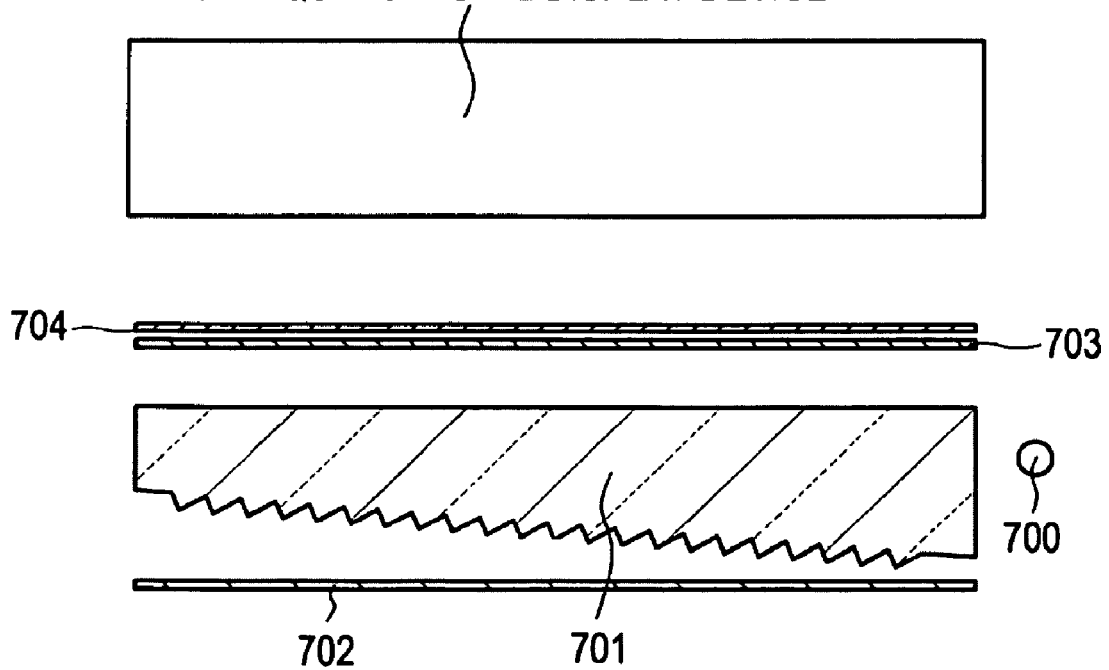

In Examples 1 to 8, as the planar light source device 60, a related direct-lighting type planar light source device shown in FIG. 17A may be used, or a sectional-drive type (partial drive type) planar light source device 420 which will be described below may also be used.

The sectional-drive type planar light source device is formed of P×Q planar light source units which correspond to P×Q display area units obtained when the display area of the color liquid crystal display device is assumed to be divided into P×Q imaginary display area units, and the light emitting states of the P×Q planar light source units are independently controlled.

Figure 10:
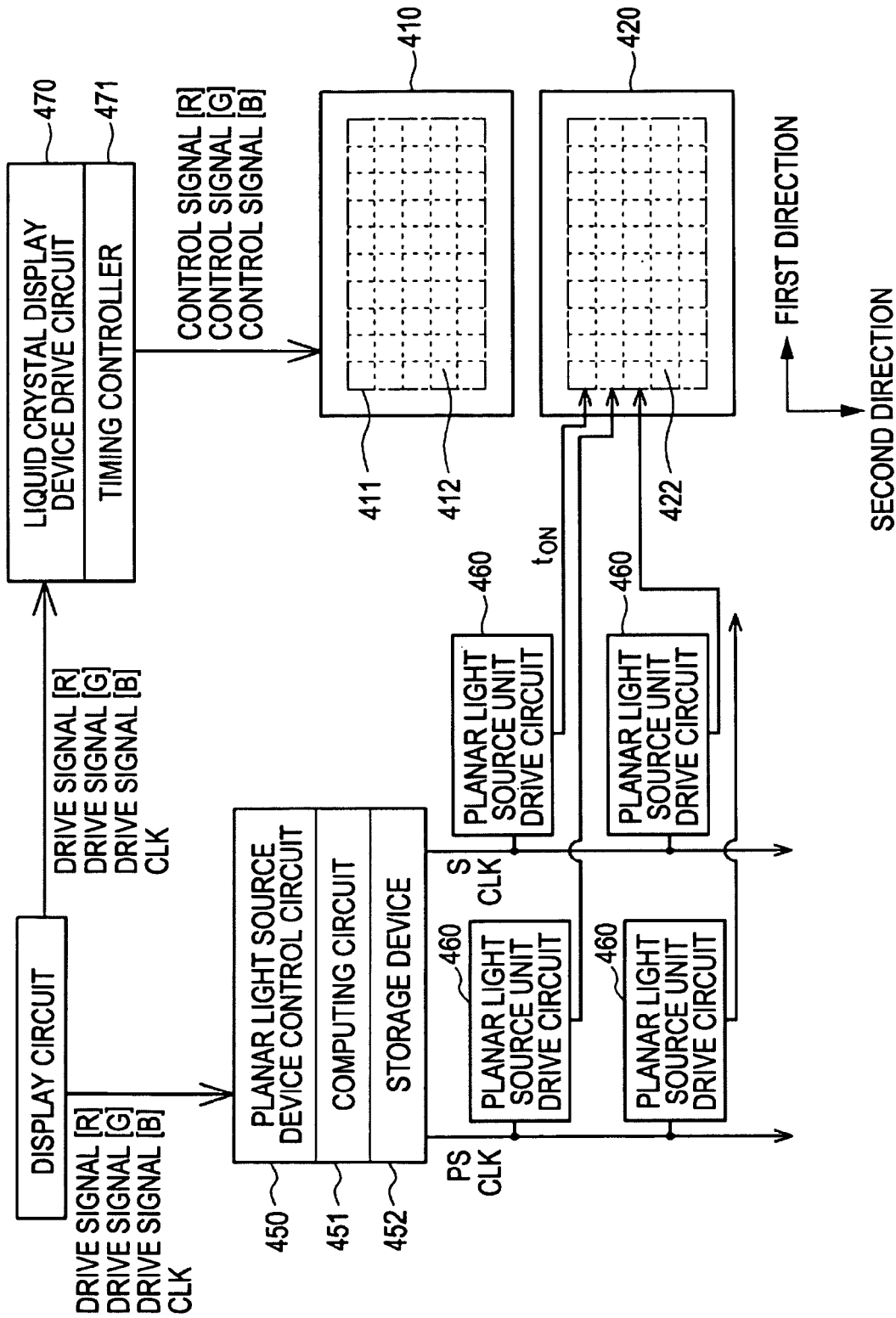
FIG. 10 is a conceptual view of a color liquid crystal display device assembly composed of a color liquid crystal display device and a planar light source device, which is suitably used in an example.

As shown in a conceptual view of FIG. 10, a color liquid crystal display device 410 includes a display area 411 in which M0×N0 pixels are arranged in a two-dimensional matrix, $M_0$ pixels being disposed in a first direction, and $N_0$ pixels being disposed in a second direction. In this case, it is assumed that the display area 411 is divided into P×Q imaginary display area units 412. The display area units 412 are formed of a plurality of pixels. In particular, for example, when the image display resolution satisfies the HD-TV standard, and the number $M_0 \times N_0$ of pixels arranged in a two-dimensional matrix is represented by ($M_0$, $N_0$), the number $M_0 \times N_0$ of pixels is, for example, (1920, 1080). In addition, the display area 411 (in FIG. 10, shown by a chain line) formed of the pixels arranged in a two-dimensional matrix is divided into P×Q imaginary display area units 412 (boundaries are shown by dotted lines). The value of (P, Q) is, for example, (19, 12). However, in order to simplify the drawing, the number of the display area units 412 (and, the number of planar light source units 422 which will be described later) is different from that described above. The display area units 412 are each formed of a plurality of pixels (M×N), and the number of pixels forming one display area unit 412 is, for example, approximately ten thousands. The pixels are each formed of a set of subpixels emitting different types of light. In more particular, each pixel is formed of three types of subpixels, that is, a first subpixel (blue light emitting subpixel, subpixel (B)), a second subpixel (green light emitting subpixel, subpixel (G)), and a third subpixel (red light emitting subpixel, subpixel (R)). This color liquid crystal display device 410 is driven in a line-sequential manner. In more particular, the color liquid crystal display device 410 has scanning electrodes (extend in the first direction) and data electrodes (extend in the second direction) which intersect each other in a matrix form, and the scanning electrodes are selected and scanned by inputting scanning signals thereto, and an image is displayed based on data signals (signals based on control signals) input to the data electrodes, so that one screen is formed.

The color liquid crystal display device 410 has, in particular, the structure described in one of Examples 1 to 8 and the modifications thereof.

Figure 12A:
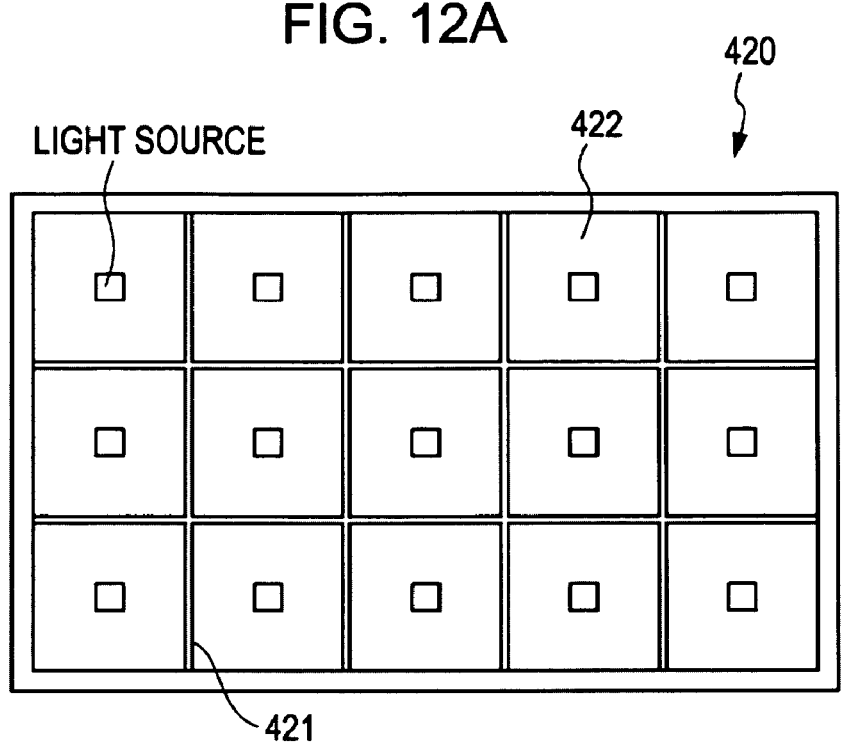
FIG. 12A is a schematic view showing arrangement of planar light source units and the like in a planar light source device according to the example.
Figure 12B:
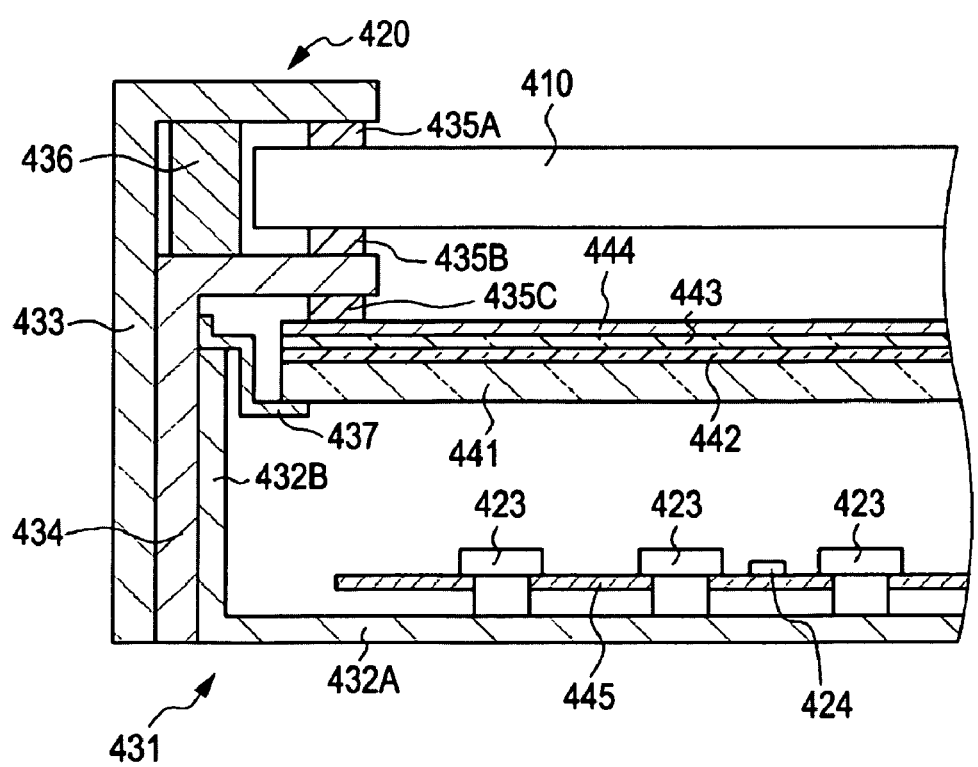
FIG. 12B is a schematic partly cross-sectional view of a color liquid crystal display device assembly composed of a color liquid crystal display device and a planar light source device according to the example.

The direct-lighting type planar light source device (backlight) 420 is formed of the P×Q planar light source units 422 corresponding to the P×Q imaginary display area units 412, and the planar light source units 422 illuminate the respective display area units 412 from the rear sides thereof. Light sources of the planar light source units 422 are independently controlled. However, the light source luminance of one planar light source unit 422 is not influenced, for example, by a light emitting state of a light source included in a different planar light source unit 422. In addition, although the planar light source device 420 is located under the color liquid crystal display device 410, the color liquid crystal display device 410 and the planar light source device 420 are shown separately in FIG. 10. The location and the arrangement of the planar light source units 422 and the like of the planar light source device 420 are schematically shown in FIG. 12A, and FIG. 12B shows a schematic partly cross-sectional view of the color liquid crystal display device assembly composed of the color liquid crystal display device 410 and the planar light source device 420. The light source includes a light emitting diode 423 driven by a pulse width modulation (PWM) control method. An increase and a decrease in luminance of the planar light source unit 422 is performed by an increase and a decrease control of the duty ratio of the light emitting diode forming the planar light source unit 422 by the pulse width modulation control.

As shown in the schematic partly cross-sectional view of the color liquid crystal display device assembly of FIG. 12B, the planar light source device 420 is formed of a housing 431 including an exterior frame 433 and an interior frame 434. In addition, an end portion of the color liquid crystal display device 410 is held by the exterior frame 433 and the interior frame 434 so as to be sandwiched between spacers 435A and 435B. Between the exterior frame 433 and the interior frame 434, since a guide member 436 is provided, the color liquid crystal display device 410 sandwiched between the exterior frame 433 and the interior frame 434 is fixed so as not to be displaced. At an upper portion inside the housing 431, a light diffusion plate 441 is fitted to the interior frame 434 with a spacer 435C and a bracket member 437 interposed therebetween. An optical functional sheet group composed, for example, of a diffusion sheet 442, a prism sheet 443, and a polarization conversion sheet 444 is laminated on the light diffusion plate 441.

At a lower portion inside the housing 431, a reflection sheet 445 is provided. In this case, the reflection sheet 445 is provided above a bottom surface 432A of the housing 431 with fitting members (not shown) interposed therebetween so that its reflection surface faces the light diffusion plate 441. The reflection sheet 445 may be formed, for example, by providing a white poly(ethylene terephthalate) film (MCPET) or a silver-increased reflection film including a silver reflection film, a low refractive-index film, and a high refractive-index film laminated to each other on a sheet substrate. The reflection sheet 445 reflects light emitted from the light emitting diodes 423 and light reflected by side surfaces 432B of the housing 431 and/or partitions 421 shown in FIG. 12A. Accordingly, the first primary light emitted from the light emitting diodes 423 is used as illumination light which illuminates the diffusion regions 51 or 151 or the first primary light passing regions 251 or 351, the second primary light emitting regions 52, 152, 252, or 352, and the third primary light emitting regions 53, 153, 253, or 353. This illumination light is emitted from the planar light source unit 422 through the light diffusion plate 441, then passes through the optical functional sheet group including the diffusion sheet 442, the prism sheet 443, and the polarization conversion sheet 444, and illuminates the color liquid crystal display device 410 from the rear surface thereof.

In the vicinity of the bottom surface 432A of the housing 431, photodiodes 424 functioning as a photo sensor are provided. In this case, one photo sensor (photodiode 424) is provided for on planar light source unit 442. By the photodiode 424 functioning as a photo sensor, the luminance and the chromaticity of the light emitting diode 423 are measured.

Figure 11:
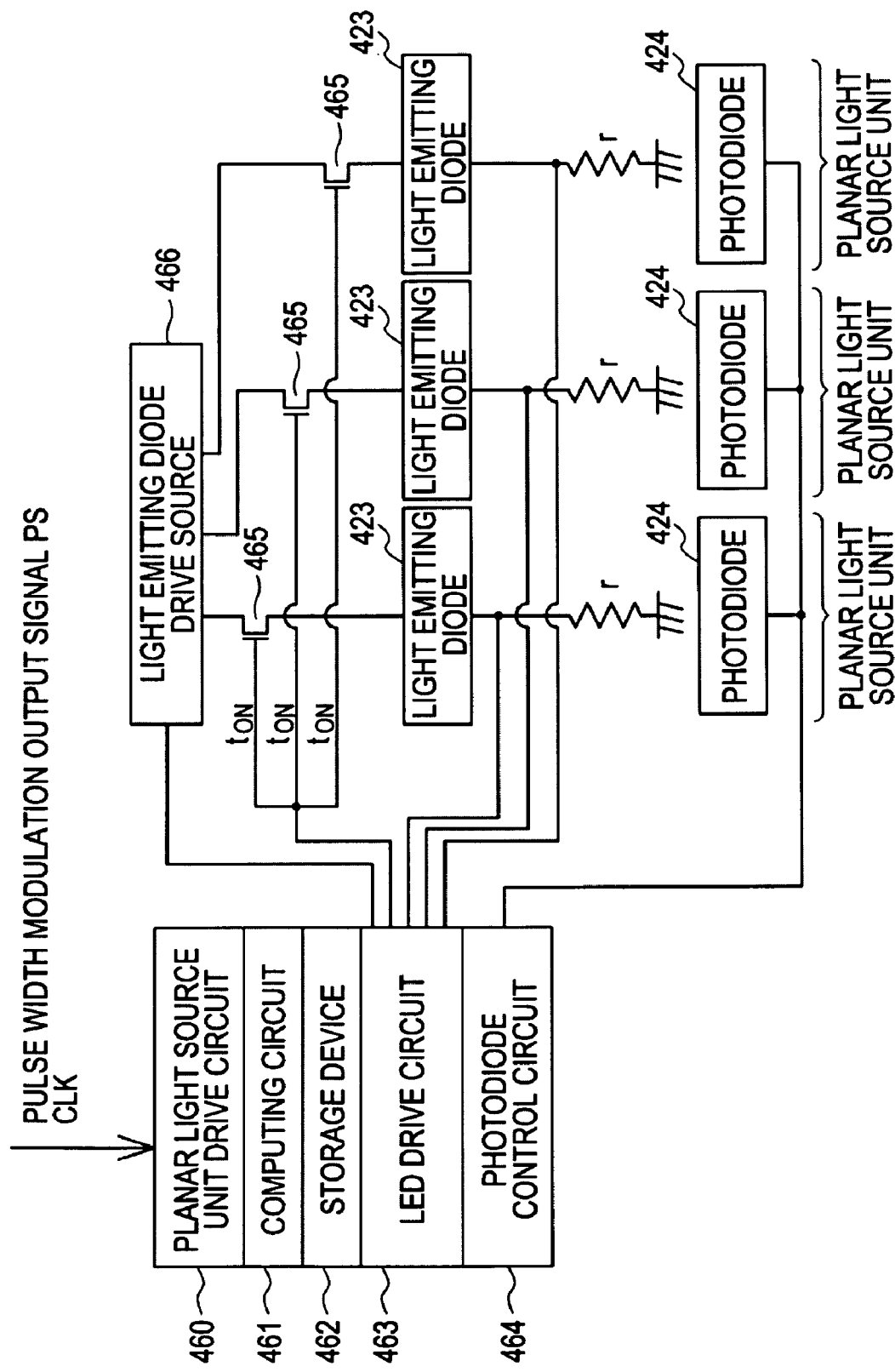
FIG. 11 is a schematic diagram of a part of a drive circuit suitably used in the example.

As shown in FIGS. 10 and 11, a drive circuit driving the planar light source device 420 and the color liquid crystal display device 410 based on drive signals from the outside (display circuit) includes a planar light source device control circuit 450 and planar light source unit drive circuits 460, which perform ON/OFF control of the light emitting diodes 423 forming the planar light source device 420 based on a pulse width modulation control method, and also includes a liquid crystal display device drive circuit 470.

The planar light source device control circuit 450 is formed of a computing circuit 451 and a storage device (memory) 452. In addition, the planar light source unit drive circuits 460 are each formed of a computing circuit 461, a storage device (memory) 462, an LED drive circuit 463, a photodiode control circuit 464, FET switching elements 465, and light emitting diode drive sources (current constant sources) 466. The circuits forming the planar light source control circuit 450 and the planar light source unit drive circuits 460 may be formed, for example, using know circuits. In addition, the liquid crystal display device drive circuit 470 driving the color liquid crystal display device 410 is formed of a related circuit, such as a timing controller 471. In the color liquid crystal display 410, gate drivers, source drivers, and the like (not shown in the figure) driving switching elements composed of TFTs forming the liquid crystal cells are provided.

The light emitting state of the light emitting diodes 423 in a certain image display frame is measured by the photodiodes 424, the output therefrom is input to the photodiode control circuit 464 and is formed into data of the luminance and chromaticity of the light emitting diodes 423 by the photodiode control circuit 464 and the computing circuit 461, the data thus formed is sent to the LED drive circuit 463, and the light emitting states of the light emitting diodes 423 in a next image display frame are controlled, so that a feedback mechanism is formed.

At downstream of the light emitting diode 423, a resistor r for current measurement is inserted in series with the light emitting diode 423, a current flowing through the resistor r is converted into a voltage, and under the control of the LED drive circuit 463, the operation of the light emitting diode drive source 466 is controlled so that the voltage drop at the resistor r shows a predetermined value. In FIG. 11, although only one light emitting diode drive source (constant current source) 466 is shown, the light emitting diode drive sources 466 are actually provided to drive the respective light emitting diodes 423. In addition, in FIG. 11, three planar light source units 422 are shown. In FIG. 11, although the structure in which one planar light source unit 422 includes one light emitting diode 423 is shown, the number of light emitting diodes 423 forming one planar light source unit 422 is not limited to one. From the light emitting diode 423, the first primary light (blue light) corresponding to the first primary color is emitted.

The display area 411 formed of the pixels arranged in a two-dimensional matrix is divided into P×Q display area units, and when this state is represented by "rows" and "columns", it is said that the display area is divided into Q rows×P columns display area units. In addition, the display area unit 412 is formed of a plurality (M×N) of pixels, and when this state is represented by "rows" and "columns", it is said that the display area unit 412 is formed of N rows×M columns pixels. Furthermore, the third subpixel (subpixel [R]), the second subpixel (subpixel [G]), and the first subpixel (subpixel [B]) are collectively called "subpixels [R, G, B]" in some cases; a third subpixel-control signal, a second subpixel-control signal, and a first subpixel-control signal input to the subpixels [R, G, B] to control the operation (such as light transmittance (aperture ratio)) of the subpixels [R, G, B] are collectively called "control signals [R, G, B]" in some cases; and a third subpixel-drive signal, a second subpixel-drive signal, and a first subpixel-drive signal input to the drive circuit from the outside to drive the subpixels [R, G, B] forming the display area unit are collectively called "drive signals [R, G, B]" in some cases.

The pixels are each formed of one set of three types of subpixels, that is, the third subpixel (subpixel [R]), the second subpixel (subpixel [G]), and the first subpixel (subpixel [B]). In the following example, the control (gradation control) of the luminance of each of the subpixels [R, G, B] is an 8-bit control in $2^8$ steps from 0 to 255. Hence, values $x_R$, $x_G$, and $x_B$ of the drive signals [R, G, B] input to the liquid crystal display device drive circuit 470 to drive the subpixels [R, G, B] of the pixels forming the display area unit 412 each take a value in $2^8$ steps. In addition, value PS of a pulse width modulation output signal to control a light emission time of each light emitting diode 423 forming each planar light source unit also has a value in $2^8$ steps from 0 to 255. However, the control is not limited to that described above, and for example, a 10-bit control in 210 steps from 0 to 1,023 may be performed. In this case, the 8-bit value may be multiplied, for example, by 4.

A control signal controlling the light transmittance Lt of each pixel is supplied thereto from the drive circuit. In particular, the control signals [R, G, B] controlling the light transmittances Lt of the respective subpixels [R, G, B] are supplied thereto from the liquid crystal display device drive circuit 470. That is, in the liquid crystal display device drive circuit 470, the control signals [R, G, B] are generated from the input drive signals [R, G, B], and the control signals [R, G, B] are supplied (output) to the subpixels [R, G, B]. In addition, since the light source luminance $Y_2$, which is the luminance of the planar light source unit 422, is changed for each image display frame, the control signals [R, G, B] have values $X_{R\text{-}corr}$, $X_{G\text{-}corr}$, and $X_{B\text{-}corr}$ obtained by performing correction (compensation) based on the change of the light source luminance $Y_2$ with respect to values obtained by raising the values $x_R$, $x_G$, and $x_B$ of the drive signals [R, G, B] to a power of 2.2. In addition, the control signals [R, G, B] are sent by a related method from the timing controller 471 forming the liquid crystal display device drive circuit 470 to the gate drivers and source drivers of the color liquid crystal display device 410, the switching elements forming respective subpixels are driven based on the control signals [R, G, B], and desired voltages are applied between the transparent first electrode 11 and the transparent second electrodes 21, so that the light transmittances (aperture ratios) Lt of the respective subpixels are controlled. In this case, as the values $X_{R\text{-}corr}$, $X_{G\text{-}corr}$, and $X_{B\text{-}corr}$ of the control signals [R, G, B] become larger, the light transmittances (aperture ratios) of the subpixels [R, G, B] become higher, and the luminances (display luminances y) of parts of the display area corresponding to the subpixels [R, G, B] become higher. That is, an image (in general, a type of spot image) formed by light passing through the subpixels [R, G, B] is bright.

The control of the display luminance y and that of the light source luminance $Y^2$ are performed for each image display frame, each display area unit, and each planar light source unit in the image display of the color liquid crystal display device 410. In addition, the operation of the color liquid crystal display device 410 and the operation of the planar light source device 420 in one image display frame are synchronized with each other. The number of image information (images per second) per second sent to the drive circuit as electric signals is the frame frequency (frame rate), and the reciprocal number thereof is the frame time (unit:second).

Figure 13:
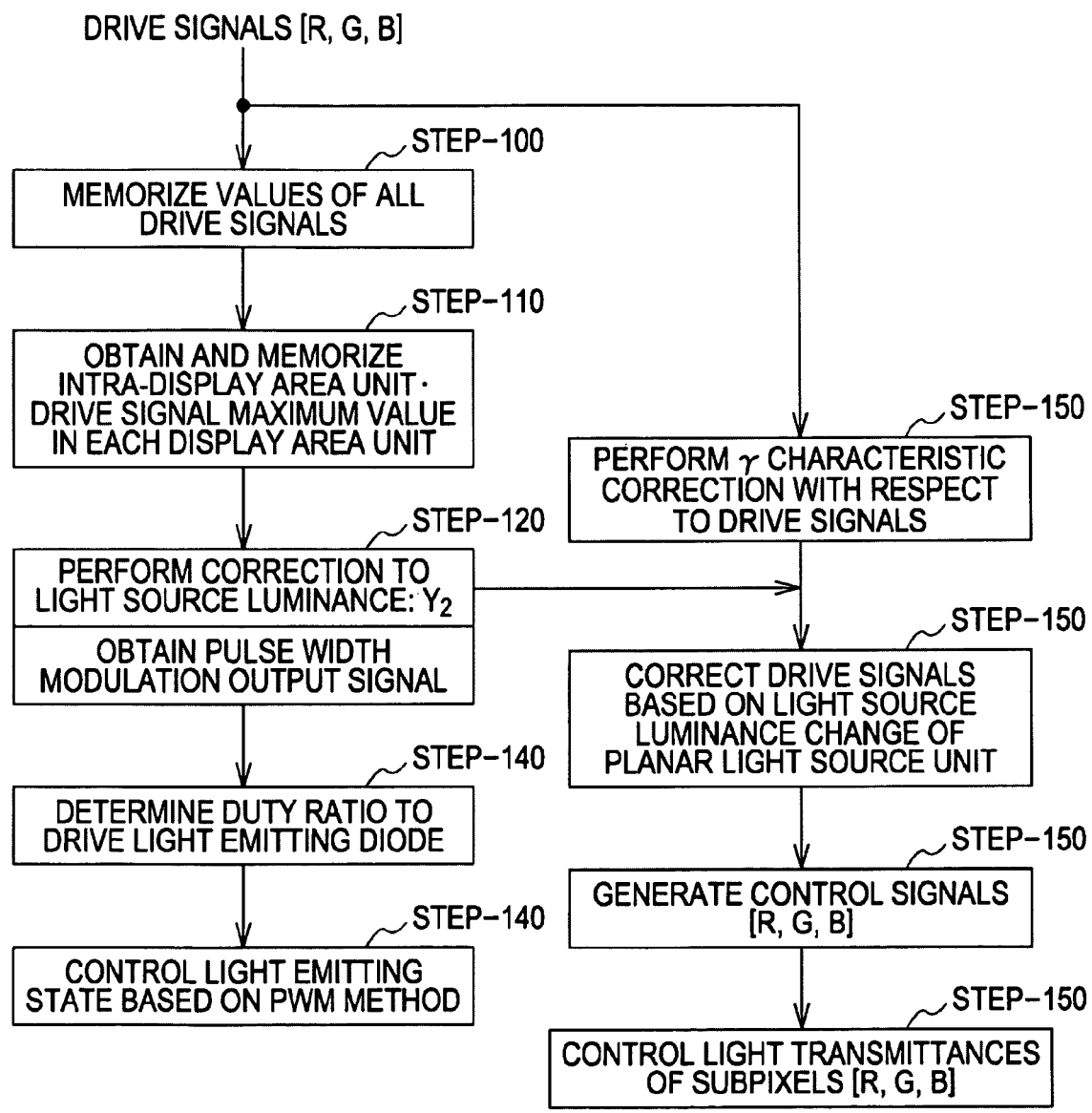
FIG. 13 is a flowchart illustrating a method for driving a sectional-drive type planar light source device.

A driving method of the sectional-drive type planar light source device will be described with reference to FIGS. 10, 11, and 13. FIG. 13 is a flowchart illustrating the driving method of the sectional-drive type planar light source device.

In this case, control signals controlling the light transmittances Lt of individual pixels are supplied thereto from the drive circuit. In more particular, the control signals [R, G, B] controlling the light transmittances Lt of the respective subpixels [R, G, B] which form the pixel are supplied to the subpixels [R, G, B] from the drive circuit 470. Subsequently, in each planar light source unit 422, the luminance of the light source forming the planar light source unit 422 corresponding to the display area unit 412 is controlled by the planar light source device control circuit 450 and the planar light source unit drive circuit 460 so as to obtain a luminance (display luminance-second specified value $y^2$ at the light transmittance-first specified value $Lt^1$) of a pixel (subpixels [R, G, B]) which is obtained when it is assumed that a control signal corresponding to a drive signal having a value equal to the intra-display area unit-drive signal maximum value $x_{U\text{-}max}$, which is a maximum value among the values $x_R$, $x_G$, and $x_B$ of the drive signals [R, G, B] input to the drive circuits 450, 460, and 470 to drive all pixels (subpixels [R, G, B] forming each display area unit 412, is input to the pixel. In particular, when the light transmittance (aperture ratio) of the subpixel is set to the light transmittance-first specified value $Lt_1$, the light source luminance $Y_2$ is controlled (for example, may be decreased) so as to obtain the display luminance $Y_2$. That is, for example, the light source luminance $Y^2$ of the planar light source unit 422 is controlled in each image display frame so as to satisfy the following equation (A). By the way, $Y_2 \leq Y_1$ holds.

$$Y_2 \cdot Lt_1 = Y_2 \cdot Lt_2 \tag{A}$$

Step-100

The drive signals [R, G, B] and a clock signal CLK for one image display frame sent from a related display circuit, such as a scan converter, are input to the planar light source device control circuit 450 and the liquid crystal display device drive circuit 470 (see FIG. 10). The drive signals [R, G, B] are output signals from an image-pickup tube, which are output, for example, from a broadcasting station, and are also input to the liquid crystal display device drive circuit 470 to control the light transmittance Lt of the pixel. When the light quantity input to the image-pick up tube is represented by y', the drive signals [R, G, B] can be expressed by a function of the 0.45 power of y'. The values $x_R$, $x_G$, and $x_B$ of the drive signals [R, G, B] for one image display frame input to the planar light source device control circuit 450 are once stored in the storage device (memory) 452 forming the planar light source device control circuit 450. In addition, the values $x_R$, $x_G$, and $x_B$ of the drive signals [R, G, B] for one image display frame input to the liquid crystal display drive circuit 470 are also once stored in a storage device (not shown) forming the liquid crystal display drive circuit 470.

Step-110

Next, in the computing circuit 451 forming the planar light source device control circuit 450, the values of the drive signals [R, G, B] stored in the storage device 452 are read out, and at the (p, q)th display area unit 412 (however, first, p=1 and q=1), the intra-display area unit-drive signal maximum value $x_{U\text{-}max}$, which is the maximum value among the values $x_R$, $x_G$, and $x_B$ of the drive signals [R, G, B] driving the subpixels [R, G, B] in all pixels forming this (p, q)th display area unit 412, is obtained by the computing circuit 451. Subsequently, this intra-display area unit-drive signal maximum value $x_{U\text{-}max}$ is stored in the storage device 452. This step is performed for all the pixels including m=1, 2, - - -, M, n= 1, 2, - - -, N, that is, for M×N pixels.

For example, when the value $x_R$ corresponds to [110], the value $x_G$ corresponds to [150], and the value $x_B$ corresponds to [50], the value $x_{U\text{-}max}$ corresponds to [150].

The above operation is repeatedly performed from (p, q)= (1, 1) to (P, Q), and the intra-display area unit-drive signal maximum values $x_{U\text{-}max}$ in all the display area units 412 are stored in the storage device 452.

Step-120

Figure 14A:
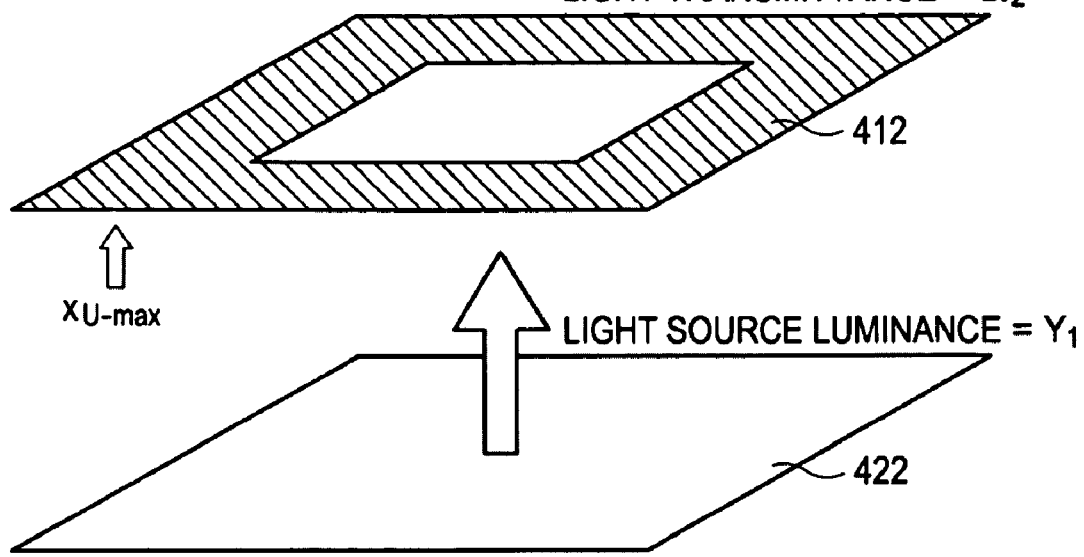
FIGS. 14A and 14B are conceptual views each illustrating the state in which light source luminance $Y_2$ of a planar light source unit is increased and decreased under control of a planar light source unit drive circuit so as to obtain display luminance-second specified value $y_2$ in the planar light source unit, which is obtained when it is assumed that a control signal corresponding to a drive signal having a value equal to an intra-display area unit-drive signal maximum value $x_{u-max}$ is supplied to a pixel.
Figure 14B:
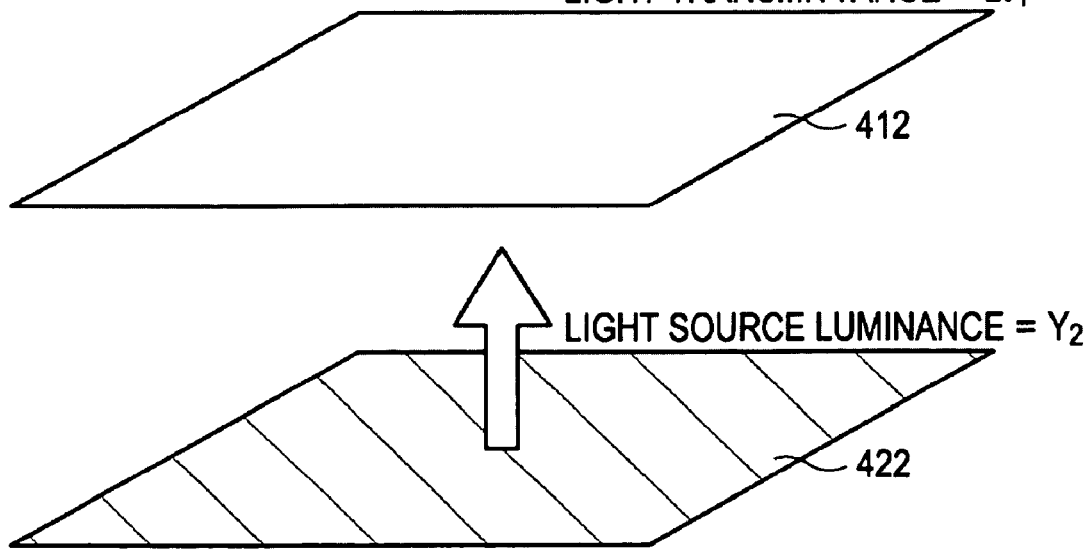

In order to obtain a luminance (display luminance-second specified value $y_2$ at the light transmittance-first specified value $Lt_1$) by the planar light source unit 422, which is obtained when it is assumed that control signals [R, G, B] corresponding to drive signals [R, G, B] each having a value equal to the intra-display area unit-drive signal maximum value $x_{U\text{-}max}$ are supplied to the subpixels [R, G, B], the light source luminance $Y_2$ of the planar light source unit 422 corresponding to the display area unit 412 is increased or decreased under the control of the planar light source device drive circuit 460. In particular, the light source luminance $Y_2$ may be controlled for each one image display frame and for each one planar light source unit so as to satisfy the following equation (A). In more particular, the luminance of the light emitting diode 423 may be controlled based on equation (B) this is a light source luminance control function g (xnol-max), and the light source luminance $Y_2$ may be controlled so as to satisfy the equation (A). A conceptual view of the control as described above is shown in FIGS. 14A and 14B. However, as will be described later, the correction based on influences of the other planar light source units 422 is preferably preformed for the light source luminance $Y_2$ whenever necessary. In addition, the relationship relating to the control of the light source luminance $Y_2$ may be preferably obtained in advance and stored in the storage device 452 or the like. That is, the relationship is among the intra-display area unit-drive signal maximum value $x_{U\text{-}max}$, the value of a control signal corresponding to a drive signal having a value equal to this maximum value $x_{U\text{-}max}$, the display luminance-second specified value $y_2$ obtained when it is assumed that the control signal as described above is supplied, the light transmittance (aperture ratio) (light transmittance-second specified value Lt2) of each subpixel in the case described above, luminance control parameters in the planar light source unit 422 to obtain the display luminance-second specified value $y_2$ when the light transmittance (aperture ratio) of each subpixel is set to the light transmittance-first specified value $Lt_1$, and the like.

$$Y_2 \cdot Lt_1 = Y_2 \cdot Lt_2 \tag{A}$$

$$g(x_{nol\text{-}max}) = a1 \cdot (x_{nol\text{-}max})^{2.2} + a_0 \tag{B}$$

When the maximum value of drive signals (drive signals [R, G, B]) input to the liquid crystal display device drive circuit 470 to drive the subpixels [R, G, B] is represented by xmax, $$x_{nol\text{-}max} = x_{U\text{-}max}/x_{max} \text{ holds,}$$

where $a_1$ and $a_0$ are constants, and $a_1 + a_0 = _1$, $0 < a_1 < 1$, and $0 < a_0 < 1$ hold. For example, they may be set such that $a_1 = 0.99$ and $a_0 = 0.01$. In addition, since the values $x_R$, $x_G$, and $x_B$ of the drive signals [R, G, B] each take a value in $2^8$ steps, the value of $x_{max}$ is a value corresponding to [255].

In the planar light source device 420, for example, when luminance control of the planar light source unit 422 at (p, q)=(1, 1) is assumed, influences of the other P×Q planar light source units 422 is necessarily taken into consideration in some cases. Since the influences received by the planar light source unit 422 from the other planar light source units 422 is understood in advance by the light emission profile of each planar light source unit 422, the difference can be obtained by reverse operation, and as a result, the correction can be performed. The basic calculation method will be described below.

The luminance (light source luminance $Y_2$) necessary for the P×Q planar light source units 422 based on the request of the equations (A) and (B) is represented by a matrix $[L_{P \times Q}]$. In addition, the luminance of one planar light source unit 422 is obtained when only this planar light source unit is driven and the other planar light source units are not driven, and this step is performed for all the P×Q planar light source units 422 in advance. The matrix of the luminance thus obtained is represented by a matrix $[L'_{P \times Q}]$. In addition, the correction factor is represented by a matrix $[\alpha_{P\times Q}]$. The relationship between the matrices described above can be represented by the following equation (C-1). The matrix $[\alpha_{P\times Q}]$ of the correction factor can be determined in advance.

$$[L_{P\times Q}]=[L'_{P\times Q}]\cdot[\alpha_{P\times Q}] \quad (C\text{-}1)$$

Accordingly, from the equation (C-1), the matrix $[L'_{P\times Q}]$ may be determined. The matrix $[L'_{P\times Q}]$ can be calculated using the inverse matrix. That is, the following equation may be calculated.

$$[L'_{P\times Q}]=[L_{P\times Q}]\cdot[\alpha_{P\times Q}]^{-1} \quad (C\text{-}2)$$

Subsequently, the light source of each planar light source unit 422 may be controlled so as to obtain the luminance represented by the matrix $[L'_{P\times Q}]$, and in particular, the operation and processing as described above may be performed using information (data tape) stored in the storage device (memory) 462. When the light emitting diode 423 is controlled, since the matrix $[L'_{P\times Q}]$ cannot have a negative value, it is apparent that the calculated result must be kept in a positive region. Hence, the solution of the equation (C-2) is not an exact solution and may be an approximate solution in some cases.

By using the matrix $[L_{P\times Q}]$ obtained based on the values of the equations (A) and (B) calculated in the computing circuit 451 forming the planar light source device control circuit 450 and the matrix $[\alpha_{P\times Q}]$ of the correction factor, the matrix $[L'_{P\times Q}]$ of the luminance obtained when it is assumed that the planar light source unit is independently driven as described above is determined and is further converted into one of integers (values of the pulse width modulation signals) in the range of 0 to 255 based on a conversion table stored in the storage device 452. As described above, in the computing circuit 451 forming the planar light source device control circuit 450, the value PS of the pulse width modulation signal to control the light emission time of the light emitting diode 423 in the planar light source unit 422 can be obtained.

Step-130

Next, the value PS of the pulse width modulation signal obtained in the computing circuit 451 forming the planar light source device control circuit 450 is sent to the storage device 462 of the planar light source unit drive circuit 460 provided for the corresponding planar light source unit 422 and is stored in the storage device 462. In addition, the clock signal CLK is also sent to the planar light source unit drive circuit 460 (see FIG. 11).

Step-140

Subsequently, based on the value PS of the pulse width modulation signal, an ON time $t_{ON}$ and an OFF time $t_{OFF}$ of the light emitting diode 423 forming the planar light source unit 422 are determined by the computing circuit 461. Incidentally, the following equation holds.

$$t_{ON}+t_{OFF}=\text{constant } t_{const}$$

In addition, the duty ratio in the drive based on the pulse width modulation of the light emitting diode is represented by $t_{ON}/(t_{ON}+t_{OFF})=t_{ON}/t_{const}$.

In addition, a signal corresponding to the ON time $t_{ON}$ of the light emitting diode 423 forming the planar light source unit 422 is sent to the LED drive circuit 463, the switching element 465 is placed in an ON state for the ON time $t_{ON}$ based on the value of the signal corresponding to the ON time $t_{ON}$ from this LED drive circuit 463, and an LED drive current from the light emitting diode drive source 466 is supplied to the light emitting diode 423. As a result, in one image display frame, each light emitting diode 423 emits light only for the ON time $t_{ON}$. Accordingly, the display area units 412 are each illuminated at a predetermined luminance.

Figure 15A:
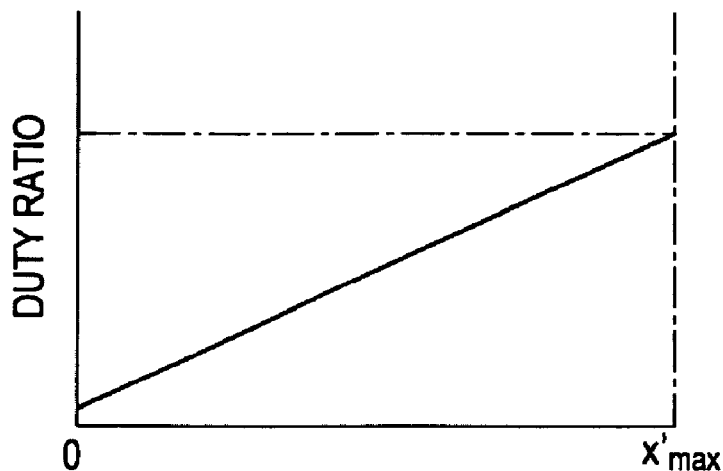
FIG. 15A is a schematic view showing the relationship between a duty ratio ($=t_{on}/t_{const}$) and a value ($x'\equiv x^{2.2}$) obtained by raising a drive signal value input to a liquid crystal display device drive circuit for driving subpixels to a power of 2.2.
Figure 15B:
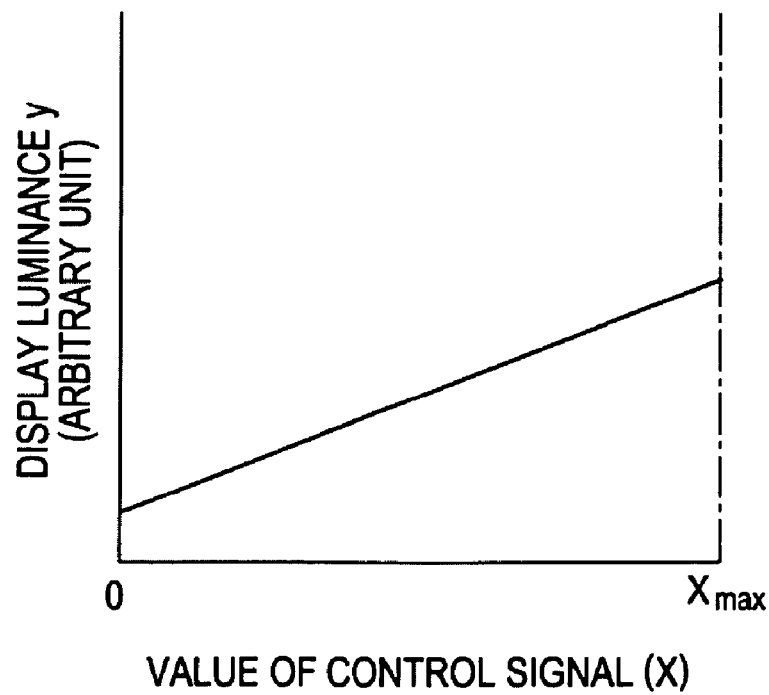
FIG. 15B is a schematic view showing the relationship between a value X of a control signal for controlling light transmittance of a subpixel and display luminance y.

The state thus obtained is shown by the solid lines in FIGS. 15A and 15B. FIG. 15A is a schematic view showing the relationship between the duty ratio ($=t_{ON}/t_{Const}$) and a value ($x'\equiv x^{2.2}$) obtained by raising a drive signal value input to the liquid crystal display device drive circuit 470 for driving the subpixels to a power of 2.2; and FIG. 15B is a schematic view showing the relationship between a control signal value X for controlling the light transmittance Lt of the subpixel and the display luminance y.

Step-150

The values $x_R$, $x_G$, and $x_B$ of the drive signal [R, G, B] input to the liquid crystal display device drive circuit 470 are sent to the timing controller 471, and at the timing controller 471, the control signals [R, G, B] corresponding to the input drive signals [R, G, B] are supplied (output) to the subpixels [R, G, B]. The values $X_R$, $X_G$, and $X_B$ of the control signals [R, G, B] generated by the timing controller 471 of the liquid crystal display device drive circuit 470 and supplied to the subpixels [R, G, B] therefrom and the values $x_R$, $x_G$, and $x_B$ of the drive signals [R, G, B] have the following relationships represented by equations (D-1), (D-2), and (D-3) shown below. However, $b_{1\_R}$, $b_{0\_R}$, $b_{1\_G}$, $b_{0\_G}$, $b_{1\_B}$, and $b_{0\_B}$ are constants. In addition, since the light source luminance $Y_2$ of the planar light source unit 422 is changed in each image display frame, the control signals [R, G, B] basically have values obtained by performing correction (compensation) based on the change in light source luminance $Y_2$ to values obtained by raising the values of the drive signals [R, G, B] to a power of 2.2. That is, since the light source luminance $Y_2$ is changed for each image display frame, the values $X_R$, $X_G$, and $X_B$ of the control signals [R, G, B] are determined and corrected (compensated for) to obtain the display luminance-second specified value $y_2$ at the light source luminance $Y_2$ ($\leqq Y_1$), so that the light transmittance (aperture ratio) of the pixel or the subpixel is controlled. In this case, functions $f_R$, $f_G$, and $f_B$ of the equations (D-1), (D-2), and (D-3) are functions obtained in advance to perform the correction (compensation).

$$X_R=f_R(b_{1\_R}\cdot x_{R2.2}+b_{0\_R}) \quad (D\text{-}1)$$

$$X_G=f_G(b_{1\_G}\cdot x_{R2.2}+b_{0\_G}) \quad (D\text{-}2)$$

$$X_B=f_B(b_{1\_B}\cdot x_{R2.2}+b_{0\_B}) \quad (D\text{-}3)$$

As described above, the image display operation in one image display frame is completed.

Figure 16:
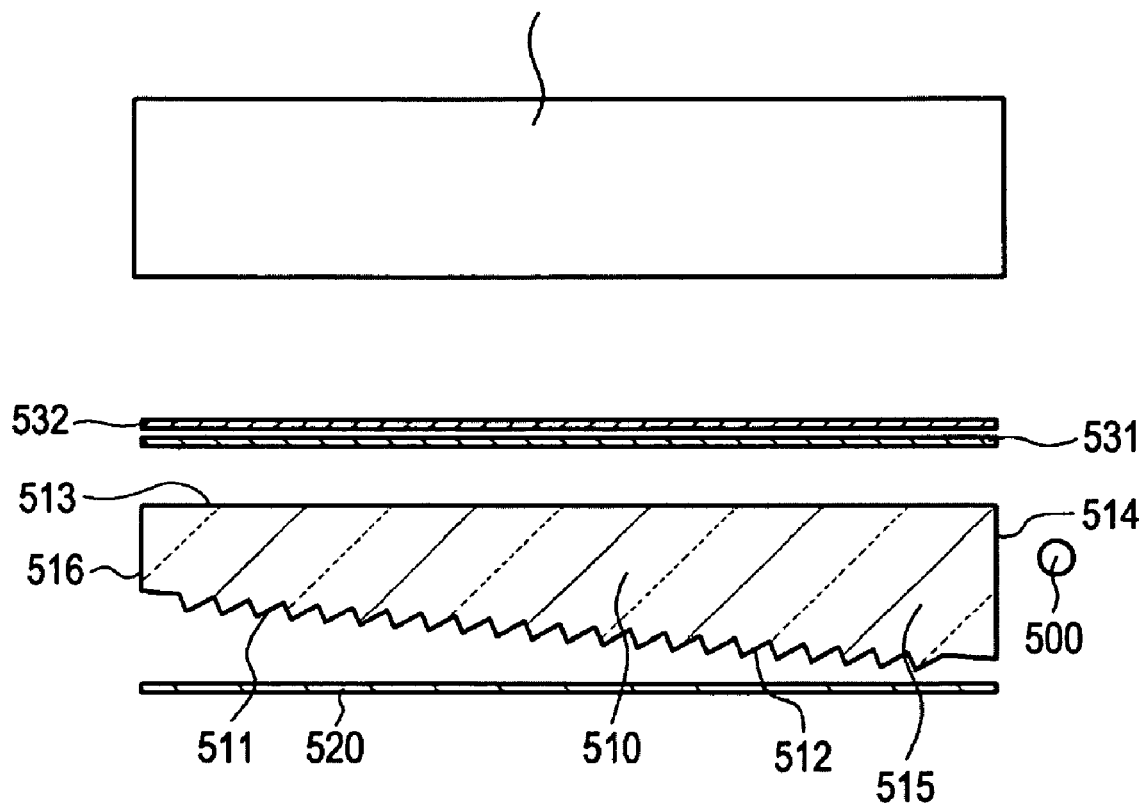
FIG. 16 is a schematic view showing a color liquid crystal display device assembly including an edge light (side light) planar light source device.

When an edge light type (side light type) planar light source device is used, as shown in a schematic view of FIG. 16, for example, an optical guide plate 510 formed of a polycarbonate resin has a first face (bottom face) 511, a second face (top face) 513 facing this first face 511, a first side face 514, a second side face 515, and a third side face 516 facing the first side face 514, and a fourth side face facing the second side face 515. As a more particular shape of the optical guide plate, on the whole, a truncated quadrangular pyramid in the form of a wedge may be mentioned, and two side faces of the truncated quadrangular pyramid facing each other correspond to the first face 511 and the second face 513, and the bottom face of the truncated quadrangular pyramid corresponds to the first side face 514. In addition, on a surface portion of the first face 511, an irregular portion 512 is provided. A cross-sectional shape of a continuous irregular portion obtained by cutting the optical guide plate 510 in a direction of the first primary light incident thereon and along an imaginary flat plane perpendicular to the first face 511 is a triangle. That is, the irregular portion 512 provided on the surface portion of the first face 511 has a prism shape. The second face 513 of the optical guide plate 510 may be smooth (that is, may have a mirror surface) or may be crimped by blasting to have a diffusion effect (that is, may have a surface having fine irregularities). A reflection member 520 is disposed to face the first face 511 of the optical guide plate 510. In addition, a color liquid crystal display device is disposed to face the second face 513 of the optical guide plate 510. Furthermore, between the color liquid crystal display device and the second face 513 of the optical guide plate 510, a diffusion sheet 531 and a prism sheet 532 are provided. The first primary light emitted from a light source 500 is incident on the optical guide plate 510 from the first side face 514 (for example, a face corresponding to the bottom face of the truncated quadrangular pyramid), collides with the irregular portion 512 of the first face 511 to be diffused, is emitted from the first face 511, is reflected by the reflection member 520, is again incident on the first face 511, is emitted from the second face 513, and passes through the diffusion sheet 531 and the prism sheet 532 so as to illuminate the color liquid crystal display device according to one of Examples 1 to 8.

Heretofore, although the present invention has been described with reference to the preferred examples, the present invention is not limited thereto. The compositions and the structures of the color liquid crystal display device assembly, the color liquid crystal display device, the planar light source device, the planar light source unit, and the drive circuit of the examples are described by way of example, and the members, materials, and the like thereof are also described by way of example and may be appropriately changed and/or modified.

As the light source, instead of the light emitting diode, a fluorescent lamp or a semiconductor laser, which emits blue light as the first primary color, may be used. In this case, as a wavelength λ1 of the first primary light corresponding to the first primary color (blue) emitted from a fluorescent lamp, a wavelength of 450 nm may be mentioned by way of example; as green light emitting particles corresponding to the second primary light emitting particles, for example, green light emitting phosphor particles composed of $SrGa_2S_4$:Eu may be used; and as red light emitting particles corresponding to the third primary light emitting particles, for example, red light emitting phosphor particles composed of CaS:Eu may be used. Alternatively, in the case in which a semiconductor laser is used, as a wavelength λ1 of the first primary light corresponding to the first primary color (blue) emitted from a semiconductor laser, a wavelength of 457 nm may be mentioned by way of example, and in this case, as green light emitting particles corresponding to the second primary light emitting particles, for example, green light emitting phosphor particles composed of SrGa2S4:Eu may be used, and as red light emitting particles corresponding to the third primary light emitting particles, for example, red light emitting phosphor particles composed of CaS:Eu may be used. In the case of a fluorescent lamp, for example, a fluorescent lamp may be used in which blue light emitting phosphor particles are only applied to an inside wall portion (for example, when the shape of the inside wall of the fluorescent lamp obtained by cutting along a imaginary plane perpendicular to the axis line is circular, for example, a semicircular portion facing the color liquid crystal display device assembly or the side surface of the optical guide plate may be mentioned) of the fluorescent lamp which faces the color liquid crystal display device assembly or the side surface of the optical guide plate. In addition, in some cases, a light diffusion film may be provided at an appropriate position in order to diffuse light passing through the first primary light passing regions 251 or 351, the second primary light emitting regions 52, 152, 252, or 352, and the third primary light emitting regions 53, 153, 253, or 353.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A color liquid crystal display device assembly comprising:
   a color liquid crystal display device including
   a front panel including a first substrate having a first surface and a second surface and a transparent first electrode formed on the first surface of the first substrate;
   a rear panel including a second substrate having a first surface and a second surface and transparent second electrodes formed on the first surface of the second substrate; and
   a liquid crystal material disposed between the first surface of the first substrate and the first surface of the second substrate, in which pixels each including at least a first subpixel, a second subpixel, and a third subpixel are arranged in a two-dimensional matrix; and
   a planar light source device which is disposed at a rear panel side and which has light sources illuminating the color liquid crystal display device from the rear panel side,
   wherein the light sources emit first primary light corresponding to a first primary color of the light three primary colors formed of the first primary color, a second primary color, and a third primary color, and
   the front panel further includes
   second primary light emitting regions each disposed between a part of the first surface of the first substrate and a part of the transparent first electrode, both of which correspond to each second subpixel, composed of second primary light emitting particles emitting second primary light corresponding to the second primary color, and emitting the second primary light when excited by the first primary light emitted from the light sources and passing through each second subpixel;
   third primary light emitting regions each disposed between a part of the first surface of the first substrate and a part of the transparent first electrode, both of which correspond to each third subpixel, composed of third primary light emitting particles emitting third primary light corresponding to the third primary color, and emitting the third primary light when excited by the first primary light emitted from the light sources and passing through each third subpixel; and
   diffusion regions each disposed between a part of the first surface of the first substrate and a part of the transparent first electrode, both of which correspond to each first subpixel, and diffusing the first primary light emitted from the light sources and passing through each first subpixel.

2. The color liquid crystal display device assembly according to claim 1,
   wherein the front panel further includes:
   a light reflection film reflecting the second primary light and the third primary light between the transparent first electrode and the second primary light emitting regions, the third primary light emitting regions, and the diffusion regions.

3. The color liquid crystal display device assembly according to claim 1,
wherein the front panel further includes, between the transparent first electrode and the second primary light emitting regions, the third primary light emitting regions, and the diffusion regions:
first light focusing members focusing the first primary light on the diffusion regions;
second light focusing members focusing the second primary light on the second primary light emitting regions; and
third light focusing members focusing the third primary light on the third primary light emitting regions.

4. The color liquid crystal display device assembly according to claim 1,
wherein the front panel further includes:
a color filter between the first surface of the first substrate and the second primary light emitting regions, the third primary light emitting regions, and the diffusion regions.

5. The color liquid crystal display device assembly according to claim 4,
wherein the front panel further includes, between the color filter and the second primary light emitting regions, the third primary light emitting regions, and the diffusion regions:
first light focusing members focusing the first primary light passing through the diffusion regions on the color filter;
second light focusing members focusing the second primary light emitted in the second primary light emitting regions on the color filter; and
third light focusing members focusing the third primary light emitted in the third primary light emitting regions on the color filter.

6. The color liquid crystal display device assembly according to claim 1,
wherein the light sources each comprise one of a light emitting diode, a fluorescent lamp, and an electroluminescent light emitting device, which emits blue light as the first primary color.

7. A color liquid crystal display device assembly comprising:
a color liquid crystal display device including
a front panel including a first substrate having a first surface and a second surface and a transparent first electrode formed on the first surface of the first substrate;
a rear panel including a second substrate having a first surface and a second surface and transparent second electrodes formed on the first surface of the second substrate; and
a liquid crystal material disposed between the first surface of the first substrate and the first surface of the second substrate, in which pixels each including at least a first subpixel, a second subpixel, and a third subpixel are arranged in a two-dimensional matrix;
a planar light source device which is disposed at a rear panel side and which has light sources illuminating the color liquid crystal display device from the rear panel side; and
a third substrate having a first surface facing the front panel and a second surface facing the first surface,
wherein the light sources emit first primary light corresponding to a first primary color of the light three primary colors formed of the first primary color, a second primary color, and a third primary color, and
the color liquid crystal display device further includes
second primary light emitting regions each disposed between a part of the second surface of the first substrate and a part of the first surface of the third substrate, both of which correspond to each second subpixel, composed of second primary light emitting particles emitting second primary light corresponding to the second primary color, and emitting the second primary light when excited by the first primary light emitted from the light sources and passing through each second subpixel;
third primary light emitting regions each disposed between a part of the second surface of the first substrate and a part of the first surface of the third substrate, both of which correspond to each third subpixel, composed of third primary light emitting particles emitting third primary light corresponding to the third primary color, and emitting the third primary light when excited by the first primary light emitted from the light sources and passing through each third subpixel; and
diffusion regions each disposed between a part of the second surface of the first substrate and a part of the first surface of the third substrate, both of which correspond to each first subpixel, and diffusing the first primary light emitted from the light sources and passing through each first subpixel.

8. The color liquid crystal display device assembly according to claim 7,
wherein the color liquid crystal display device further includes:
a light reflection film reflecting the second primary light and the third primary light between the second surface of the first substrate and the second primary light emitting regions, the third primary light emitting regions, and the diffusion regions.

9. The color liquid crystal display device assembly according to claim 7,
wherein the front panel further includes, between the second surface of the first substrate and the second primary light emitting regions, the third primary light emitting regions, and the diffusion regions:
first light focusing members focusing the first primary light on the diffusion regions;
second light focusing members focusing the second primary light on the second primary light emitting regions; and
third light focusing members focusing the third primary light on the third primary light emitting regions.

10. The color liquid crystal display device assembly according to claim 7,
wherein the color liquid crystal display device further includes:
a color filter between the first surface of the third substrate and the second primary light emitting regions, the third primary light emitting regions, and the diffusion regions.

11. The color liquid crystal display device assembly according to claim 10,
wherein the front panel further includes, between the second surface of the first substrate and the second primary light emitting regions, the third primary light emitting regions, and the diffusion regions:
first light focusing members focusing the first primary light on the diffusion regions;
second light focusing members focusing the second primary light on the second primary light emitting regions; and
third light focusing members focusing the third primary light on the third primary light emitting regions.

12. A color liquid crystal display device assembly comprising:
- a color liquid crystal display device including
- a front panel including a first substrate having a first surface and a second surface and a transparent first electrode formed on the first surface of the first substrate;
- a rear panel including a second substrate having a first surface and a second surface and transparent second electrodes formed on the first surface of the second substrate; and
- a liquid crystal material disposed between the first surface of the first substrate and the first surface of the second substrate, in which pixels each including at least a first subpixel, a second subpixel, and a third subpixel are arranged in a two-dimensional matrix; and
- a planar light source device which is disposed at a rear panel side and which has light sources illuminating the color liquid crystal display device from the rear panel side,
- wherein the light sources emit first primary light corresponding to a first primary color of the light three primary colors formed of the first primary color, a second primary color, and a third primary color, and
- the rear panel further includes
- second primary light emitting regions disposed between parts of the first surface of the second substrate corresponding to each second subpixel and respective transparent second electrodes, composed of second primary light emitting particles emitting second primary light corresponding to the second primary color, and emitting the second primary light when excited by the first primary light emitted from the light sources to illuminate each second subpixel;
- third primary light emitting regions disposed between parts of the first surface of the second substrate corresponding to each third subpixel and respective transparent second electrodes, composed of third primary light emitting particles emitting third primary light corresponding to the third primary color, and emitting the third primary light when excited by the first primary light emitted from the light sources to illuminate each third subpixel;
- second light focusing members disposed between the second primary light emitting regions and respective transparent second electrodes and focusing the second primary light emitted in the second primary light emitting regions on each second subpixel; and
- third light focusing members disposed between the third primary light emitting regions and respective transparent second electrodes and focusing the third primary light emitted in the third primary light emitting regions on each third subpixel.

13. The color liquid crystal display device assembly according to claim 12,
- wherein the rear panel further includes:
- first light focusing members disposed between the first surface of the second substrate and respective transparent second electrodes and focusing the first primary light emitted from the light sources on each first subpixel.

14. The color liquid crystal display device assembly according to claim 12,
- wherein the rear panel further includes:
- a reflection film disposed between the first surface of the second substrate and the second primary light emitting regions and the third primary light emitting regions and reflecting the second primary light and the third primary light.

15. The color liquid crystal display device assembly according to claim 12,
- wherein the front panel further includes:
- a color filter disposed between the first surface of the first substrate and the transparent first electrode.

16. A color liquid crystal display device assembly comprising:
- a color liquid crystal display device including
- a front panel including a first substrate having a first surface and a second surface and a transparent first electrode formed on the first surface of the first substrate;
- a rear panel including a second substrate having a first surface and a second surface and transparent second electrodes formed on the first surface of the second substrate; and
- a liquid crystal material disposed between the first surface of the first substrate and the first surface of the second substrate, in which pixels each including at least a first subpixel, a second subpixel, and a third subpixel are arranged in a two-dimensional matrix;
- a planar light source device which is disposed at a rear panel side and which has light sources illuminating the color liquid crystal display device from the rear panel side; and
- a third substrate disposed between the rear panel and the planar light source device and having a first surface facing the rear panel and a second surface facing the planar light source device,
- wherein the light sources emit first primary light corresponding to a first primary color of the light three primary colors formed of the first primary color, a second primary color, and a third primary color, and
- the color liquid crystal display device further includes
- second primary light emitting regions each disposed between a part of the first surface of the third substrate and a part of the second surface of the second substrate, both of which correspond to each second subpixel, composed of second primary light emitting particles emitting second primary light corresponding to the second primary color, and emitting the second primary light when excited by the first primary light emitted from the light sources to illuminate each second subpixel; and
- third primary light emitting regions each disposed between a part of the first surface of the third substrate and a part of the second surface of the second substrate, both of which correspond to each third subpixel, composed of third primary light emitting particles emitting third primary light corresponding to the third primary color, and emitting the third primary light when excited by the first primary light emitted from the light sources to illuminate each third subpixel.

17. The color liquid crystal display device assembly according to claim 16,
- wherein the color liquid crystal display device further includes
- second light focusing members disposed between the first surface of the third substrate and the second surface of the second substrate and focusing the second primary light emitted in the second primary light emitting regions on each second subpixel, and
- third light focusing members disposed between the first surface of the third substrate and the second surface of the second substrate and focusing the third primary light emitted in the third primary light emitting regions on each third subpixel.

18. The color liquid crystal display device assembly according to claim 17, wherein the color liquid crystal display device further includes:

first light focusing members disposed between the first surface of the third substrate and the second surface of the second substrate and focusing the first primary light emitted from the light sources on each first subpixel.

19. The color liquid crystal display device assembly according to claim 16, wherein the color liquid crystal display device further includes:

a reflection film disposed between the first surface of the third substrate and the second primary light emitting regions and the third primary light emitting regions and reflecting the second primary light and the third primary light.

20. The color liquid crystal display device assembly according to claim 16, wherein the front panel further includes:

a color filter disposed between the first surface of the first substrate and the transparent first electrode.

* * * * *